US009508316B2

(12) United States Patent
Liu et al.

(10) Patent No.: US 9,508,316 B2
(45) Date of Patent: Nov. 29, 2016

(54) METHOD, SYSTEM AND APPARATUS FOR RENDERING

(71) Applicant: CANON KABUSHIKI KAISHA, Tokyo (JP)

(72) Inventors: Jun Liu, Dundas (AU); Hervé Soulard, Beacon Hill (AU); Andrew R Coker, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 14/316,570

(22) Filed: Jun. 26, 2014

(65) Prior Publication Data

US 2015/0002529 A1 Jan. 1, 2015

(30) Foreign Application Priority Data

Jun. 27, 2013 (AU) ................................. 2013206560

(51) Int. Cl.
*G09G 5/02* (2006.01)
*G06T 11/40* (2006.01)
*G06T 15/80* (2011.01)

(52) U.S. Cl.
CPC .................. *G09G 5/02* (2013.01); *G06T 11/40* (2013.01); *G06T 15/80* (2013.01); *G09G 5/026* (2013.01); *G09G 2340/06* (2013.01)

(58) Field of Classification Search
CPC ....... G06T 15/80; G06T 15/87; G06T 17/20; G06T 17/205; G06T 11/40
See application file for complete search history.

(56) References Cited

U.S. PATENT DOCUMENTS

| | | | |
|---|---|---|---|
| 5,142,617 A | 8/1992 | Dalrymple et al. | |
| 5,428,718 A | 6/1995 | Peterson et al. | |
| 5,995,109 A * | 11/1999 | Goel | G06T 17/20 345/419 |
| 6,271,861 B1 * | 8/2001 | Sargent | G06T 15/50 345/589 |
| 6,313,840 B1 | 11/2001 | Bilodeau et al. | |
| 8,243,070 B1 | 8/2012 | Brown | |
| 8,269,770 B1 | 9/2012 | Carr et al. | |
| 2006/0176304 A1* | 8/2006 | Ji | G06T 15/87 345/426 |
| 2013/0127856 A1* | 5/2013 | Winnemoeller | G06T 11/001 345/423 |

FOREIGN PATENT DOCUMENTS

AU 2005201932 A1 11/2006

OTHER PUBLICATIONS

Gerald Farin, "Curves and Surfaces for CAGD, Fifth Edition: A Practical Guide", ISBN-10: 1558607374 ISBN-13: 978-1558607378, Nov. 5, 2001, pp. 43-54 (Chapter 4) and pp. 245-250 (Chapter 14).

* cited by examiner

*Primary Examiner* — Antonio A Caschera
(74) *Attorney, Agent, or Firm* — Canon U.S.A. Inc., IP Division

(57) ABSTRACT

A method of rendering a parametric patch. The patch is defined by a geometry and a color varying according to a surface mapping points of the patch to intermediate values. Each of the intermediate values is mapped to a color value according to a shading color function. A set of intermediate values is determined for the patch. The determined set of intermediate values represent an approximation of the shading color function by linear segments. The patch is tessellated into a plurality of cells. Tessellation points are determined for each of the plurality of cells according to the determined set of intermediate values. A further cell is formed for the patch by joining, within each of said plurality of cells, a plurality of the tessellation points being of equal intermediate value and approximating isolines of the surface. The patch is rendered using the intermediate values.

18 Claims, 34 Drawing Sheets

METHOD, SYSTEM AND APPARATUS FOR RENDERING

REFERENCE TO RELATED PATENT APPLICATION(S)

This application claims the benefit under 35 U.S.C. §119 of the filing date of Australian Patent Application No. 2013206560, filed 27 Jun. 2013, hereby incorporated by reference in its entirety as if fully set forth herein.

TECHNICAL FIELD

The present invention relates generally to computer graphics output generation and, in particular, to a method and apparatus for tessellating shading parametric patches for use in rendering color blends across patch meshes. The present invention also relates to a computer program product including a computer readable medium having recorded thereon a computer program for tessellating shading parametric patches for use in rendering color blends across patch meshes.

BACKGROUND

Many methods have been developed in two-dimensional (2D) computer graphics in recent times to improve the quality of output. Rendering of graphical objects that have a solid color or a linear or radial blend between two colors has also been performed for many years. More recently methods such as Gouraud shaded triangle meshes and blends across parametric patches have been adapted from three-dimensional (3D) computer graphics to 2D computer graphics in order to greatly increase the shapes and styles of blends that may be produced.

A geometric object referred to herein as a parametric patch may be defined by four curves (e.g., Bézier curves) in xy coordinate space. The four curves typically map a unit square in parametric uv coordinate space. Examples of such parametric patches are Coons and tensor-product patches. A Coons patch may be defined by four connected Bézier Curves and four implicit control points. Portable Document Format (PDF) "Type 6" shading performed in accordance with the Portable Document Format (PDF) ISO32000-1: 2008 specification comprises one or more colored Coons patches. Such shading will be referred to below as "PDF type 6 shading". A tensor-product patch may be defined by four connected Bézier Curves and by additional control points.

PDF "Type 7" shading performed in accordance with the PDF ISO32000-1:2008 standard comprises one or more colored tensor-product patches. Such shading will be referred to below as "PDF type 7 shading". The Coons patch determined as part of the PDF type 6 shading is a special case of a tensor-product patch. Coons patches may be converted to tensor-product patches.

Each point in a PDF type 6 or type 7 shading patch may be associated with a t-value which is mapped to a color value using a PDF shading color function. The PDF shading color function may be non-linear. In PDF type 6 or type 7 shading, the color data of each of the four corners of the parametric patch may be specified by t-values.

Vector graphics on imaging devices, such as display devices or printers, are typically converted to raster graphics data in a process called rasterization. During rasterization, surfaces defined by geometric objects may be subdivided into polygons (e.g. triangles or quadrilaterals) in a process called tessellation.

Methods are known for tessellating parametric patches from PDF type 6 and 7 shadings into triangle meshes using recursive subdivision, such as "De-Casteljau's method". Recursive methods are not amenable to all implementation platforms. Embedded systems, for instance, have limited stack space and so cannot afford deep levels of recursion.

One known method of rendering parametric patches is to map each pixel in the xy space that belongs to a patch back to a corresponding point(s) in the uv parametric space. The mapping typically involves inverting patch parametric equations. Once the corresponding point(s) in the uv parametric space is known, the color associated with the corresponding point(s) is determined and applied to an original pixel at that corresponding point(s) in the xy space. While such rendering methods provide high quality output, such methods are not always the most efficient as the methods operate per-pixel. Further, such rendering methods may not take advantage of specific hardware acceleration such as three (3) point blend hardware support.

Another known method of tessellating parametric patches from PDF type 6 and 7 shadings using a predetermined tessellation depth is also known. However, the quality of the output from the predetermined tessellation depth methods is not acceptable when rendering some PDF type 6 and 7 shadings which use PDF shading color functions. Moreover, the performance of the predetermined tessellation depth methods is impacted by multiple tessellation stages, one stage for tessellating the patch into triangles and another stage for recursively tessellating the triangles into smaller triangles.

Methods are known for tessellating shading triangles further into triangle meshes using recursive subdivision in which middle points of edges of a triangle are computed and then four triangles are constructed by joining the middle points. The subdivision process is recursively invoked for resulting triangles, where the recursion process stops when the colors of vertices of the triangle differ within a certain tolerance. Recursive methods of tessellating shading triangles are not amenable to all implementation platforms. Embedded systems, for instance, have limited stack space and so cannot afford deep levels of recursion. Also, such recursive methods of tessellating shading triangles do not cater for the non-linearity in the PDF shading color function.

Thus, a need clearly exists for a more efficient method of rendering shading objects from PDF type 6 and 7 shadings, which improves computer graphics output quality.

SUMMARY

It is an object of the present invention to substantially overcome, or at least ameliorate, one or more disadvantages of existing arrangements.

According to one aspect of the present invention there is provided a method of rendering a parametric patch, said method comprising:

receiving the parametric patch, the patch being defined by a geometry and a color varying according to a surface mapping points of the patch to intermediate values, each of the intermediate values being mapped to a color value according to a shading color function;

determining a set of intermediate values for the patch, the determined set of intermediate values representing an approximation of the shading color function by linear segments, tessellating the patch into a plurality of cells;

determining tessellation points for each of said plurality of cells according to the determined set of intermediate values;

forming a further cell for the patch by joining, within each of said plurality of cells, a plurality of the tessellation points being of equal intermediate value and approximating isolines of the surface; and rendering the patch using the intermediate values corresponding to vertices of the further cell.

According to another aspect of the present invention there is provided a system for rendering a parametric patch, said system comprising:

a memory for storing data and a computer program;

a processor coupled to said memory for executing said computer program, said computer program comprising instructions for:

receiving the parametric patch, the patch being defined by a geometry and a color varying according to a surface mapping points of the patch to intermediate values, each of the intermediate values being mapped to a color value according to a shading color function;

determining a set of intermediate values for the patch, the determined set of intermediate values representing an approximation of the shading color function by linear segments;

tessellating the patch into a plurality of cells;

determining tessellation points for each of said plurality of cells according to the determined set of intermediate values;

forming a further cell for the patch by joining, within each of said plurality of cells, a plurality of the tessellation points being of equal intermediate value and approximating isolines of the surface; and rendering the patch using the intermediate values corresponding to vertices of the further cell.

According to still another aspect of the present invention there is provided a computer readable storage medium having a computer program recorded therein, the program being executable by a computer apparatus to make the computer perform a method of rendering a parametric patch, said program comprising:

code for receiving the parametric patch, the patch being defined by a geometry and a color varying according to a surface mapping points of the patch to intermediate values, each of the intermediate values being mapped to a color value according to a shading color function;

code for determining a set of intermediate values for the patch, the determined set of intermediate values representing an approximation of the shading color function by linear segments;

code for tessellating the patch into a plurality of cells;

code for determining tessellation points for each of said plurality of cell according to the determined set of intermediate values;

code for forming a further cell of the patch by joining, within each of said plurality of cells, a plurality of the tessellation points being of equal intermediate value and approximating isolines of the surface; and code for rendering the patch using the intermediate values corresponding to vertices of the further cell.

According to still another aspect of the present invention there is provided a system for rendering a shading object, the method comprising:

a memory for storing data and a computer program;

a processor coupled to said memory for executing said computer program, said computer program comprising instructions for:

receiving a shading object with defined intermediate values for each vertex of the shading object, wherein the intermediate values for each interior point of the shading object are provided according to linear interpolation of the intermediate values for the vertices of the shading object;

receiving a shading color function mapping the intermediate values to color values;

determining a first pair of tessellation points having equal intermediate value, the tessellation points in the first pair being positioned along distinct edges of the shading object and being associated with a first intermediate value;

determining a second pair of tessellation points having equal intermediate value, the tessellation points in the second pair being positioned along distinct edges of the object and being associated with a second intermediate value, the second pair of tessellation points being determined based on linearization of the shading color function within a pre-determined tolerance value; and rendering the shading object using the determined tessellation points.

According to still another aspect of the present invention there is provided a computer readable storage medium having a computer program recorded therein, the program being executable by a computer apparatus to make the computer perform a method of rendering a shading object, the program comprising:

code for receiving a shading object with defined intermediate values for each vertex of the shading object, wherein the intermediate values for each interior point of the shading object are provided according to linear interpolation of the intermediate values for the vertices of the shading object;

code for receiving a shading color function mapping the intermediate values to color values;

code for determining a first pair of tessellation points having equal intermediate value, the tessellation points in the first pair being positioned along distinct edges of the shading object and being associated with a first intermediate value;

code for determining a second pair of tessellation points having equal intermediate value, the tessellation points in the second pair being positioned along distinct edges of the shading object and being associated with a second intermediate value, the second pair of tessellation points being determined based on linearization of the shading color function within a pre-determined tolerance value;

code for rendering the shading object using the determined tessellation points.

According to still another aspect of the present invention there is provided a method of rendering a shading object, the method comprising:

receiving a shading object with defined intermediate values for each vertex of the object, wherein the intermediate values for each interior point of the object are provided according to linear interpolation of the intermediate values for the vertices of the object;

receiving a shading color function mapping the intermediate values to color values;

determining a first pair of points having equal intermediate value, the points in the first pair being positioned with respect to the vertices of the object and being associated with a first intermediate value; and rendering the object in accordance with a set of points positioned along distinct edges of the object and associated with a set of intermediate values, wherein the rendering is performed based on linearization of the shading color function within a pre-determined tolerance value in a direction oriented with respect to a line joining the first pair of points.

According to still another aspect of the present invention there is provided a system for rendering a shading object, the system comprising:

a memory for storing data and a computer program;

a processor coupled to said memory for executing said computer program, said computer program comprising instructions for:

receiving a shading object with defined intermediate values for each vertex of the object, wherein the intermediate values for each interior point of the object are provided according to linear interpolation of the intermediate values for the vertices of the object;

receiving a shading color function mapping the intermediate values to color values;

determining a first pair of points having equal intermediate value, the points in the first pair being positioned with respect to the vertices of the object and being associated with a first intermediate value; and rendering the object in accordance with a set of points positioned along distinct edges of the object and associated with a set of intermediate values, wherein the rendering is performed based on linearization of the shading color function within a pre-determined tolerance value in a direction oriented with respect to a line joining the first pair of points.

According to still another aspect of the present invention there is provided a computer readable storage medium having a computer program recorded therein, the program being executable by a computer apparatus to make the computer perform a method of rendering a shading object, the program comprising:

code for receiving a shading object with defined intermediate values for each vertex of the object, wherein the intermediate values for each interior point of the object are provided according to linear interpolation of the intermediate values for the vertices of the object;

code for receiving a shading color function mapping the intermediate values to color values;

code for determining a first pair of points having equal intermediate value, the points in the first pair being positioned with respect to the vertices of the object and being associated with a first intermediate value; and code for rendering the object in accordance with a set of points positioned along distinct edges of the object and associated with a set of intermediate values, wherein the rendering is performed based on linearization of the shading color function within a pre-determined tolerance value in a direction oriented with respect to a line joining the first pair of points.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
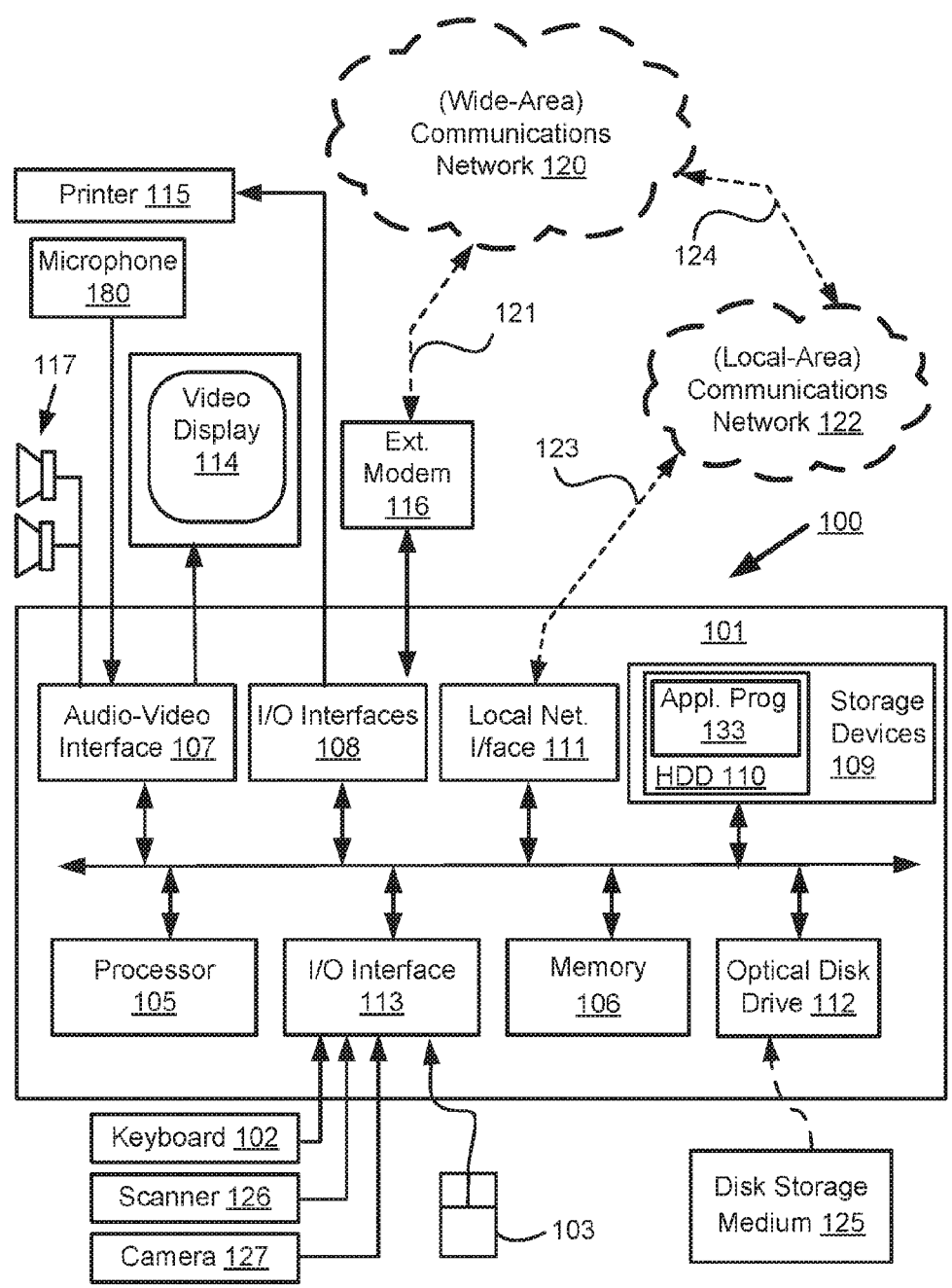
FIGS. 1A and 1B form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Figure 1B:
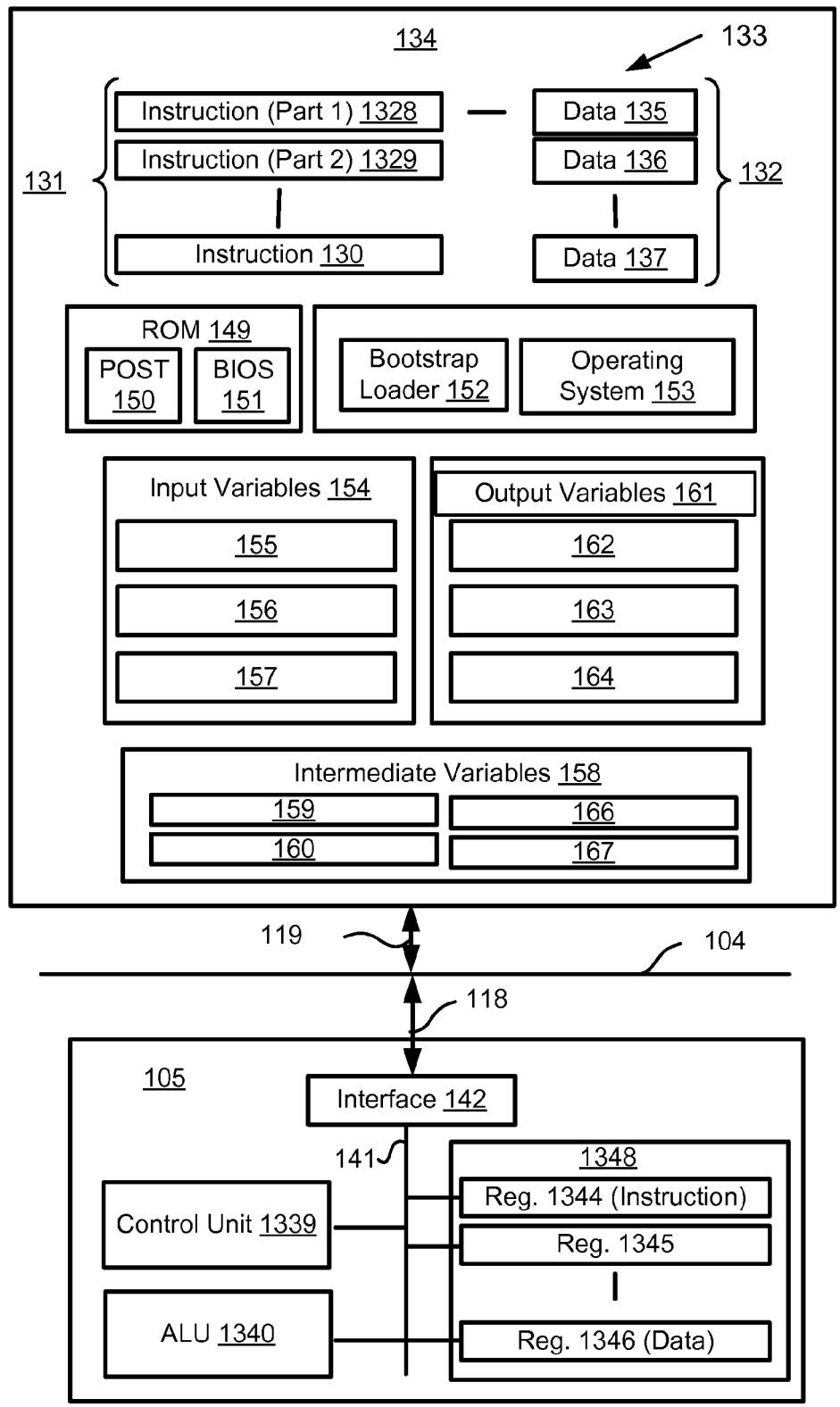

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun SPARCstations, Apple Mac™ or a like computer systems.

Methods described below may be implemented using the computer system 100 wherein processes of FIGS. 6 to 33, to be described, may be implemented as one or more software application programs 133 executable within the computer system 100. In particular, one or more steps of the described method may be are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 6 to 33 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

PDF shadings may provide a smooth gradation of colors across a region to be painted. PDF type 6 shadings (Coons patch) and PDF type 7 shadings (tensor-product patch) may be used to represent complex colored and shaded shapes. A shaded area may be defined by a mesh of patches, with each patch being defined by a geometry and a color varying according to a surface of the patch. Color data of corners of each patch may be specified by an intermediate value referred to as a "t-value" with the surface of each patch mapping points of the patch to the t-values (or intermediate values). If color data is specified by t-values, then a PDF shading color function (or "PDF shading function") that maps t-values to color values is specified. Accordingly, each of the t-values is mapped to a color value according to a shading function. The PDF shading color function may be non-linear.

Figure 2A:
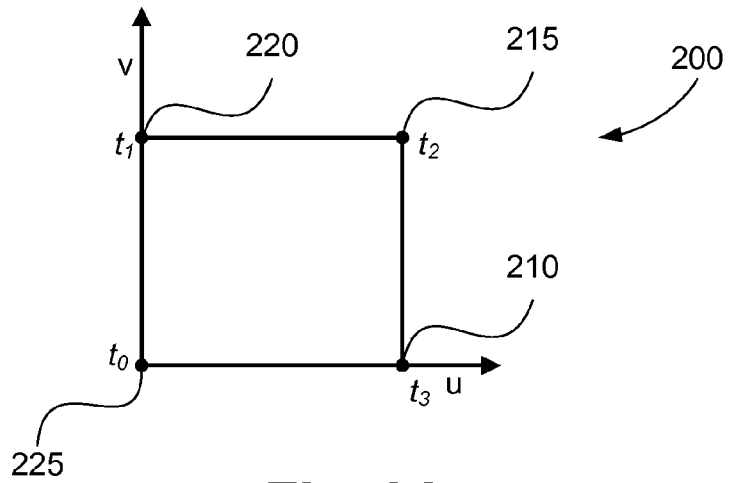
FIGS. 2A and 2B show a tensor-product parametric patch of PDF type 7 shading.
Figure 2B:
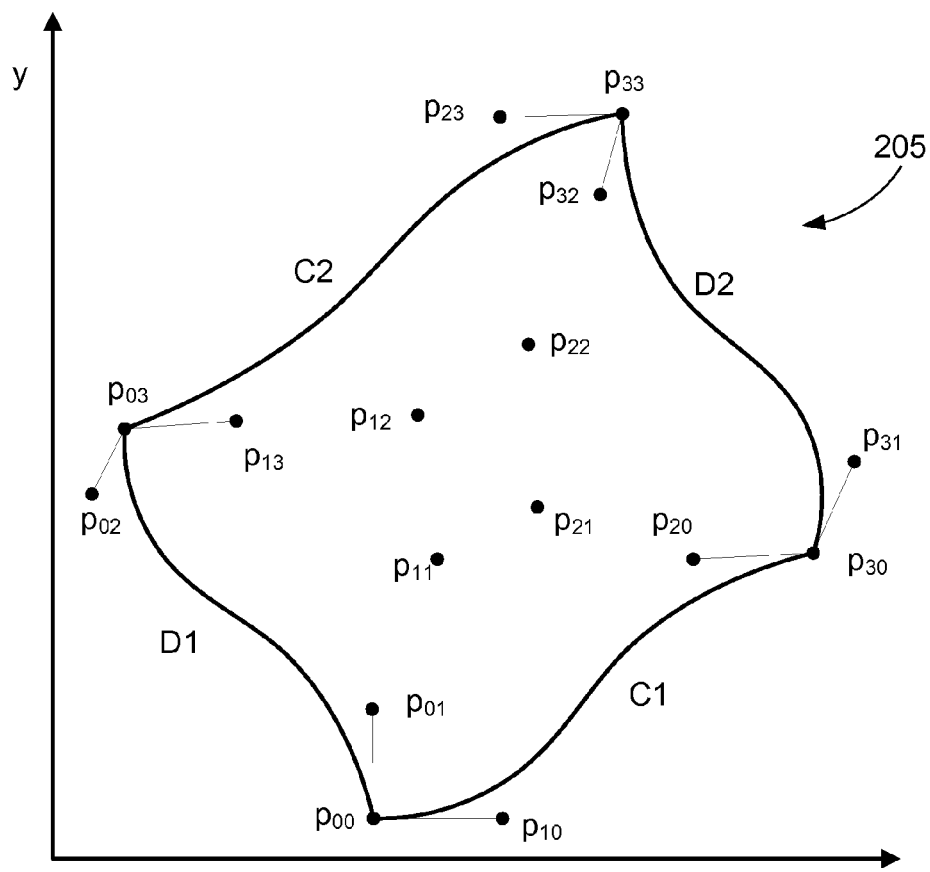

FIGS. 2A and 2B collectively show an example of a PDF type 7 shading tensor-product patch. Reference numeral 200 refers to a unit square in the uv parametric space. Reference numeral 205 represents the parametric tensor-product patch in xy space. The parametric tensor-product patch 205 is defined by sixteen (16) control points $p_{ij}$ in xy space where i and j range from zero (0) to three (3), which maps the unit square 200 to a surface S in the xy space in accordance with Equation (1), below:

$$S(u, v) = \sum_{i=0}^{3} \sum_{j=0}^{3} p_{ij} \times B_i(u) \times B_j(v) \quad (1)$$

where $B_i$ and $B_j$ are Bernstein polynomials and evaluated in accordance with Equations (2), (3), (4) and (5) by substituting a by u or v, as follows:

$$B_0(a)=(1-a)^3 \quad (2)$$

$$B_1(a)=3a \times (1-a)^2 \quad (3)$$

$$B_2(a)=3a^2 \times (1-a) \quad (4)$$

$$B_3(a)=a^3 \quad (5)$$

Since $p_{ij}$ are in xy space, as u and v vary horizontally and vertically across the unit square 200, S(u,v) defines a surface in xy space.

The tensor product patch 205 has four boundary Bézier curves, namely C1, C2, D1 and D2. In the case where a PDF shading color function is used, each corner 210, 215, 220, 225 of the unit square 200 is associated with a t-value, namely t0, t1, t2 and t3. A Coons patch is a special case of the tensor-product patch in which the four internal points ($p_{11}$, $p_{12}$, $p_{21}$ and $p_{22}$) are implicitly defined by the boundary curves.

Figure 3:
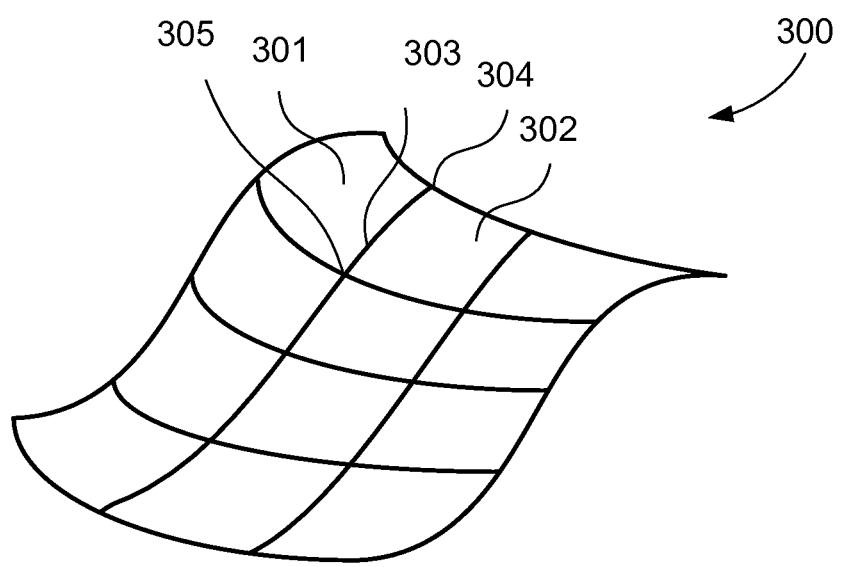
FIG. 3 shows a mesh of shading parametric patches.

PDF type 7 shading allows defining meshes of tensor product patches such as the parametric tensor-product patch 205. FIG. 3 shows a mesh 300 of twelve (12) tensor product patches. Patches 301, 302 from the mesh 300 may share a boundary curve 303 by sharing both the control points of the shared boundary curve and any t-value associated with the endpoints 304, 305 of the shared boundary curve. In PDF type 6 and type 7 shadings, using PDF shading color functions, bilinear interpolation of the t-values t0, t1, t2, t3 is used to define the t-value associated with any point within the unit square 200 in uv parametric space. The bilinear interpolation of the t-values t0, t1, t2 and t3 effectively associates a t-value with any points of the tensor product patches defined by the PDF shading. Bilinear interpolation may be determined in accordance with Equations (6), (7), (8), (9) and (10), below:

$$t(u,v)=b_1+b_2u+b_3v+b_4uv \quad (6)$$

where $$b_1=t0 \quad (7)$$

$$b_2=t3-t0 \quad (8)$$

$$b_3=t1-t0 \quad (9)$$

$$b_4=t0-t3-t1+t2 \quad (10)$$

Using Equation (6), for a constant t-value, a parametric curve may be drawn in the uv space by varying u or v or both. Such a parametric curve is referred to as an "isoline" hereafter.

In PDF type 6 and type 7 shadings using PDF shading color functions, the PDF shading color function maps the t-values into color values. Color values may be represented in color spaces such as but not limited to 3 color channel RGB (Red, Green, and Blue), 4 color channel CMYK (Cyan, Magenta, Yellow and Black), single color channel Gray. As described here, PDF shading color functions may be approximated using linear segments and error tolerances. Error tolerances may be used to specify the maximum permissible difference between the PDF shading color function and an approximation. Various methods may be used for approximating a PDF shading color function using linear segments and error tolerances. For a PDF shading color function producing a single color channel, in one arrangement a single error tolerance value may be used while for a PDF shading color function producing multiple color channels, another arrangement may use either a single or multiple error tolerance values.

Figure 4A:
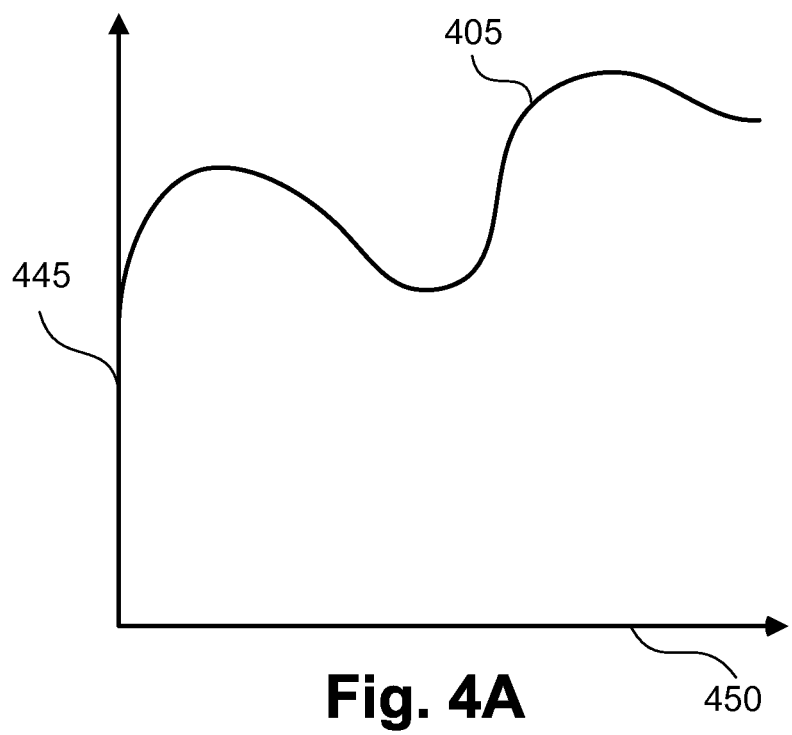
FIG. 4A shows a PDF shading color function.
Figure 4B:
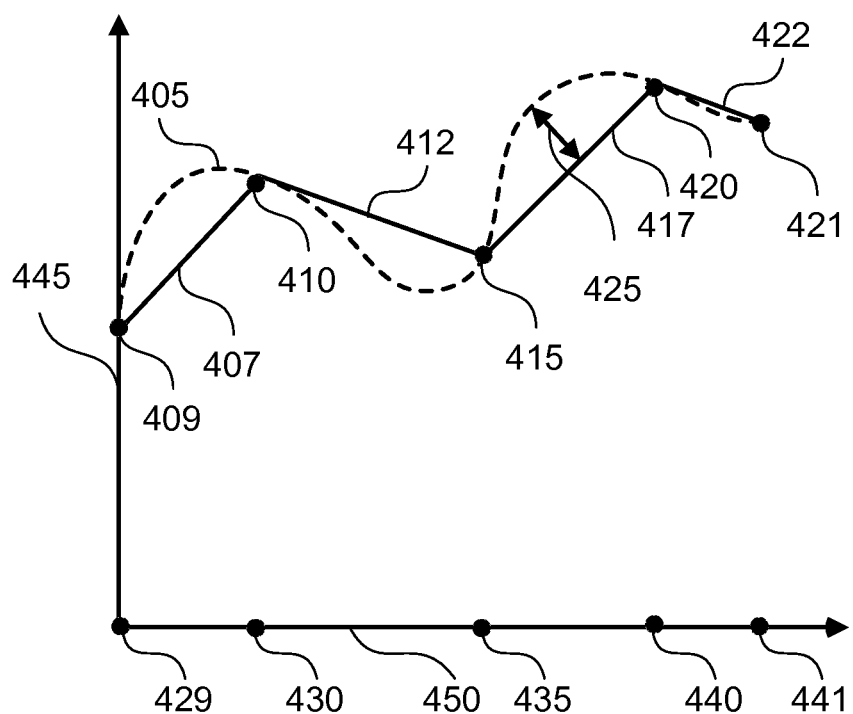
FIG. 4B shows an approximation of the PDF shading color function of FIG. 4A.

FIGS. 4A and 4B collectively illustrate an example of an approximated PDF shading color function using linear segments and a single error tolerance.

FIG. 4A shows a PDF shading color function 405 that maps t-values 450 to single channel color values 445. However, the described arrangements are not limited to shading color functions that produce single color channel output. PDF shading color functions are defined through PDF function dictionaries which are specified by the PDF ISO32000-1:2008 specification.

FIG. 4B shows an approximation of the PDF shading color function 405 using linear segments and a single error tolerance. The approximation consists of the four linear segments 407, 412, 417 and 422 which join the points 409,410, 415, 420 and 421. The maximum error 425 between the PDF shading color function 405 and associated approximation is less than the error tolerance. The sorted array of t-values at which the PDF shading color functions is sampled for the approximation is [429, 430, 435, 440, 441].

Figure 5:
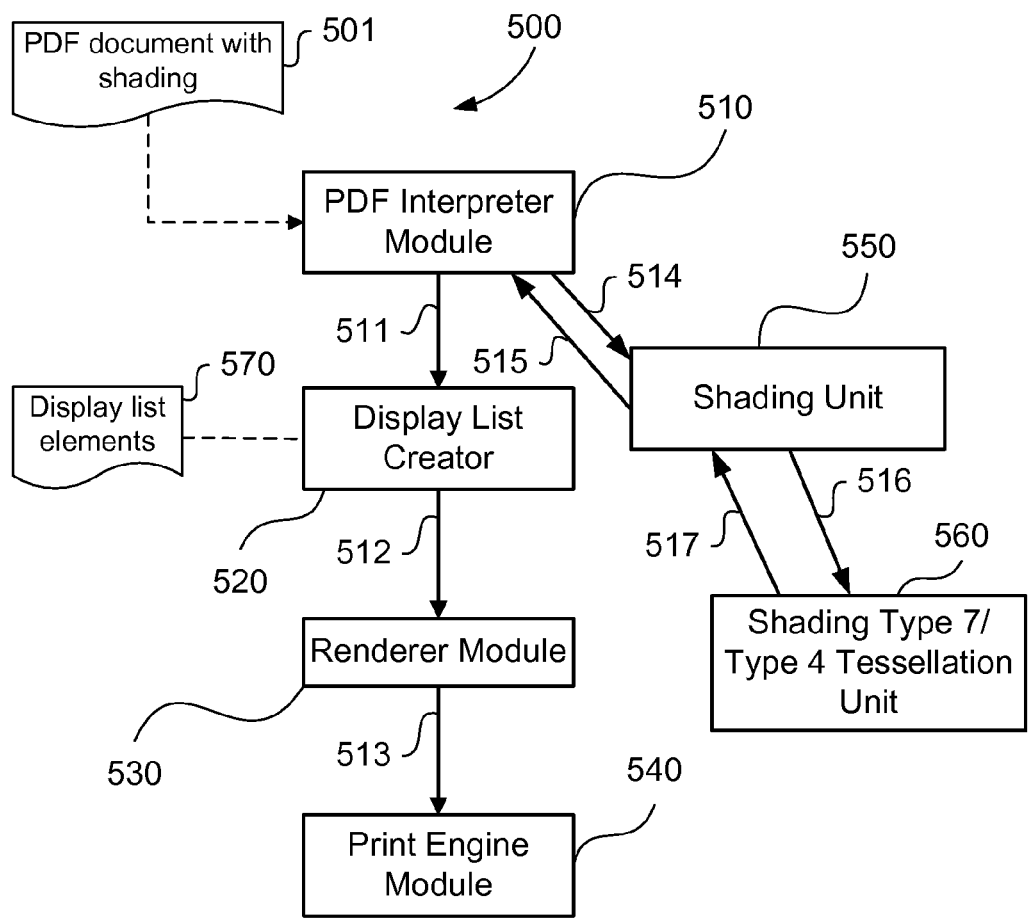
FIG. 5 shows a software architecture for use in implementing the described arrangements.

FIG. 5 shows a software architecture 500 according to one arrangement. The architecture 500 may be implemented at least in part by one or more software code modules of the software application program 133 resident on the hard disk drive 110 and being controlled in its execution by the processor 105. The program 133 may be invoked when a printing function is selected by another application (not shown) executing on the computer system 100. That other application may be any source of printable data containing a shading object, such as a word processing application, a browser, a graphics drawing package, and so forth.

The program 133 configured in accordance with the architecture 500 may operate on a page description of a page of a PDF document that is to be printed. The page to be printed may comprise PDF type 7 shading. In this regard, the program 133 may in part execute within the computer system 100 to interpret and render the page description of the PDF type 7 shading on a printer such as the printer 115.

Alternatively, one or more code modules of the software architecture 500 implementing the program 133 may execute within the printer 115 which receives a page description from the processor 105. In such an arrangement, the printer 115 may perform the document interpreting and rendering as part of a print reproduction process.

As seen in FIG. 5, a document comprising a PDF type 7 shading 501 that is submitted for printing is received by the program 133, under execution of the processor 105, and interpreted by a PDF document interpreter module 510. The PDF document interpreter 510 generates drawing commands which are sent, as depicted by an arrow 511, to a display list creator module 520. The display list creator module 520 translates the drawing commands into display list elements 570. When a display list for a single page is completed, the display list is sent, as depicted by an arrow 512 to a renderer module 530 for rendering. The display list is in a format that can be easily processed by the renderer module 530. The renderer module 530 processes the display list and generates pixel data which is sent, as depicted by an arrow 513 to a print engine module 540 executing in the printer 115 for printing the pixel data onto a hard copy medium, such as paper or film.

In one arrangement, the document interpreter module 510, the display list creator module 520 and the renderer module 530 may be implemented as one or more software code modules of the software application program 133 executable on the computer system 100. Alternatively, the document interpreter module 510, the display list creator module 520 and the renderer module 530 may be implemented as separate dedicated hardware (or hybrid hardware/software) configured and operable within the printer 115.

The PDF interpreter module 510, under execution of the processor 105, passes PDF type 7 shading data to a shading unit 550 as depicted by arrow 514. The shading unit 550 passes PDF type 7 shading dictionary and stream data to a type 7 shading tessellation unit 560 as depicted by arrow 516. As described below, in another arrangement the type 7 shading tessellation unit 560 may be a type 4 shading tessellation unit. Accordingly, the type 7 shading tessellation unit 560 will be generically referred to below as the "tessellation unit" 560 unless referred to explicitly as the type 7 shading tessellation unit.

Figure 6:
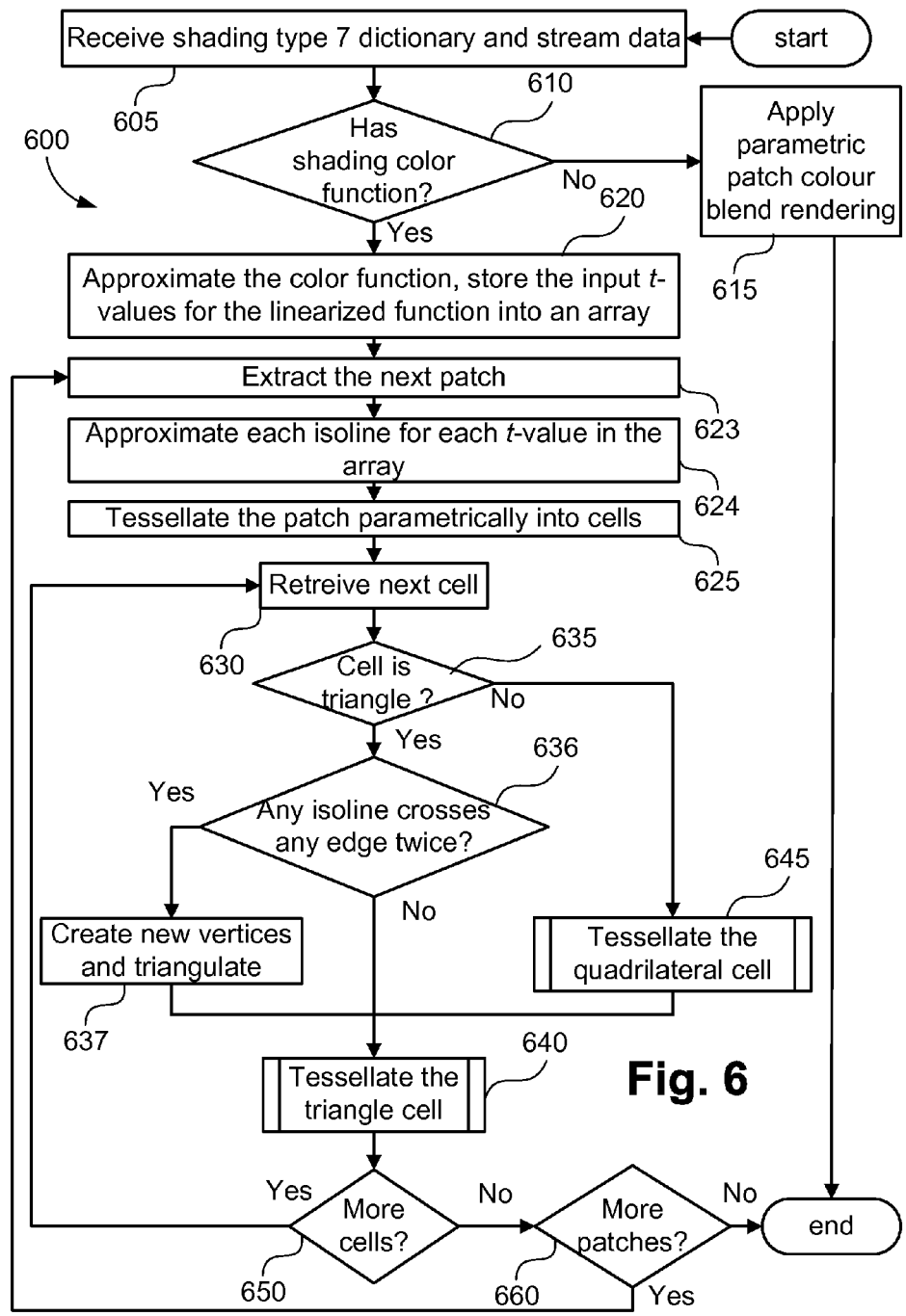
FIG. 6 is a schematic flow diagram showing a method of tessellating a shading parametric patch.

The tessellation unit 560 tessellates the shading parametric patches of the document 501 into triangles in accordance with a method 600 of tessellating a shading parametric patch as described in detail below with reference to FIG. 6. The triangles may also be referred to below as triangle cells or triangular cells. The method 600 as shown in FIG. 6 generates triangle cells one at a time. Again, the module 550 and unit 560 may be implemented as one or more software code modules of the software application program 133.

The tessellation unit 560 passes the generated triangles to the shading unit 550 as depicted by the arrow 517. The shading unit 550 generates the color associated with triangles received from the tessellation unit 560 by applying the PDF shading color function to the t-value associated with vertices of the triangle. The shading unit 550 also resolves any occlusions from overlapping triangles, resulting in generation of different triangles. In one arrangement, the resolution of occlusions is performed according to a method of rendering self-overlapping color blend patches as disclosed in Australian Patent Application No. AU 2005201933 A1, filed May 6, 2005, hereby incorporated by reference in its entirety as if fully set forth herein. The shading unit 550 passes triangles to the PDF interpreter module 510 as depicted by arrow 515. The PDF interpreter 510 passes the generated triangles to the renderer module 530 as depicted by arrow 511. The renderer module 530 fills the triangle by linear interpolation of the colors of the vertices of the triangle and then typically color converts the resulting triangle to the native color space of an output device such as the printer 115 or the display 114.

The principles of one or more of the arrangements described here have general applicability to tessellating parametric patches. However, for ease of explanation, the operation of the tessellation unit 560 is described with reference to a PDF type 7 shading tensor-product patch. Since PDF shading type 6 Coons patch is a special case of tensor-product patch, a type 7 shading tessellation unit 560 may operate on PDF type 6 shadings. The described methods may have application to other types of patches such as Coons patches or Bézier surfaces of any degree.

A vertex is a data structure containing a uv coordinate and the corresponding xy coordinate, indicating a location within a parametric patch. The uv coordinate represents a pair of values in which one value is the u coordinate and other value is the v coordinate in uv parametric space. The xy coordinate represents a pair of values in which one value is the x coordinate and other value is the y coordinate in xy output space. A vertex also contains a t-value. The t-value of a vertex that is not the corner of a patch or a vertex of an approximated isoline is computed using the bilinear interpolation Equations (6), (7), (8), (9) and (10). The t-value of the corner vertices of a patch are supplied by the shading stream and the t-values of the vertices of an approximated isoline are same as the t-value of the isoline.

A stack is a data structure in which items may be inserted one at a time in an operation called a "push", and items may be taken away one at time by an operation called a "pop". The stack operates in a last in a first out (LIFO) manner in which the last item pushed is always the first item to be popped.

The method 600 of tessellating a shading parametric patch, will now be described in detail below with reference to FIG. 6. The method 600 extracts (or "reads") tensor-product patches from the PDF type 7 shading data stream and tessellates each tensor-product patch. If a shading color function is present in a PDF type 7 shading then the patches have t-values for their corners. The PDF shading color function is approximated using linear segments for a given error tolerance in accordance with the method 600. As part of the approximation, a set of t-values (or "intermediate values") making up the approximation is determined. As described below, the set of t-values (or "intermediate values") may in the form of a sorted array. The sorted array of t-values is referred to as the "PDF shading color function approximation" array hereafter and represents an approximation of the PDF shading color function by linear segments. The isolines corresponding to each t-value in PDF shading color function approximation array are used for tessellating the patches of the shading.

The method 600 tessellates a tensor-product patch geometrically into triangle cells or quadrilateral cells or both. The quadrilateral cells are further tessellated into triangle cells geometrically along a diagonal. The geometric tessellation method 600 may generate degenerate triangle or quadrilateral cells having no area. The degenerate triangle cells or quadrilateral cells are not considered for further processing.

Figure 7:
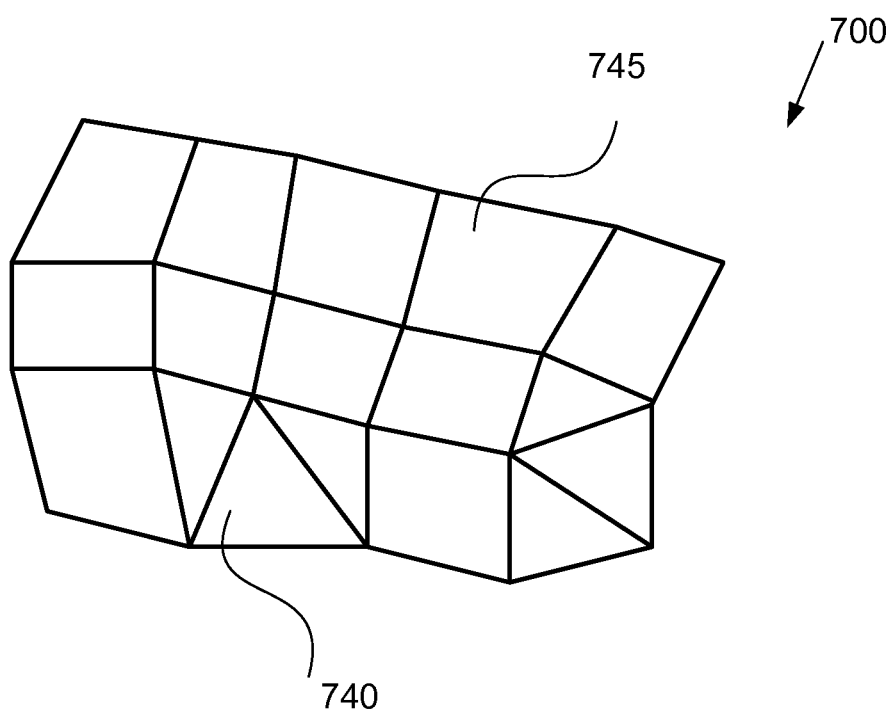
FIG. 7 illustrates an example of a geometric tessellation of a shading parametric patch into cells.

FIG. 7 shows an example tessellation of a parametric shading patch 700 in accordance with a patch geometry within a tolerance. FIG. 7 shows an example triangle cell 740 with three (3) vertices. An example quadrilateral cell 745 with four (4) vertices is also shown.

Figure 10:
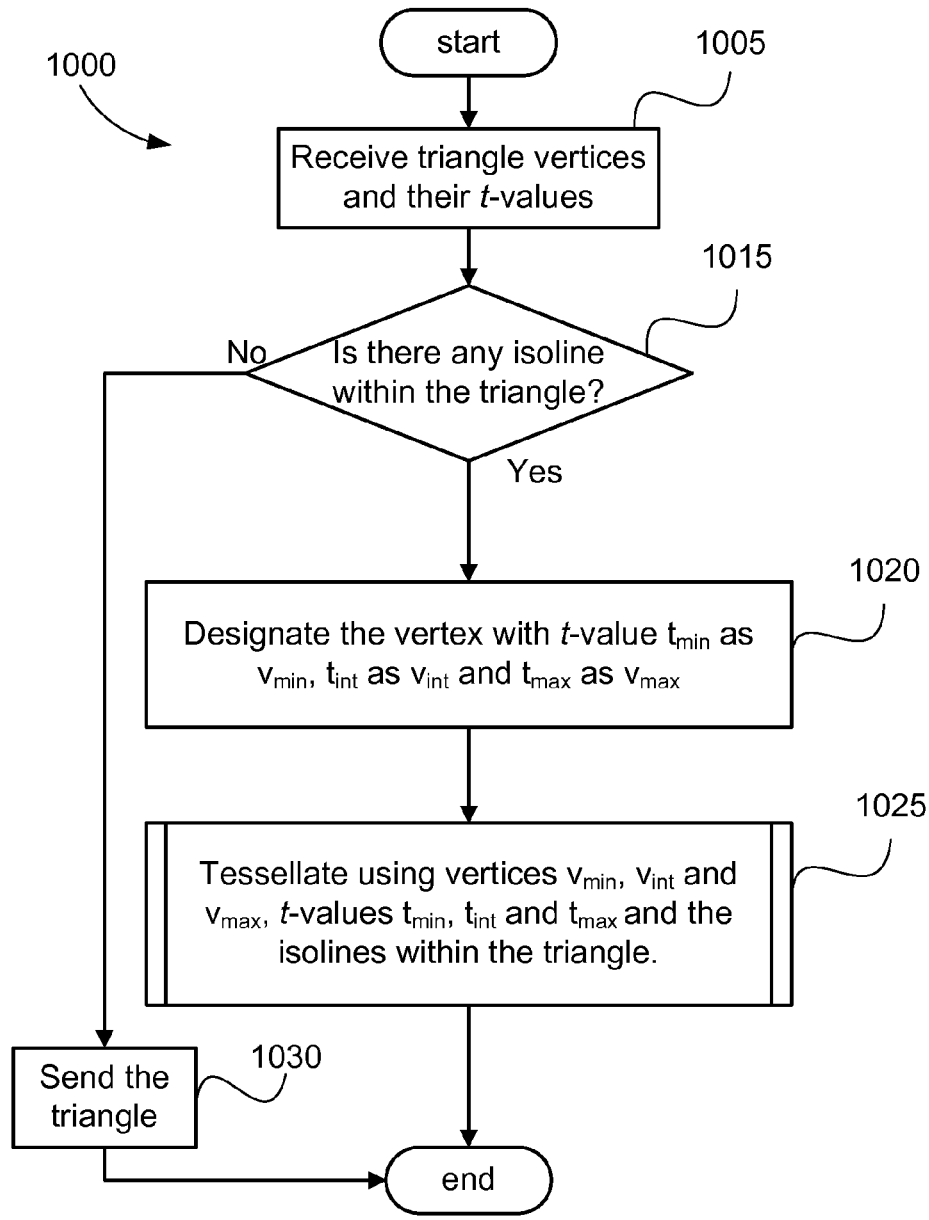
FIG. 10 is a schematic flow diagram showing a method of tessellating triangles, as executed in the method of FIG. 6.

A method 1000 of tessellating triangle cells will be described in detail below with reference to FIG. 10. The method 1000 further processes each triangle cell generated by the method 600. The method 1000 determines the minimum t-value, $t_{min}$, and maximum t-value, $t_{max}$, of the vertices of the triangle cell, and designates the t-value of the remaining vertex as $t_{int}$. The method 1000 also designates the vertices corresponding to $t_{min}$, $t_{int}$ and $t_{max}$ as $v_{min}$, $v_{int}$ and $v_{max}$ respectively. The triangle cell is decomposed into various objects using the isolines having a t-value belonging to the PDF shading approximation array, within the triangle cell (i.e., the isolines having t-values which are less than $t_{max}$ and greater than $t_{min}$). An isoline, with t-value $t_{min}$, touching vertex $v_{min}$ will not be considered for decomposition. Similarly any isoline with t-value $t_{max}$ will not be considered.

The presence of an isoline having t-values belonging to the PDF shading approximation array, within the interior region of a triangle cell, may be used in one arrangement to decompose the triangle. The presence of such an isoline indicates that if the triangle cell is linearly interpolated using the color values of the vertices of triangle cell then a region in the triangle cell may have a maximum color difference equal to or greater than the tolerance value that is used to approximate the shading color function. For such cases, the triangle cell is further decomposed into triangles to achieve smooth color gradation.

The triangle cell is decomposed into one or more regions, such that the perimeter of each region is comprised of one or more segments of the sides of the triangle cell, and one or more segments of isolines that pass through the interior region of the triangle cell. The decomposition of the triangle cell results in at most four categories of objects being generated. If there is no isoline within the interior region of the triangle cell then no further tessellation is needed and the triangle cell may be stored within the memory 106 for further processing or output. The colors of the vertices are calculated using t-values of the vertices and the shading function. The colors of the three vertices are linearly interpolated to fill the triangle in the xy output space.

For the vertex $v_{min}$, there are two types of objects possible depending on the t-value of the isoline that is within the triangle and nearest to $v_{min}$. If the t-value of a nearest isoline is less than or equal to $t_{int}$ then the object is defined as category one (1). If the t-value of the nearest isoline is greater than $t_{int}$ then the object is defined as category two (2) in which $v_{int}$ is also a vertex. For the vertex $v_{min}$, a category 1 object may be represented by the triangle vertex $v_{min}$ and the two vertices that are constructed by the intersection of the approximated isoline with the triangle edges. For the vertex $v_{min}$, a category 2 object may be represented by the triangle vertex $v_{min}$, $v_{int}$ and the two vertices that are constructed by the intersection of the approximated isoline with the triangle edges.

Similarly, for the vertex $v_{max}$, there are two types of objects possible depending on the t-value of the isoline that is within the triangle and nearest to $v_{max}$. If the t-value of the nearest isoline is greater than or equal to $t_{int}$ then the object is defined as category 1. If the t-value of the nearest isoline is less than $t_{int}$ then the object is defined as category 2 in which $v_{int}$ is also a vertex. For the vertex $v_{max}$, a category 1 object may be represented by the triangle vertex $v_{max}$ and the two vertices constructed by the intersection of the approximated isoline with the triangle edges. For the vertex $v_{max}$, a category 2 may be represented object by the triangle vertex $v_{max}$, $v_{int}$ and two of the vertices constructed by the intersection of the approximated isoline with the triangle edges.

The objects formed by any successive two isolines having t-values are less than or equal to $t_{int}$ are defined as category 3. The objects formed by any successive two isolines having t-values that are greater than or equal to $t_{int}$ are also defined as category 3. A category 3 object may be represented by four vertices constructed by the intersection of two approximated isolines with the triangle edges. The object formed by two isolines in which one isoline has t-value less than $t_{int}$ and the other isoline has t-value greater than $t_{int}$ is defined as category 4. A category 4 object may be represented by the four vertices constructed by the intersection of the two approximated isolines with the triangle edges and the vertex $v_{int}$. The category 4 object is further decomposed into two objects, a triangle and a category 3 object, by joining the two vertices for the intersection of approximated isolines on the edges $v_{int}v_{min}$ and $v_{int}v_{max}$ by a straight line. A pair of vertices is used to represent a straight line or segment joining two vertices.

Figure 11A:
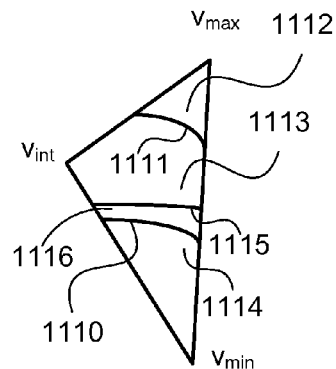
FIG. 11A shows categories of an object which can be formed using isolines and edges of a triangle.
Figure 11B:
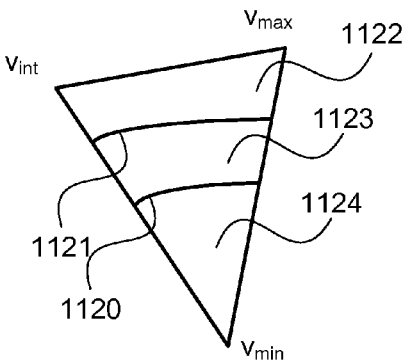
FIG. 11B shows other categories of an object which can be formed using isolines and edges of a triangle.

FIGS. 11A and 11B collectively show possible categories of an object which can be formed using isolines and edges of a triangle.

As shown in FIG. 11A, isoline 1110 and the vertex $v_{min}$ form a category 1 object 1114, isoline 1110 and 1115 form a category 3 object 1116, the vertex $v_{int}$ and the isolines 1115 and 1111 form a category 4 object 1113, isoline 1111 and vertex $v_{max}$ form a category 1 object 1112.

As shown in FIG. 11B, isoline 1120 and the vertex $v_{min}$ forms a category 1 object 1124, isoline 1120 and 1121 forms a category 3 object 1123, vertex $v_{int}$, vertex v and isolines 1121 form a category 2 object 1122.

Objects of all categories are further tessellated into triangles such that each triangle may be filled by linearly interpolating the color values of the vertices of each triangle. Processing steps for tessellating a triangle cell are shown in FIGS. 12, 13, 14, 15, 16, 17, 18, 19 and 20.

For all categories of an object, vertices for the intersection of approximated isolines and edges of a triangle are also determined and used as an additional tessellation point. As described below, in one or more of the described methods, an intersection point between one of the isolines and at least one linear segment joining two vertices of one of the cells (i.e., triangle or quadrilateral cell) is determined. The intersection point may be added as an additional tessellation point to the cell. As also described, one or more of the described methods may be used for generating a triangle cell from vertices of at least one of the cells and points joined by linear segments joining the additional tessellation points.

As seen in FIGS. 11A and 11B, for category 1 objects, tessellation is further carried out by joining a triangle vertex, $v_{min}$ or $v_{max}$, to vertices of straight segments of an approximated isoline resulting in a triangulation of the object. Generated triangles may be stored within the memory 106 for further processing or output. A pair of vertices may be used to represent a straight line or segment joining two vertices.

For category 2 objects, tessellation is further carried out by joining triangle vertex, $v_{min}$ or $v_{max}$, to vertices of straight segments of an approximated isoline starting from an end opposite to $v_{int}$ until half of the straight segments are connected. The vertex $v_{int}$ is then connected to remaining straight segments resulting in a triangulation of the object. Generated triangles may be stored in the memory 106 for further processing or output.

For category 3 objects, tessellation is carried out by forming a quadrilateral using linear segments of two approximated isolines starting from the same end of two approximated isolines. Tessellation starts by picking two straight segments, one from each of two approximated isolines, and forming a quadrilateral. The formed quadrilateral is tessellated into triangles by joining one diagonal of the quadrilateral. Tessellation continues by picking two straight segments, one from each of two approximated isolines and forming a quadrilateral. If the straight segments of both isolines finish at the same time then no further processing takes place. If one approximated isoline finishes and the other approximated isoline is not finished, then the last vertices of the finished isoline and the remaining straight segments of the unfinished approximated isoline are tessellated in a similar manner as a category 1 object as described above. The generated triangles may be stored in memory 106 for further processing or output.

A category 4 object is further decomposed into two objects, a triangle and a category 3 object, by joining two vertices for the intersection of approximated isolines on edges $v_{int}v_{min}$ and $v_{int}v_{max}$ by a straight segment.

Figure 11C:
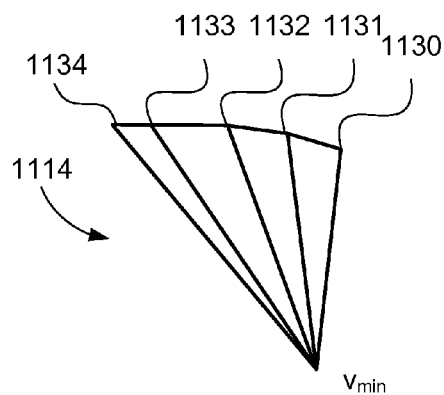
FIG. 11C shows an example of tessellation of a category 1 object.

FIG. 11C is an example of tessellation of a category 1 object. The vertices of the straight segments approximating isoline 1110 are 1131, 1132 and 1133. The vertices 1130 and 1134 are constructed by intersecting segments approximating isoline 1110 with triangle edges. The vertex $v_{min}$ is joined to 1130, 1131, 1132, 1133 and 1134 to form a triangulation.

Figure 11D:
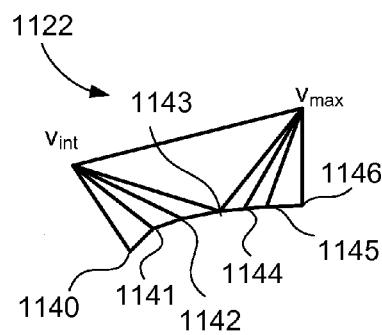
FIG. 11D shows an example of tessellation of a category 2 object.

FIG. 11D is an example of tessellation of a category 2 object. The vertices of straight segments approximating isoline 1121 are 1141, 1142, 1143, 1144 and 1145. Vertices 1140 and 1146 are constructed by intersecting segments approximating isoline 1121 with triangle edges. The vertex $v_{int}$ is joined to 1140, 1141, 1142 and 1143, and the vertex $v_{max}$ is joined to 1143, 1144, 1145 and 1146 to form a triangulation.

Figure 11E:
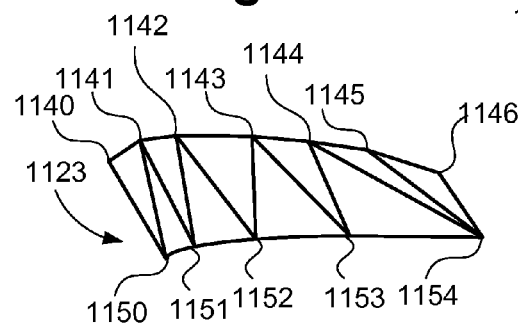
FIG. 11E shows an example of tessellation of a category 3 object.

FIG. 11E shows an example tessellation of a category 3 object. The vertices of the straight segments approximating isoline 1121 are 1141, 1142, 1143, 1144 and 1145. The vertices 1140 and 1146 are constructed by intersecting the segments approximating the isoline 1121 with the triangle edges. The vertices of the straight segments approximating the isoline 1120 are 1151, 1152, and 1153. The vertices 1150 and 1154 are constructed by intersecting the segments approximating the isoline 1120 with the triangle edges. A triangulation is formed by forming quadrilaterals starting from vertices 1140, 1150, 1151 and 1141 and finishing with vertices 1143, 1153, 1154 and 1144, and dividing the quadrilaterals along a diagonal. Remaining vertices 1145 and 1146 are joined to 1154 to complete the triangulation.

Figure 11F:
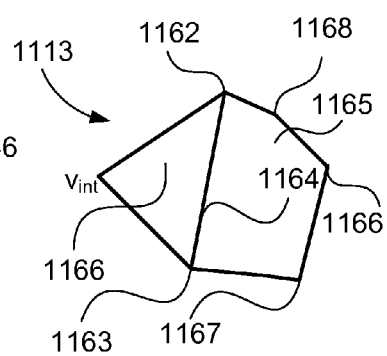
FIG. 11F is an example of tessellation of a category 4 object.
Figure 12:
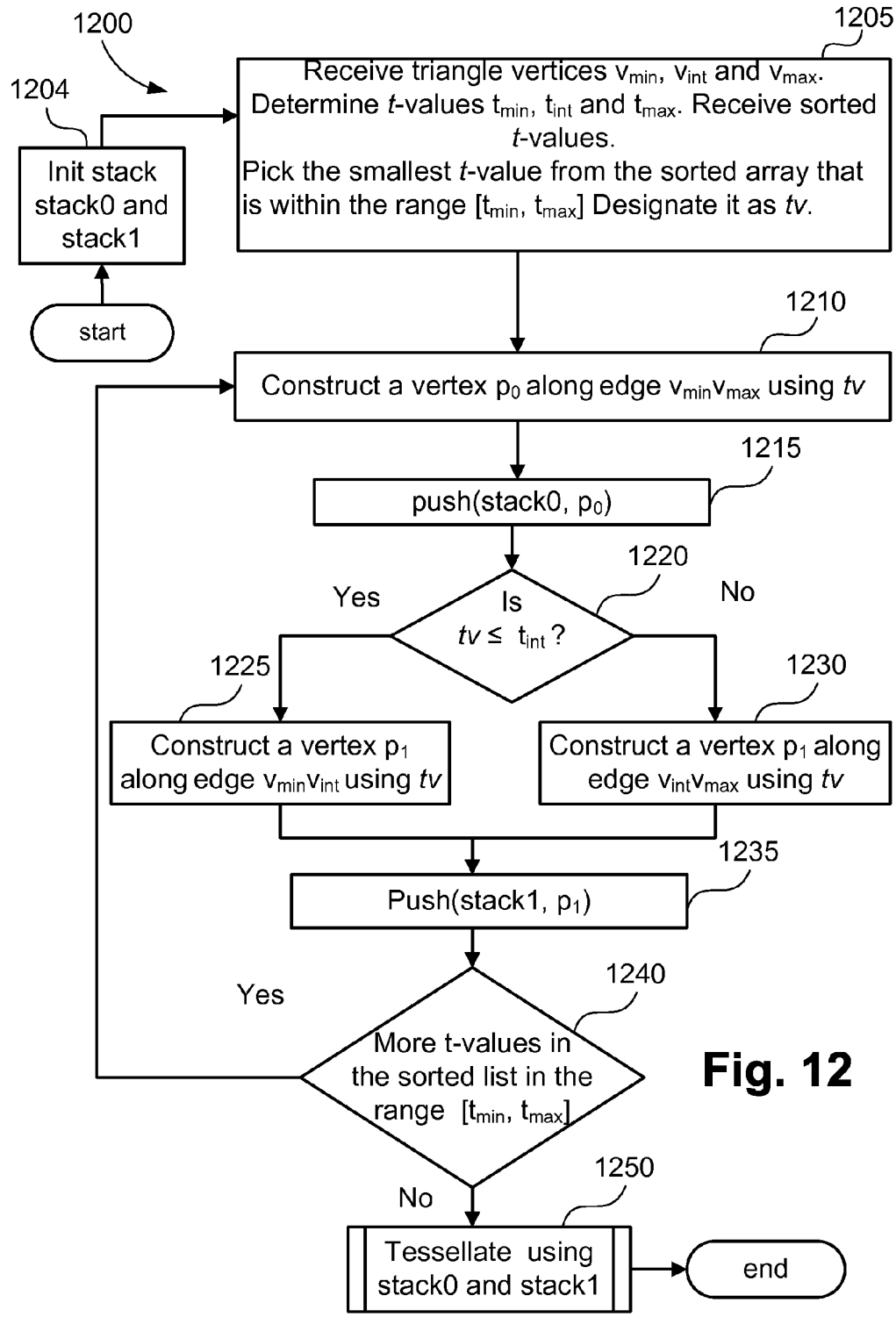
FIG. 12 is a schematic flow diagram showing a method of tessellating a triangle using isolines, as executed in the method of FIG. 10.
Figure 13:
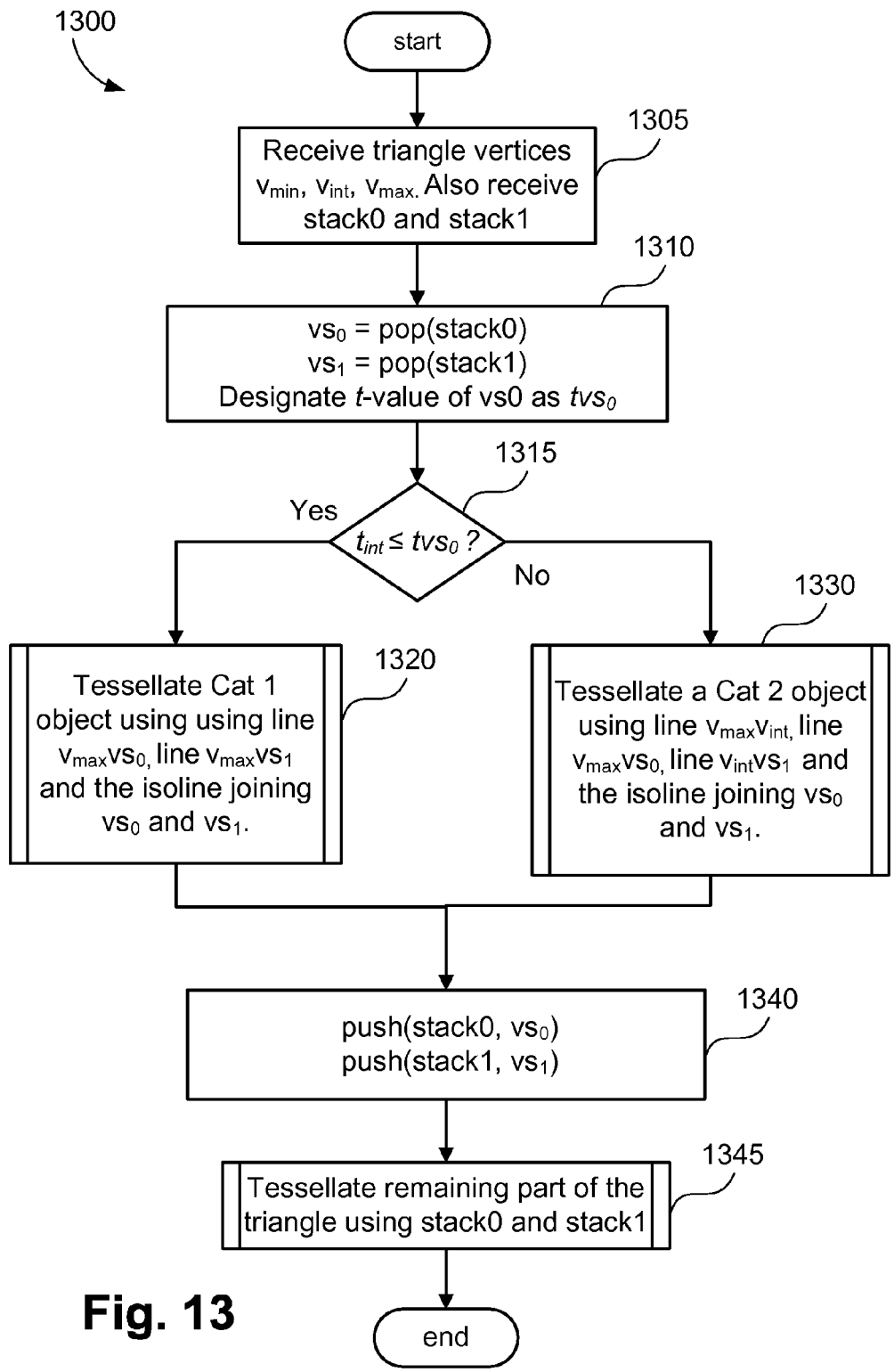
FIG. 13 is a schematic flow diagram showing a method of tessellating a triangle, as executed in the method of FIG. 12.

FIG. 11F is an example of tessellating a category 4 object. The vertex of straight segments approximating isoline 1111 is 1168. Vertices 1162 and 1166 are constructed by intersecting segments approximating isoline 1111 with triangle edges. Vertices 1163 and 1167 are constructed by intersecting the segments approximating isoline 1115 with the triangle edges. Vertices 1162 and 1163 are joined by straight line 1164, thus generating an approximated category 3 object 1165 and a triangle 1166.

The method 600 may be implemented as one or more software code modules of the software application program 133 resident in the hard disk drive 110 and being controlled in its execution by the processor 105.

The method 600 may be used to render a region of shaded color specified in terms of a color blend across a parametric patch. As described, the patch is defined by a geometry and a color varying according to a surface mapping points of the patch to intermediate values. Each of the intermediate values being mapped to a color value according to a PDF shading color function. The patch to be tessellated may belong to a larger mesh of patches. The method 600 divides a shading patch, or each individual patch of a mesh of patches, into triangles, such that each triangle can be filled by linear interpolation of color values of three triangle vertices. As described below, the method 600 may be used in rendering the patch using the t-values (or "intermediate values") corresponding to the vertices of each cell formed, where the cells may be formed by one or more of the triangles.

The triangles generated in accordance with the method 600 described herein may be rendered into pixels using known rendering methods.

The method 600 begins at receiving step 605, where the processor 105 receives a PDF shading dictionary for type 7 shading and stream data from shading unit 550. The PDF shading dictionary and stream data may be stored by the processor 105 in the memory 106. The content of the PDF shading dictionary and stream data is specified by the PDF specification. In particular, the PDF shading dictionary contains information about any PDF shading color function used and the PDF shading stream data contains the geometry of a mesh of tensor product patches.

After receiving the PDF shading dictionary and stream data, the method 600 proceeds to decision step 610, where if the processor 105 determines that the shading uses a PDF shading color function, then the method 600 proceeds to approximating step 620. Otherwise, if it is determined that the shading does not use a PDF shading color function, then the method 600 proceeds to generating step 615 instead.

At step 615, triangles are generated. Any suitable method may be used for generating the triangles at step 615. In one arrangement, the method of parametric patch color blend rendering disclosed in Australian Patent Application No. AU 2005201932, filed May 6, 2005, hereby incorporated by reference in its entirety as if fully set forth herein, may be used to generate the triangles at step 615. In the arrangement using the parametric patch color blend rendering method disclosed in Australian Patent Application No. AU 2005201932, the parametric patch is tessellated into a grid of quadrilateral cells according to a first and second determined tessellation step, and a color value is determined for each cell vertex. The tessellated grid of cells may yield triangles by joining the diagonal of each cell. The resulting triangles are then adjusted at regions in which neighbouring patches of the mesh of patches adjoin in order to avoid cracks between the neighbouring patches. The triangles generated at step 615 are passed to shading unit 550. The method 600 then finishes after performing step 615.

At step 620, the PDF shading color function is approximated using linear segments for a given error tolerance. The approximation of the PDF shading color function is illustrated in FIG. 4B. As part of the approximation performed at step 620, a set of t-values (or "intermediate values") making up the approximation is determined. The t-values are therefore configured for representing the approximation of the PDF shading color function by linear segments. The set of t-values (or "intermediate values") may in the form of a sorted array. The sorted array of t-values may be stored by the processor 105 within the memory 106. The sorted array of t-values is referred to below as "the PDF shading color function approximation array". As an example, in FIG. 4B, the PDF shading function approximation array is [429, 430, 435, 440, 441]. After step 620 the method 600 then proceeds to extracting step 623.

At step 623, the processor 105 is used for receiving the first tensor product patch in the mesh by extracting information about the first tensor product patch from the data stream received at step 605. The extracted information comprises the sixteen (16) control points of the first tensor product patch, and the t-values associated with each corner of the first tensor product patch.

As described below, the method 600 is configured for forming a further cell for the patch extracted at step 623 by joining, within each cell of the patch, a plurality of the tessellation points being of equal t-value and approximating isolines of the surface of the patch. In particular, after step 623, the method 600 proceeds to approximating step 624 in which isolines for each t-value in the PDF shading function approximation array are approximated.

Similarly to the approximation of the PDF shading function, for each isoline, a sorted array of (u,v)-values is produced.

Each array of (u,v) values is an approximation of a specific isoline as follows:
For each (u,v) value in the array, (u,v) is a point on the isoline, and,
For two (2) consecutive (u,v) values in the array, the isoline is approximated by a segment joining the two (2) values in uv space.

After performing step 624, the method 600 proceeds to tessellating step 625 in which the processor 105 is used for parametrically tessellating the tensor-product patch into a plurality of cells approximating the tensor-product patch. Each of the cells is a triangle (or triangular) cell or a quadrilateral cell. The tessellation is performed using a fixed tessellation step in both the u and v parametric coordinate direction of the uv space, and adjusting resulting cells to avoid cracks between adjacent patches within the mesh. As described below, also at step 625, the processor 105 is used for determining the tessellation step for the tensor-product patch in each parametric coordinate direction as a function of the patch geometry and a tolerance value. The tensor-product patch is parametrically tessellated into cells using the tessellation steps in each parametric coordinate direction.

Any suitable method may be used for performing the tessellation at step 625. In one arrangement, the tessellation method disclosed in Australian Patent Application No. AU 2005201932 is used for performing the tessellation at step 625. In the arrangement using the tessellation method disclosed in Australian Patent Application No. AU 2005201932, the parametric patch is tessellated into a grid of quadrilateral cells according to a first and second determined tessellation step, and a color value is determined with each cell vertex. The tessellated grid of cells may yield triangles by joining the diagonal of each cell. The resulting triangles are then adjusted at regions in which neighbouring patches of the mesh of patches adjoin in order to avoid cracks between the neighbouring patches.

For each cell, the coordinates of corners of the cell, in both the uv space and the xy space, are determined at step 625. The t-values associated with each corner of the cell are also determined. The coordinate and t-value information determined at step 625 may be stored by the processor 105 in the memory 106. The corners of the cell are also called the vertices of the cell. Any other method of tessellating tensor product patches may be used at step 625. In an alternative arrangement, the tensor-product patch is tessellated into triangular and quadrilateral grid cells, one cell at a time, using the recursive De Casteljau's algorithm.

After step 625, the method 600 proceeds to retrieving step 630 in which the cell information (i.e., coordinate and t-value information) determined at step 625 is retrieved by the processor 105, from the memory 106, for example. In a first invocation of step 630, cell information of a first cell is retrieved and any subsequent invocations of the step 630 retrieves cell information for a next cell.

After step 630, the method 600 proceeds to decision step 635, where the processor 105 is used to determine whether the cell for which the cell information was retrieved at step 630 is a triangle. If it is determined at step 635 that the cell is a triangle then the method 600 proceeds to decision step 636. Otherwise, the cell is a quadrilateral and the method 600 proceeds to step 645.

At decision step 636, the processor 105 is used for determining if any isoline (or at least one of the isolines) crosses (i.e., intersects) any linear segment forming an edge of the triangle cell twice. The determination is made at step 636 by considering the equation of the isolines and the edges of the triangle. In one arrangement, the intersection of the isolines and the edges is checked in the uv space. If it is determined that any isoline crosses any edge of the triangle cell twice, then the method 600 proceeds to creating step 637. Otherwise, the method 600 proceeds to step 640.

At step 637, the method 600 iterates through the isolines which cross the triangle cell. For each edge of the triangle cell and for each isoline which crosses the triangle cell, the method 600 determines whether the isoline intersects the edge of the triangle cell twice and if the isoline does intersect the edge of the triangle cell twice, the method 600 determines the distance, in uv space, between the two (2) intersection points.

At step 637, the isoline with the minimum distance between the two (2) intersection points is selected and a new vertex which is the midpoint of the segment joining the two (2) intersection points in uv space is constructed. The coordinate of the new vertex in xy space is obtained through the equation of the tensor-product patch read at step 623 and an associated t-value from the bilinear interpolation equation. After creating new vertices, three possible cases are processed at step 636 as follows:

Case 1: one new vertex is created. The new vertex is connected to the opposite triangle vertex to split the original triangle into two triangles. The new vertex may be referred to as a "splitting" vertex.

Case 2: two new vertices are created. The two new vertices (i.e., splitting vertices) are connected to split the original triangle into a triangle and a quadrilateral. The quadrilateral is further split into two triangles by joining one diagonal of the quadrilateral.

Case 3: three new vertices are created. The three new vertices (i.e., splitting vertices) are connected to each other to split the original triangle into four new triangles. Again, the three new vertices may be referred to as "splitting" vertices.

Accordingly, the method 600 is configured for adding the splitting vertex or vertices to a triangle depending on the determination made at step 636.

For each triangle generated in step 637, the method 600 invokes the step 640.

At tessellating step 645, the process 600 tessellates the quadrilateral cell further into triangles. A method 800 of tessellating a quadrilateral into triangles, as executed at step 645, will be described in detail below with reference to FIG. 8. The processing of step 645 will further be explained in with reference to FIG. 8. For each triangle generated in step 645, the process 600 invokes the step 640.

At tessellating step 640, the processor 105 is used to tessellate the triangle further into triangles in accordance with the method 1000 which will be described in detail below with reference to FIG. 10. After completing step 640, the method 600 proceeds to decision step 650.

At decision step 650, if there are more cells to process for the current patch being tessellated then the method 600 returns to step 630 where a next cell is retrieved. Otherwise, if it is determined that there are no more cells to be processed for the current patch, then the method 600 proceeds to decision step 660. At decision step 660, if it is determined that there are more patches in the shading stream received at step 605 to be processed, then the method 600 returns to step 623. Otherwise, if it is determined at the decision step 660 that there are no more patches to process then the method 600 finishes. At this point, every patch in the PDF shading object has been divided into cells that have, in turn, been tessellated into triangles suitable for linear rasterization.

A method 800 of tessellating a quadrilateral cell into triangles, as executed at step 645, will be described in detail below with reference to FIG. 8.

The method 800 of tessellating a quadrilateral cell into triangles, as executed at step 645, will be described in detail below with reference to FIG. 8. The method 800 is invoked at step 645 of the method 600. The method 800 may be implemented as one or more software code modules of the software application program 133 resident in the hard disk drive 110 and being controlled in its execution by the processor 105.

The method 800 begins at receiving step 805, in which the coordinates of the vertices in both uv and xy space and the associated t-values of the cell retrieved at step 630 are received using the processor 105. The coordinates and associated t-values may be stored by the processor 105 in the memory 106. The vertices of the cell are designated as adjacent if the vertices are connected by one of the straight edges of the cell and as diagonally opposite otherwise.

After step 805, the method 800 proceeds to designating step 810 where vertices are designated as $v_0$, $v_1$, $v_2$ and $v_3$ as follows:

The vertex which has the minimum value for both the u and v coordinate amongst the four (4) vertices is designated $v_0$. The tessellation method used in step 625 generates such a vertex.

The vertex diagonally opposite to $v_0$ is designated $v_2$.

The vertex adjacent to $v_0$ with larger v coordinate value is designated $v_1$.

The other vertex adjacent to $v_0$ is designated $v_3$.

After step 810, the method 800 proceeds to determining step 820, where the processor 105 is used to determine if the diagonal $v_0v_2$ needs to be split into two segments. If the diagonal $v_0v_2$ needs a split, the processor 105 is used at step 820 to determine the vertex $v_{split}$ point at which the split should be done. The determined vertex $v_{split}$ point may be stored by the processor 105 in the memory 106. A method 900 of determining the diagonal split point of a quadrilateral cell, as executed at step 820, will be described in detail below with reference to FIG. 9.

After step 820, the method 800 proceeds to decision step 825. At step 825, if the diagonal $v_0v_2$ needs a split, then the method 800 proceeds to designating step 835. Otherwise, if the diagonal $v_0v_2$ does not need a split, then the method 800 proceeds to splitting step 830.

At step 830, the following two triangles are constructed:
triangle T1 with vertices $v_0$, $v_1$ and $v_2$, and
triangle T2 with vertices $v_0$, $v_3$ and $v_2$ Following step 830, the method 800 finishes.

At step 835, the following four triangles are constructed:
triangle T1 with vertices $v_0$, $v_1$ and $v_{split}$, and
triangle T2 with vertices $v_1$, $v_2$ and $v_{split}$, and
triangle T3 with vertices $v_2$, $v_3$ and $v_{split}$, and
triangle T4 with vertices $v_3$, $v_0$ and $v_{split}$ Following step 835, the method 800 finishes.

Figure 9:
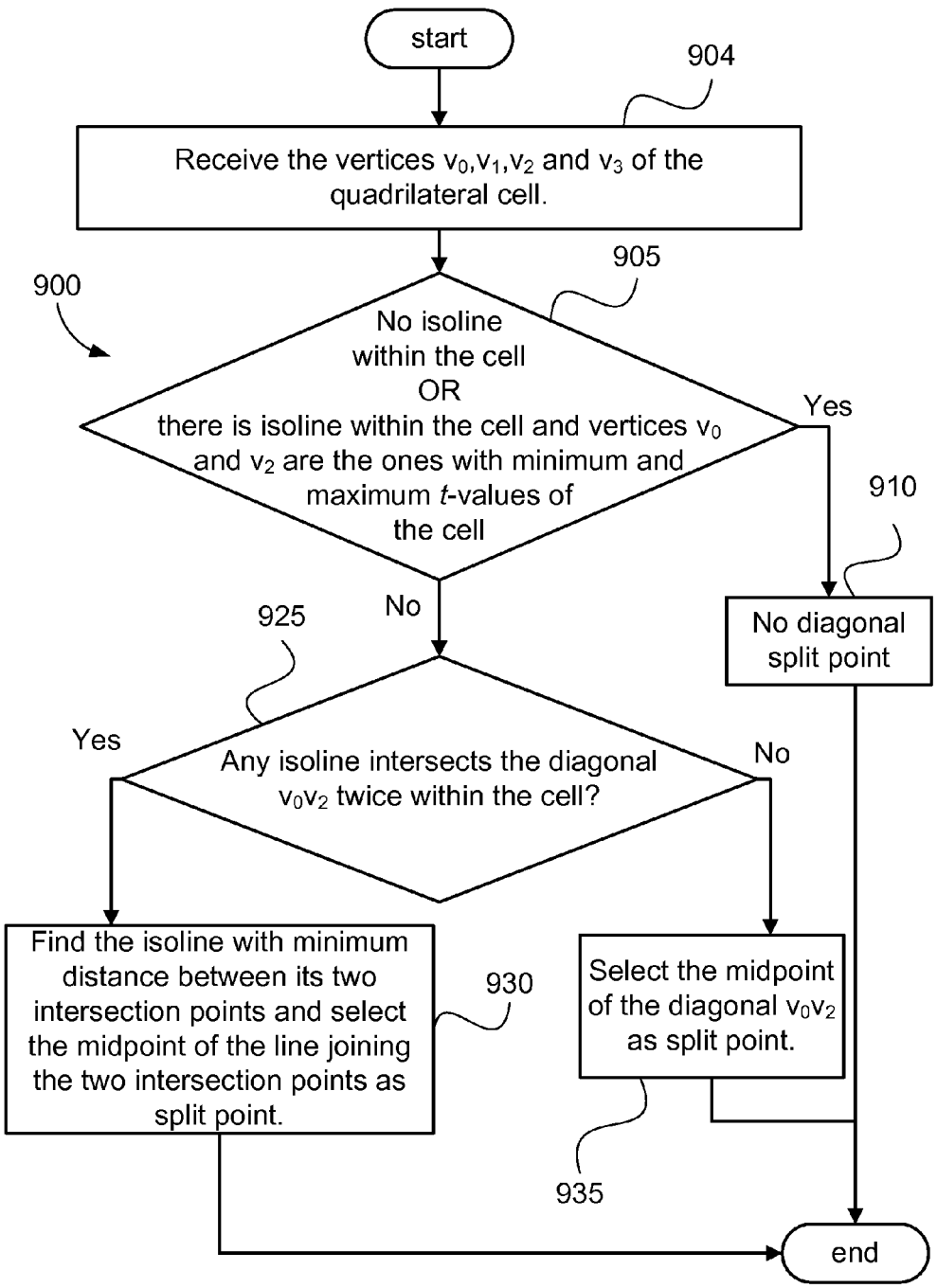
FIG. 9 is a schematic flow diagram showing a method of determining the diagonal split point of a quadrilateral cell, as executed in the method of FIG. 8.

The method 900, as shown in FIG. 9, determines if the diagonal $v_0v_2$ of a quadrilateral cell needs to be split and if the diagonal $v_0v_2$ of a quadrilateral cell needs to be split, then the method 900 determines the vertex $v_{split}$ point at which the split should be done. The method 900 may be implemented as of one or software code modules of the software application program 133 resident in the hard disk drive 110 and being controlled in its execution by the processor 105.

Figure 8:
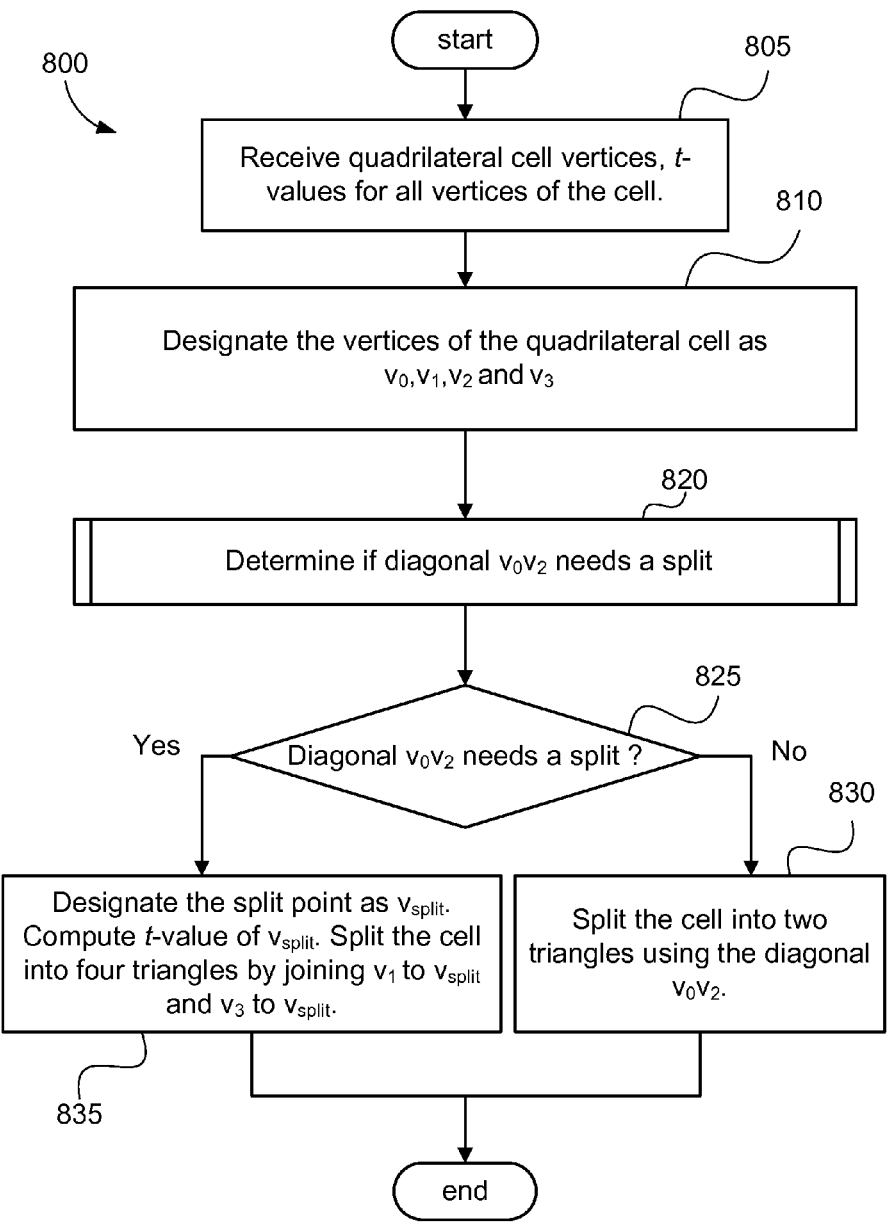
FIG. 8 is a schematic flow diagram showing a method of tessellating a quadrilateral cell into triangles using diagonal and split points on a diagonal, as executed in the method of FIG. 6.

The method 900 begins at receiving step 904, where vertices $v_0$, $v_1$, $v_2$ and $v_3$ of the quadrilateral cells, which were designated at step 810 in FIG. 8, are received by the processor 105. The vertices $v_0$, $v_1$, $v_2$ and $v_3$ of the quadrilateral cells received at step 904 may be stored by the processor 105 in the memory 106.

After step 904, the method 900 proceeds to decision step 905, where the processor 105 is used to determine if either of the following is true:

There exists any isoline which crosses the quadrilateral cell, and, the t-values associated with $v_0$ and $v_2$ are the minimum and maximum t-values amongst the t-values associated with the four vertices $v_0$, $v_1$, $v_2$ and $v_3$, or, There exists no isoline which crosses the quadrilateral cell.

To determine whether there exists an isoline which crosses the quadrilateral cell, at step 905, the processor 105 is used to determine whether any of the values in the PDF shading function approximation array is within the range $[t_{min}, t_{max}]$, where $t_{min}$ is the minimum t-value and $t_{max}$ is the maximum t-value associated with the four vertices $v_0$, $v_1$, $v_2$ and $v_3$. If a value from the PDF shading function approximation array is within the range, then an isoline crosses the quadrilateral cell. If a result of the test at step 905 is true, then the method 900 proceeds to step 910. Otherwise, the method 900 proceeds to the decision step 925.

At determining step 910, the method 900 determines that the quadrilateral cell does not need to be split (i.e., no diagonal split point) and the method 900 finishes.

At decision step 925, if the processor 105 determines that no isoline intersects the diagonal $v_0v_2$ twice within the quadrilateral cell, then the method 900 proceeds to determining step 935. Otherwise, the method 900 proceeds to selecting step 930. The determination of whether an isoline intersects the diagonal $v_0v_2$ twice within the quadrilateral cell, may be made by considering the equation of the isoline and the straight segment joining $v_0$ and $v_2$. In one arrangement, the intersection is determined at step 925 in the uv space.

At determining step 935, the processor 105 is used to construct a new vertex $v_{split}$ which is the midpoint of the segment joining $v_0$ and $v_2$ in uv space. The newly constructed vertex $v_{split}$ may be stored by the processor 105 in the memory 106. The coordinates of $v_{split}$ in xy space are obtained through the equation of the tensor-product patch (i.e., as extracted at step 623) and associated t-value from the bilinear interpolation equation. The method 900 finishes after step 935, thus determining that a split was necessary, and providing the vertex point at which to split the diagonal $v_0v_2$.

At step 930, the processor 105 is used to iterate through the isolines which cross the quadrilateral cell. As described above, the isolines are easily identified by determining the value(s) in the PDF shading function approximation array which are strictly within the range $[t_{min}, t_{max}]$. For each isoline which crosses the quadrilateral cell, the method 900 determines whether the isoline intersects the diagonal segment joining $v_0$ and $v_2$ twice and if the isoline does intersect the diagonal segment joining $v_0$ and $v_2$ twice, determines the distance, in uv space, between the two intersection points.

At step 930 of the method 900, the isoline with the minimum distance between the two intersections is selected and a new vertex $v_{split}$ which is the midpoint of the segment joining the two intersections in uv space is determined. The coordinates of $v_{split}$ in xy space are obtained through the equation of the tensor-product patch (i.e., as extracted at step 623) and associated t-value from the bilinear interpolation equation. The method 900 finishes after step 930, thus determining that a split was necessary, and providing the vertex at which to split the cell.

The method 1000 of tessellating triangles will be described in detail below with reference to FIG. 10. The method 1000 tessellates a triangle using isolines. The method 1000 is invoked at step 640 of the method 600. The method 1000 may be implemented as one or more software modules of the software application program 133 resident on the hard disk drive 110 and being controlled in its execution by the processor 105.

The method 1000 begins at receiving step 1005, where the coordinates of the vertices, V1, V2, and V3, of the triangle cell, in both uv and xy space, and their associated t-values are received. The received triangle cell approximates the tensor-product patch. The t-value associated with any point on the edge of the triangle cell is approximated by linearly interpolating the t-values of the vertices of the triangle cell. After step 1005, the method 1000 proceeds to decision step 1015.

At step 1015, the processor 105 is used to determine whether there exists any isoline which crosses the triangle cell. To check whether there exists an isoline which crosses the triangle cell, at step 1015 the processor 105 is used to determine whether any of the value in the PDF shading function approximation array is strictly within the range $]t_{min}, t_{max}[$, where $t_{min}$ is the minimum t-value and $t_{max}$ is the maximum t-value associated with the three vertices V1, V2 and V3. If a value from the PDF shading function approximation array is within the range then an isoline crosses the triangle cell and the method 1000 proceeds to step 1020. Otherwise, if no value from the PDF shading color function approximation array is within the range then an isoline does cross the triangle cell, and the method 1000 proceeds to sending step 1030.

At sending step 1030, the processor 105 determines that the triangle cell does not need to be further tessellated and sends the triangle from the triangle cell to the shading unit 550.

At step 1020, the vertices $v_{min}$, $v_{max}$ and $v_{int}$, are constructed as follows:

$v_{min}$ is designated as the vertex with the minimum associated t-value, $t_{min}$, out of V1, V2 and V3

$v_{max}$ is designated as the vertex with the maximum associated t-value, $t_{max}$, out of V1, V2 and V3

$v_{int}$ is designated as the vertex out of V1, V2 and V3 which is neither $v_{min}$ nor $v_{max}$ (i.e., designate the vertex with t-value as $t_{int}$ as $v_{int}$)

After step 1020, the method 1000 proceeds to step tessellating step 1025, where the triangle is further tessellated using vertices $v_{min}$, $v_{int}$, and $v_{max}$, t-values, $t_{min}$, $t_{int}$ and $t_{max}$ and the isolines within the triangle. A method 1200 of tessellating a triangle using isolines, as executed at step 1025, will be described below with reference to in FIG. 12. The process 1000 finishes after step 1025.

The method 1200 may be implemented as one or more software code modules of the software application program 133 resident on the hard disk drive 110 and being controlled in its execution by the processor 105.

The method 1200 begins at initialising step 1204, where the processor 105 is used to initialize two empty stacks stack0 and stack1 within the memory 106. After performing step 1204, the method 1200 proceeds to receiving step 1205, where the processor 105 receives the triangle vertices $v_{min}$, $v_{int}$ and $v_{max}$ and determines $t_{min}$, $t_{int}$ and $t_{max}$ as the values associated with $v_{min}$, $v_{int}$ and $v_{max}$. The triangle vertices $v_{min}$, $v_{int}$ and $v_{max}$ and the determined $t_{min}$, $t_{int}$ and $t_{max}$ values may be stored by the processor 105 in the memory 106.

At step 1205, the variable tv is designated as the smallest value within the PDF shading function approximation array, which is greater than $t_{min}$. The value tv is associated with an isoline that crosses the triangle.

At constructing step 1210, the processor 105 is used to construct the vertex $p_0$, which is at the intersection of the edge $v_{min}v_{max}$, with the approximation of the isoline with t-value tv. The constructed vertex $p_0$ may be stored by the processor 105 in the memory 106. The isoline with t-value tv was produced at step 624 and consists of straight segments.

After step 1210, the method 1200 proceeds to pushing step 1215, where the newly created vertex $p_0$ is pushed onto stack0 configured within memory 106. The method 1200 then proceeds to decision step 1220.

At decision step 1220, if the value of the t-value tv is less than or equal to $t_{int}$ then the method 1200 proceeds to constructing step 1225. Otherwise, the method 1200 proceeds to constructing step 1230.

At step 1225, the method 1200 constructs the vertex $p_1$ which is at the intersection of the edge $v_{min}v_{int}$ with the approximation of the isoline, with t-value tv. The isoline with t-value tv was produced at step 624 and consists of straight segments. After step 1225 the method 1200 proceeds to pushing step 1235.

At step 1230, the processor 105 is used to construct the vertex $p_1$ which is at the intersection of the edge $v_{max}v_{int}$ with the approximation of the isoline, with t-value tv. The constructed vertex $p_1$ may be stored by the processor 105 in the memory 106. Again, the isoline, with t-value tv was produced at step 624 and consists of straight segments. After step 1230 the method 1200 proceeds to pushing step 1235.

At pushing step 1235, the newly created vertex $p_1$ is pushed onto stack1 configured within memory 106 and then the method 1200 proceeds to decision step 1240.

At step 1240, the processor 105 1200 determines whether there is a value within the PDF shading function approximation array which is greater than tv and smaller than $t_{max}$. If there is such a value, the processor 105 designates tv as the next smallest value within the PDF shading function approximation array which is greater than the previous tv value and smaller than $t_{max}$, and the method 1200 returns to step 1210. Otherwise, the method 1200 proceeds to tessellating step 1250 in which the triangle is further processed using stack0 and stack1, and the method 1200 then finishes. A method 1300 of tessellating a triangle, as executed at step 1250, will be described in detail below with reference to FIG. 13.

The method 1300 may be implemented as one or more software code modules of the software application program 133 resident in the hard disk drive 110 and being controlled in its execution by the processor 105.

The method 1300 tessellates a triangle using vertices approximating intersections of approximated isolines with edges of the triangle.

The method 1300 begins at receiving step 1305, where the triangle vertices $v_{min}$, $v_{int}$ and $v_{max}$, stack0 and stack1, as constructed in the method 1200, are received by the processor 105 and may be stored by the processor 105 in the memory 106. Also at step 1305, the processor 105 determines $t_{int}$ as the t-value associated with $v_{int}$. Again, the t-value $t_{int}$ may be stored by the processor 105 in the memory 106.

After step 1305, the method 1300 proceeds to popping step 1310, where both stack0 and stack1 are popped, yielding vertices $vs_0$ from stack0, and $vs_1$ from stack1. Also at step 1310, the processor 105 is used to determine $tvs_0$ as the value associated with both $vs_0$ and $vs_1$. The determined $tvs_0$ value may be stored by the processor 105 in the memory 106.

After step 1310, the method 1300 proceeds to decision step 1315. At step 1315, if the value of $t_{int}$ is determined to be less than or equal to the value of $tvs_0$, then the method 1300 proceeds to tessellating step 1320. Otherwise, the method 1300 proceeds to tessellating step 1330.

At step 1320 part of the triangle which comprises the segment $v_{max}vs_0$ and $v_{max}vs_1$ from the edge of the triangle is tessellated. Such a part of the triangle to be tessellated is called herein a category 1 object. The isoline with the t-value that the same as the t-value associated with $vs_0$ and $vs_1$ forms part of the boundary of the category 1 object. A method 1500 of tessellating a category 1 object, as executed at step 1320, will be described in detail below with reference to the FIG. 15. After step 1320 the method 1300 proceeds to pushing step 1340.

At step 1330, part of the triangle which comprises the segment $v_{max}v_{int}$, $v_{int}v_{S1}$ and $v_{max}vs_0$ from the edge of the triangle is tessellated. Such a part of the triangle to be tessellated is called herein a category 2 object and the isoline with the t-value that is the same as the t-value associated with $vs_0$ and $vs_1$ forms part of the boundary of the category 2 object. A method 1700 of tessellating a category 2 object, as executed at step 1330, will be described in detail below with reference to FIG. 17. After step 1330 the method 1300 proceeds to pushing step 1340.

At step 1340, $vs_0$ is pushed back onto stack0 and $vs_1$ is pushed back to stack1. After step 1340 the method 1300 proceeds to tessellating step 1345 in which the triangle is further tessellated. A method 1400 of tessellating a triangle, as executed at step 1345, will be described in detail below with reference to FIG. 14. The method 1400 will be described by way of example with reference to FIGS. 21A and 21B. After step 1345, the method 1300 finishes.

Figure 14:
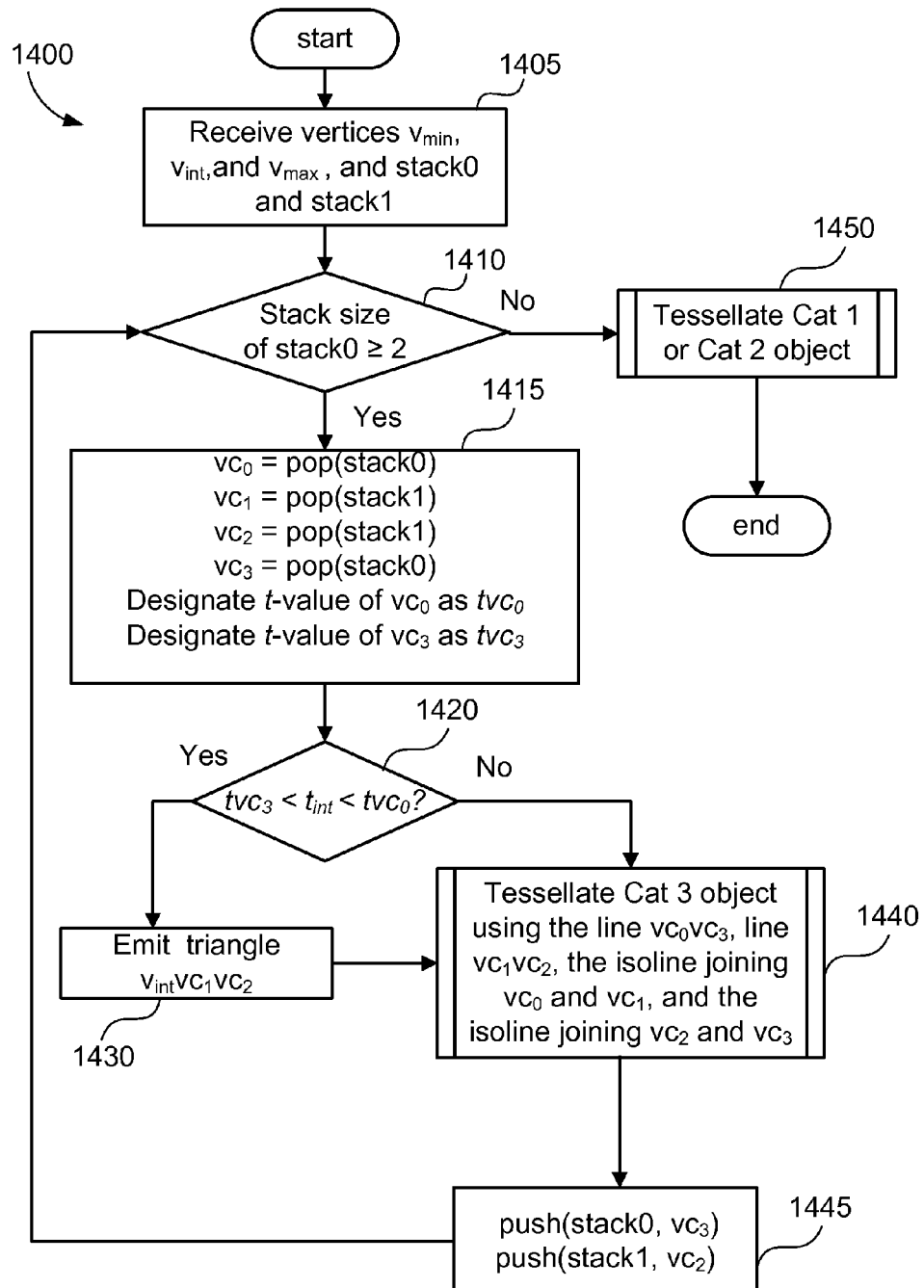
FIG. 14 is a schematic flow diagram showing a method a tessellating a triangle, as executed in the method of FIG. 13.

The method 1400 of tessellating a triangle, as executed at step 1345, will now be described with reference to FIG. 14. The method 1400 may be implemented as one or more software code modules of the software application program 133 resident in the hard disk drive 110 and being controlled in its execution by the processor 105. The method 1400 may be used for tessellating the remaining part of the triangle tessellated in the method 1300. The method 1400 is invoked at step 1345 of the method 1300.

The method 1400 begins at receiving step 1405 in which triangle vertices $v_{min}$, $v_{int}$ and $v_{max}$, and stack0 and stack1, as constructed in the method 1200, are received by the processor 105. The values of the vertices $v_{min}$, $v_{int}$ and $v_{max}$, and stack0 and stack1 may be accessed by the processor 105 from the memory 106. Also at step 1405, the t-value $t_{int}$ is determined as the value associated with the vertex $v_{int}$. After step 1405, the method 1400 proceeds to decision step 1410, where if stack0 has a size greater than or equal to two (2), then the method 1400 proceeds to popping step 1415. Otherwise if it is determined that stack0 does not have stack size greater than or equal to two (2), then the method 1400 proceeds to tessellating step 1450.

At step 1415 the processor 105 is used to perform the following operations:

Two vertices are popped from stack0. The first vertex popped from stack0 is designated as $vc_0$ and the second vertex popped from stack0 is designated as $vc_3$. The t-value associated with $vc_0$ is designated as $tvc_0$ and the value associated with $vc_3$ is designated as $tvc_3$.

Two vertices are popped from stack1. The first vertex popped from stack1 is designated as $vc_1$ and the second vertex popped from stack1 is designated as $vc_2$.

After step 1415, the method 1400 proceeds to decision step 1420 in which it is determined if the value of $t_{int}$ is within the range $]tvc_3, tvc_0[$.

If it is determined at step 1420 that the value of $t_{int}$ is within the range $]tvc_3, tvc_0[$ then the method 1400 proceeds to sending step 1430. Otherwise, the method 1400 proceeds to tessellating step 1440.

At step 1430, the method 1400 sends the triangle $v_{int}vc_1vc_2$ to the shading unit 550 and proceeds to step 1440.

At step 1440 part of the original triangle to be tessellated by the method 1400 which comprises the segment $vc_1vc_2$, and $vc_3vc_0$ from the edge of the triangle is tessellated. Such a part of the triangle to be tessellated is called herein a category 3 object and both isolines with the t-value $tvc_0$ and $tvc_3$ form part of the boundary of the category 3 object. A method 1800 of tessellating a category 3 object, as executed at step 1440, will be described in detail below with reference to FIG. 18. After step 1440, the method 1400 proceeds to pushing step 1445.

At step 1445 the vertex $vc_3$ is pushed back onto stack0 configured within memory 106 and the vertex $vc_2$ is pushed back onto stack1 configured within memory 106. After step 1445, the method 1400 returns to decision step 1410.

At step 1450 a category object 1 or 2 is tessellated, completing the tessellation of the remaining part of the triangle tessellated in the method 1300. A method 1900 of tessellating a category 1 or category 2 object, will be described in detail below with reference to FIG. 19. The method 1400 finishes after step 1450.

The method 1900 tessellates an object received at step 1450 which is either a category 1 object or a category 2 object.

The method 1900 may be implemented as one or more software application programs 133 resident in the hard disk drive 110 and being controlled in its execution by the processor 105. The method 1900 begins at receiving step 1905 in which triangle vertices $v_{min}$, $v_{int}$ and $v_{max}$, and stack0 and stack1, as constructed in the method 1200, are received and may be stored by the processor 105 in the memory 106. Also at step 1905, the processor 105 is used to determine the t-value $t_{int}$ as the value associated with the vertex $v_{int}$. The t-value $t_{int}$ may be stored in the memory 106 at step 1905.

After step 1905, the method 1900 proceeds to popping step 1910 in which both stack0 and stack1 are popped, yielding vertices $vs_0$, from stack0, and $vs_1$, from stack1. Also at step 1905, the value $tvs_0$ is determined as the value associated with both of the vertices $vs_0$ and $vs_1$.

After step 1910, the method 1900 proceeds to decision step 1915 in which the processor 105 is used to determine if the value of $t_{int}$ is less than the value of $tvs_0$. If it is determined that the value of $t_{int}$ is less than the value of $tvs_0$ then the method 1900 proceeds to tessellating step 1920. Otherwise, the method 1900 proceeds to tessellating step 1930.

At step 1920 part of the triangle which comprises the segment $v_{min}v_{int}$, $v_{int}vs_1$ and $v_{min}vs_0$ from the edge of the triangle is tessellated in accordance with the method 1700. Such a part of the triangle to be tessellated is called herein a category 2 object and the isoline with the t-value the same as the t-value associated with $vs_0$ and $vs_1$ forms part of the boundary of the category 2 object. After step 1920, the method 1900 finishes.

At step 1930, part of the triangle which comprises the segment $v_{min}vs_0$ and $v_{min}vs_1$ from the edge of the triangle is tessellated in accordance with the method 1900. Such a part of the triangle to be tessellated is called herein a categry 1 object and the isoline with the t-value that is the same as the t-value associated with the vertices $vs_0$ and $vs_1$ forms part of the boundary of the category 1 object. After step 1920, the method 1900 finishes.

Figure 15:
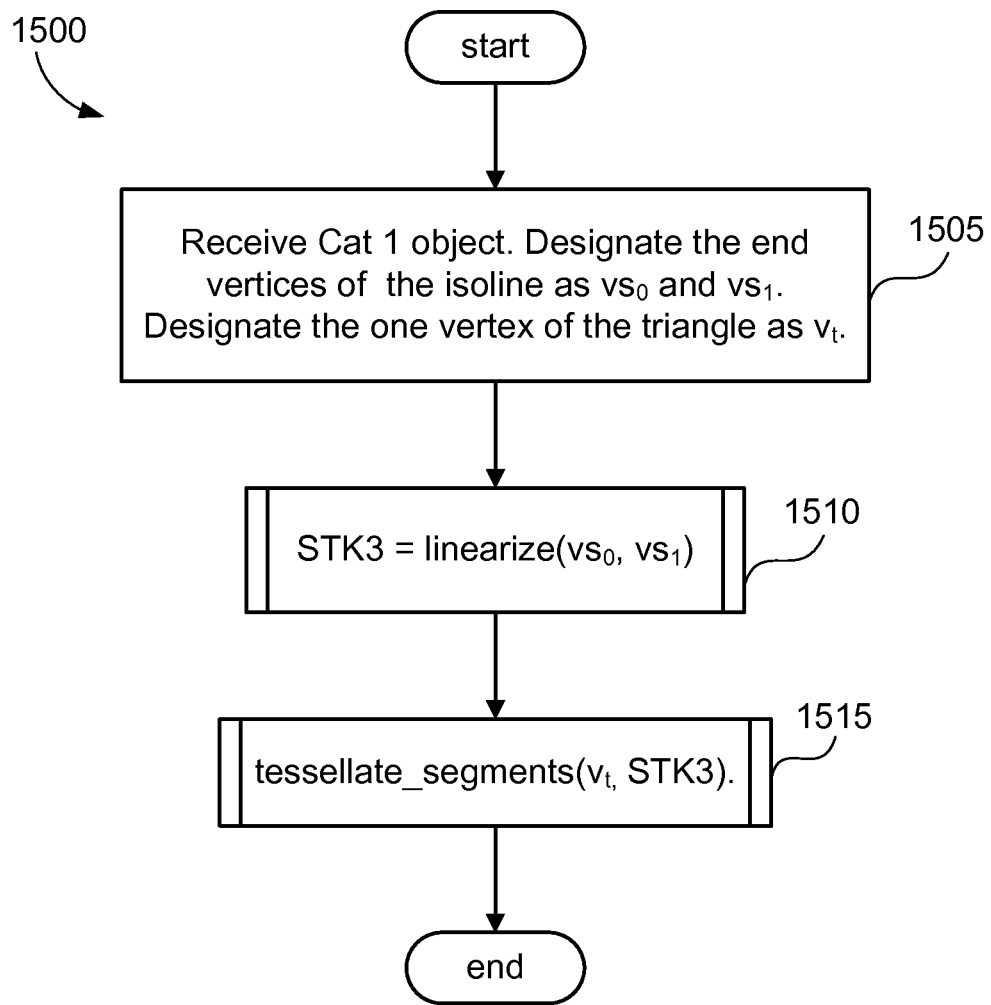
FIG. 15 is a schematic flow diagram showing a method of tessellating a category 1 object, as executed in the method of FIG. 13.

The method 1500 of tessellating a category 1 object, as executed at step 1320, will now be described with reference to FIG. 15. An example tessellation of a category 1 object according to the method 1500 is shown in FIG. 11C. The method 1500 may be implemented as one or more software applications programs 133 resident in the hard disk drive 110 and being controlled in its execution by the processor 105.

The method 1500 begins at receiving step 1505, where a category 1 object consisting of vertices $vs_0$, $vs_1$ and either $v_{min}$ or $v_{max}$ determined at either of steps 1320 or 1330, is received by the processor 105 and may be stored by the processor 105 in the memory 106. At step 1505, the processor 105 is used to designate the vertex $v_t$ as the vertex which is either $v_{min}$ or $v_{max}$.

After step 1505, the method 1500 proceeds to step 1510 in which the category 1 object is approximated by approximating the part of the isoline which forms part of the category 1 object boundary, using the linearization performed at step 624 of the method 600.

At step 1510, the processor 105 is used to construct a stack Stk3 within the memory 106. The stack Stk3 contains the ordered list of vertices of the approximation of the isoline. The vertices of the category 1 object approximation are the vertices in Stk3 and $v_t$. A method 1600 of constructing a stack of vertices of straight segments of an approximated isoline, as executed at step 1510, will be further described with reference to the method 1600.

After step 1510, the method 1500 proceeds to tessellating step 1515 in which the approximation of the category 1 object is tessellated into triangles. A method 2000 of tessellating an object, as executed at step 1510 will be described in detail below with reference to the method 2000. At step 1515, the processor 105 is used to send both the vertex $v_t$ and the Stack Stk3 to the method 2000. The process 1500 finishes after step 1515.

Figure 17:
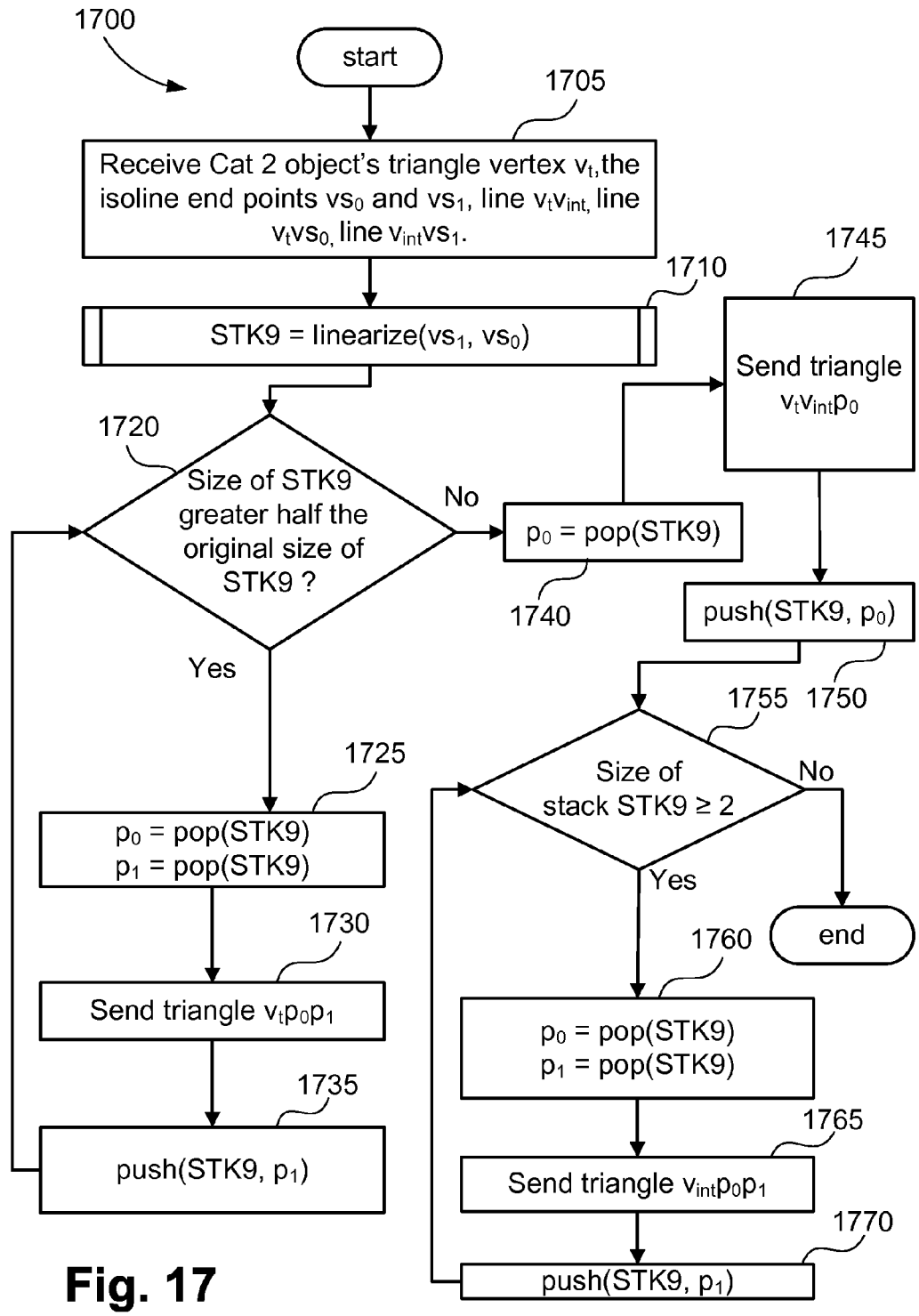
FIG. 17 is a schematic flow diagram showing a method of tessellating a category 2 object, as executed in the method of FIG. 13.

The method 1700 of tessellating a category 2 object, as executed at step 1330, will be described in detail below with reference to FIG. 17. The method 1700 may be implemented as one or more code modules of the software application program 133 resident in the hard disk drive 110 and being controlled in its execution by the processor 105. An example tessellation of a category 2 object according to the method 1700 is shown in FIG. 11D.

The method 1700 begins at receiving step 1705 in which a category 2 object consisting of vertices $vs_0$, $vs_1$, $v_{int}$ and either $v_{min}$ or $v_{max}$, as determined at either step 1330 or 1920, is received by the processor 105 and may be stored by the processor 105 in the memory 106. At step 1705, the processor 105 designates the vertex $v_t$ as the vertex which is either $v_{min}$ or $v_{max}$.

After step 1705, the method 1700 proceeds to approximation step 1710 where the category 2 object is approximated. The category 2 object is approximated by approximating the part of the isoline which forms part of the category 2 object boundary, using the linearization performed at step 624 of the method 600.

At step 1705, the processor 105 is used to construct a stack Stk9 within the memory 106, in accordance with the method 1600. The stack STK9 contains the ordered list of vertices of the approximation of the isoline. The vertex $vs_1$ is at the bottom of the stack Stk9 and the vertex $vs_0$ is at the top of the stack Stk9. The vertices of the category 2 object approximation are the vertices in Stk9, $v_t$, $v_{int}$.

After step 1710, the method 1700 proceeds to decision step 1720 in which the processor 105 is used to determine whether the current size of the stack Stk9 is greater than half the original size of the stack Stk9 when created at step 1710. If it is determined that Stk9 is greater than half the original size of the Stk9 then the method 1700 proceeds to popping step 1725. Otherwise, the method 1700 proceeds to popping step 1740.

At step 1725, two vertices are popped from Stk9 configured within memory 106. The first vertex popped from Stk9 is designated as $p_0$ and the second vertex popped from Stk9 is designated as $p_1$. After step 1725 the method 1700 proceeds to sending step 1730. At step 1730, the processor 105 is used to send the triangle $v_t p_0 p_1$ to the shading unit 550. After step 1730, the method 1700 proceeds to step pushing 1735 in which $p_1$ is pushed back onto Stk9 configured within memory 106. After step 1735, the method 1700 returns to decision step 1720.

At step 1740, a vertex designated as $p_0$ is popped from Stk9 and the method 1700 proceeds to step sending step 1745. At step 1745, the triangle $v_t v_{int} p_0$ is sent to the shading unit 550. After step 1745 the method 1700 proceeds to pushing step 1750 in which $p_0$ is pushed back onto Stk9. After step 1750 the method 1700 proceeds to decision step 1755 in which it is determined if there are least two vertices remaining in Stk9. If it is determined that there are least two vertices remaining in Stk9, then the method 1700 proceeds to popping step 1760. Otherwise, the method 1700 finishes.

At step 1760, two vertices are popped from Stk9, the first vertex is designated as $p_0$ and the second vertex is designated as $p_1$. After step 1760 the method 1700 proceeds to sending step 1765. At step 1765, the processor 105 is used to send the triangle $v_{int} p_0 p_1$ to the shading unit 550. After step 1765 the method 1700 proceeds to step 1770 in which $p_1$ is pushed back onto Stk9. After step 1770 the method 1700 returns to step 1755.

Figure 18:
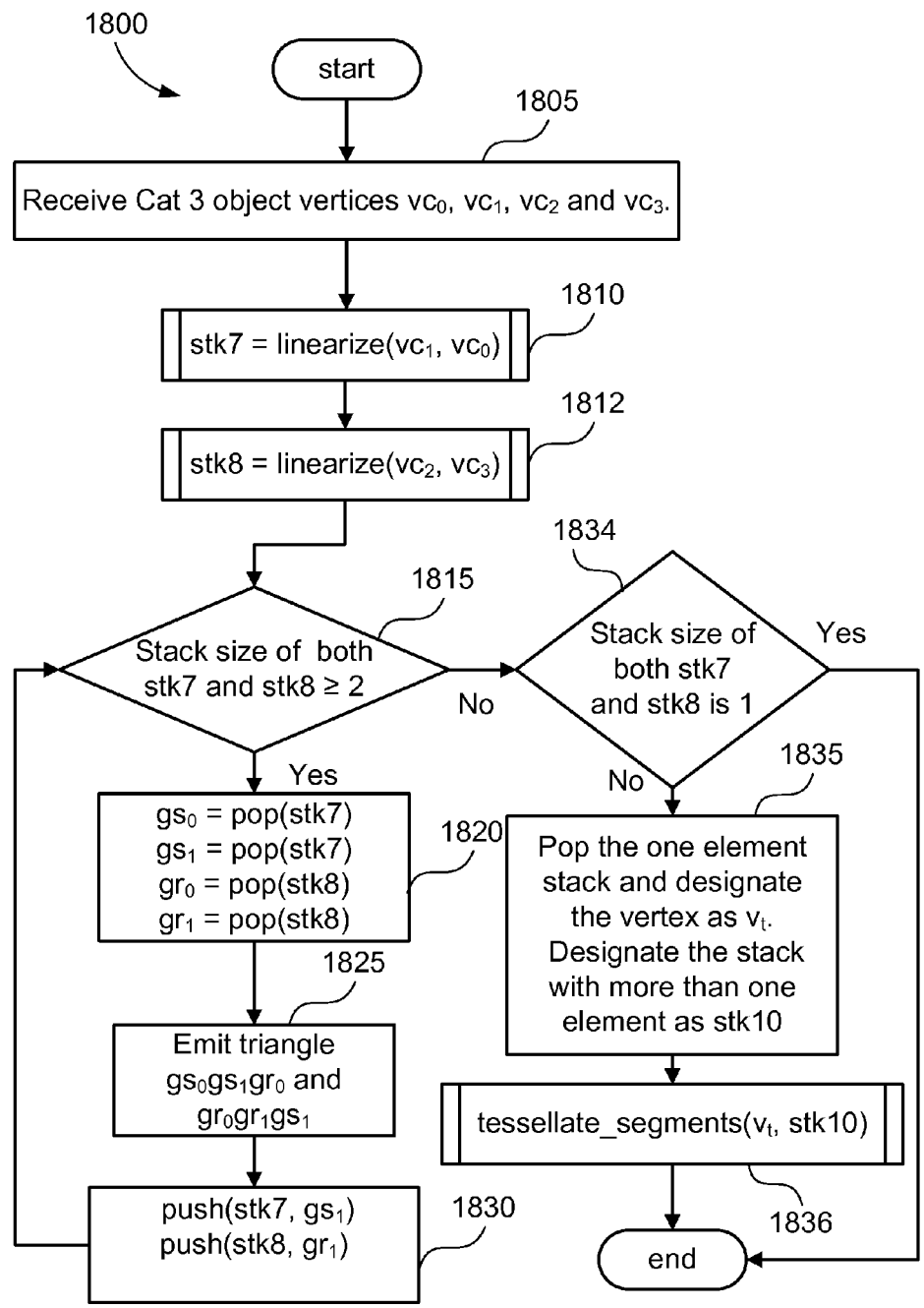
FIG. 18 is a schematic flow diagram showing a method of tessellating a category 3 object, as executed in the method of FIG. 13.
Figure 19:
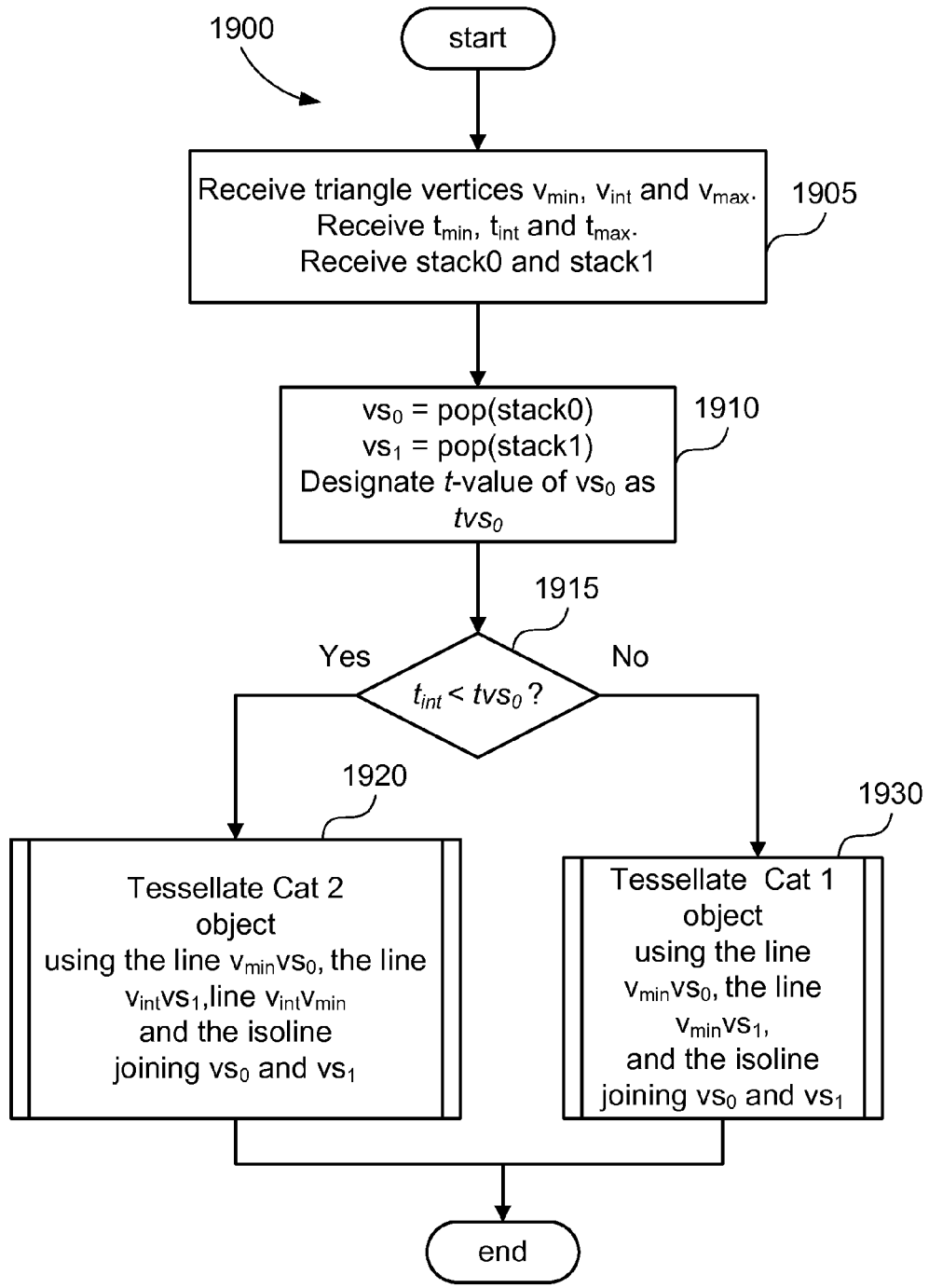
FIG. 19 is a schematic flow diagram tessellating a category 1 or category 2 object, as executed in the method of FIG. 14.

The method 1800 of tessellating a category 3 object, as executed at step 1440, will now be described in detail below with reference to FIG. 18. The method 1800 may be implemented as one or more software code modules of the software application program 133 resident in the hard disk drive 110 and being controlled in its execution by the processor 105.

An example tessellation of a category 3 object according to the method 1800 is shown in FIG. 11E. The method 1800 begins at receiving step 1805 in which a category 3 object consisting of the vertices $vc_0$, $vc_1$, $vc_2$ and $vc_3$ determined at step 1440 are received by the processor 105 and may be stored by the processor 105 in the memory 106. The t-value of the vertices $vc_0$ and $vc_1$ is $tvc_0$ and the t-value of the vertices $vc_2$ and $vc_3$ is $tvc_3$.

After step 1805, the method 1800 proceeds to approximating step 1810 where the category 3 object is approximated by approximating the part of the isoline, with t-value $tvc_0$, which forms part of the category 3 object boundary. The part of the isoline, with t-value $tvc_0$ is approximated using the linearization performed at step 624 of the method 600. Also at step 1810, the processor 105 is used to construct a stack stk7, within memory 106, containing the ordered list of vertices of the approximation of the isoline determined at step 1810. The ordered list of vertices is constructed at step 1810 in accordance with the method 1600, which will be described below with reference to FIG. 16.

After step 1810, the method 1800 proceeds to approximating step 1812 where the category 3 object is further approximated by approximating the part of the isoline with t-value $tvc_3$, which forms part of the category 3 object boundary. The part of the isoline with t-value $tvc_3$ is approximated using the linearization performed at step 624 of the method 600. Also at step 1812, the processor 105 is used to construct a stack stk8, within memory 106, containing the ordered list of vertices of the approximation of the isoline determined at step 1812. The ordered list of vertices is constructed at step 1812 in accordance with the method 1600, which will be described below with reference to FIG. 16.

The vertices of the category 3 object approximation are the vertices in stk7 and stk8. The approximation will be further tessellated into triangles by using the vertices from stk7 and stk8 in a zigzag manner.

After step 1812, the method 1800 proceeds to decision step 1815 in which the processor 105 is used to determine if both stack7 and stack8 have a size greater than or equal to two (2). If it is determined that either stack7 or stack8 has a stack size less than two (2), then the method 1800 proceeds to decision step 1834. Otherwise, the method 1800 proceeds to popping step 1820.

At step 1820 the following operations are performed using the processor 105:
Two vertices are popped from stk7. The first vertex popped from stk7 is designated as $gs_0$ and the second vertex popped from stk7 is designated as $gs_1$.
Two vertices are popped from stk8. The first vertex popped from stk8 is designated as $gr_0$ and the second vertex popped from stk8 is designated as $gr_1$.

After step 1820 the method 1800 proceeds to sending step 1825 in which the triangles $gs_0 gs_1 gr_0$ and $gs_1 gr_0 gr_1$ are sent to the shading unit 550. After step 1825 the method 1800 proceeds to pushing step 1830, in which $gs_1$ is pushed back onto stk 7 and $gr_1$ is pushed back to stk8. After step 1830 the method 1800 returns to step 1815.

At decision step 1834, the processor 105 is used to determine whether both stk7 and stk8 contains exactly one vertex. If it is determined that both stk7 and stk8 contain exactly one vertex then the method 1800 finishes. Otherwise, the method 1800 proceeds to popping step 1835.

At step 1835, one vertex is popped from the stack containing one element. The popped element is designated $v_t$. At step 1835, the processor 105 is used to designate the stack with more than one element as stk10. Following step 1835, the method 1800 then proceeds to tessellating step 1836.

At step 1836, the remaining portion of the category 3 object is approximated as a category 1 object, and is tessellated into triangles. The triangles are tessellated at step 1836 in accordance with the method 2000 which will be further described below with reference to FIG. 20. At step 1836, the processor 105 is used to send both the vertex $v_t$ and the stack stk10 to the method 2000. The method 1800 finishes after step 1836.

Figure 20:
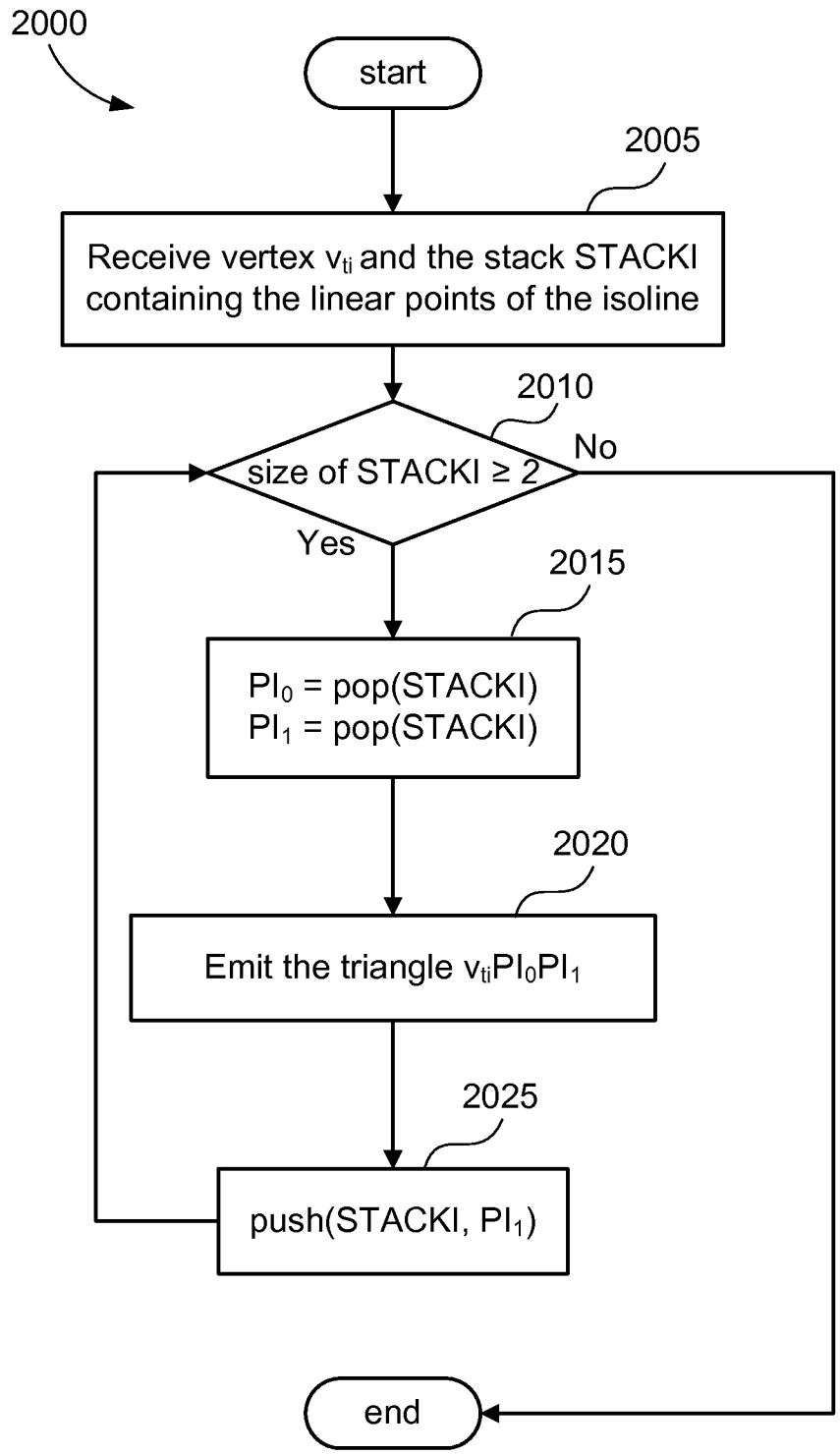
FIG. 20 is a schematic flow diagram of a method of tessellating an object, as executed in the method of FIG. 15.

The method 2000 of FIG. 20 may be used in the tessellation of the approximation of a category 1 object. The method 2000 may be implemented as one or more software code modules of the software application program 133 resident in the hard disk drive 110 and being controlled in its execution by the processor 105.

The method 2000 begins at receiving step 2005, where the processor 105 receives a vertex, designated as $v_{ti}$ and a stack designated as STACKI. The vertex $v_{ti}$ and stack STACKI may be stored by the processor 105 in the memory 106. After step 2005 the method 2000 proceeds to decision step 2010 in which the processor 105 is used to determine if the stack STACKI contains at least two vertices (i.e., is size of STACKI≥2). If it is determined that STACKI contains at least two vertices then the method 2000 proceeds to step popping step 2015. Otherwise, the method 2000 finishes.

At step 2015, two vertices are popped from STACKI. The first vertex popped from STACKI is designated as $PI_0$ and the second vertex popped from STACKI is designated as $PI_1$. After step 2015 the method 2000 proceeds to sending step 2020 where the triangle $v_{ti} PI_0 PI_1$ is sent to the shading unit 550. After step 2015 the method 2000 proceeds to pushing step 2025 where $PI_1$ is pushed back onto STACKI. After step 2025 the method 2000 proceeds to decision step 2010.

Figure 16:
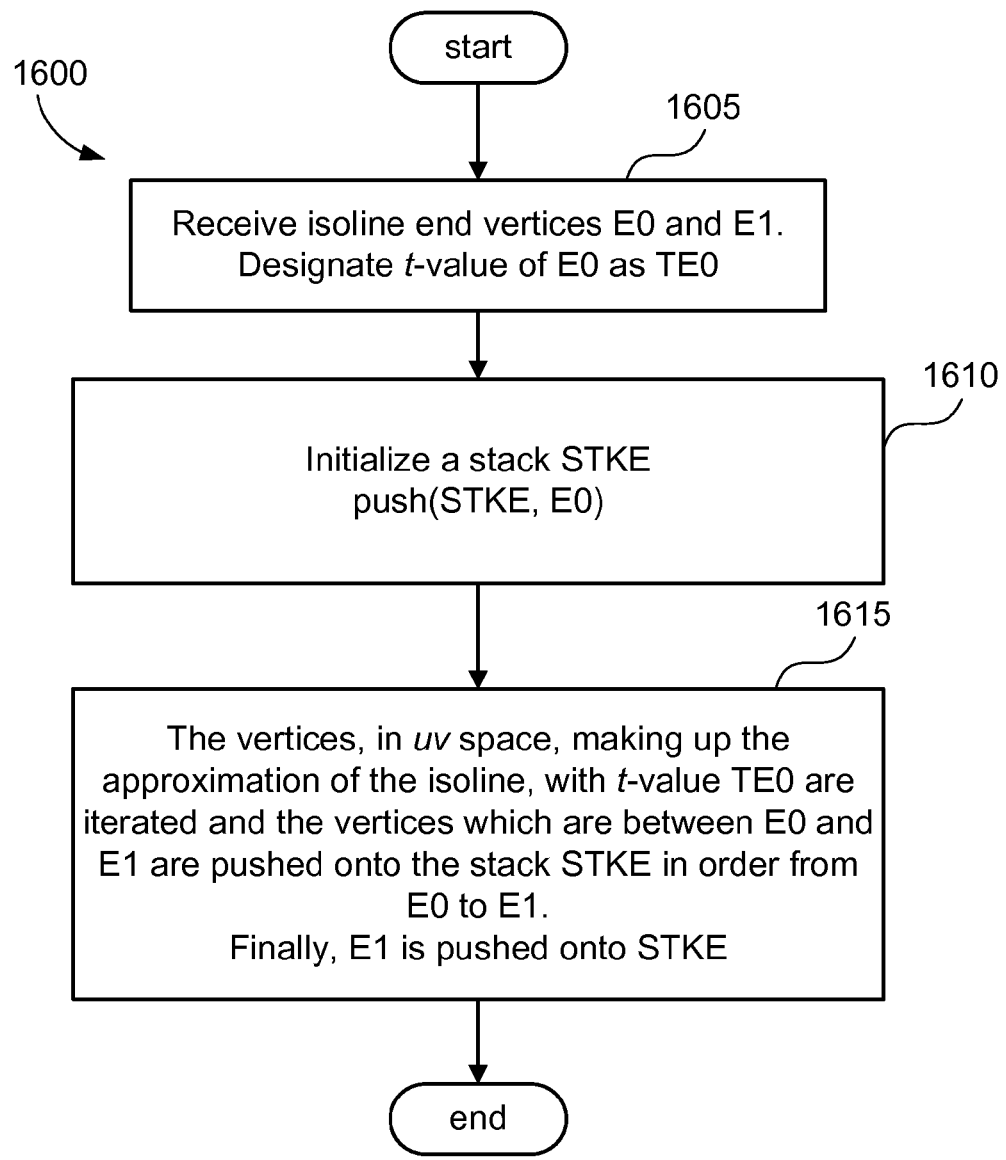
FIG. 16 is a schematic flow diagram showing a method of constructing a stack of vertices of straight segments of an approximated isoline, as executed in the methods of FIGS. 15, 17 and 18.

The method 1600, linearization, in FIG. 16 may be used in the approximation of a specific part of an isoline as a set of vertices contained in a stack. The linearization method 1600 is invoked at steps 1810, 1812, 1510 and 1710. The method 1600 may be implemented as one or more software code modules of the software application program 133 resident in the hard disk drive 110 and being controlled in its execution by the processor 105.

The method 1600 begins at step 1605, in which two vertices E0 and E1 are received by the processor 105 and TE0 is designated as the t-value associated with both E0 and E1. The two vertices E0 and E1 may be stored by the processor 105 in the memory 106. E0 and E1 were computed by intersection with the approximation of the isoline, with t-value TE0, which was produced at step 624 and consist of straight segments. As a result E0 and E1 belong to the isoline with t-value TE0.

After step 1605 the method 1600 proceeds to initialising step 1610 in which an empty stack STKE is initialized within memory 106 and the vertex E0 is pushed onto STKE. After performing step 1610 the method 1600 proceeds to iterating step 1615.

At step 1615, the vertices, in uv space, making up the approximation of the isoline, with t-value TE0 (i.e., as produced at step 624 and consisting of straight segments) are iterated through. The vertices which are between E0 and E1 are pushed onto the stack STKE in order from E0 to E1. Finally, E1 is pushed onto STKE. After Step 1615 the method 1600 finishes.

The tessellation using isolines as described above ensures that smooth color gradation can be achieved for a given tolerance when a shading color function is present in PDF type 6 and 7 shading. The isolines with t-values from the approximated shading function designate the areas of the shading where there can be non-linearity in color. Thus usage of the vertices of the straight segments of the approximated isoline as tessellation points ensures a smooth color gradation across the shading parametric patch.

In an alternative arrangement, a t-value color mapping function may be defined as the combination of the PDF shading color function and the color conversion used by the renderer 530. The t-value color mapping function maps t-values to color values in the native color space of an output device (e.g., the display 114 or the printer 115). For example, when rendering for a printing device the native color space of the output device is often CMYK. The t-value mapping function may be used instead of the PDF shading color function in the methods described above, since both the t-value color mapping function and the PDF shading color function are mapping t-values to single-channel or multi-channel color spaces.

The triangles transferred by the shading type 7 tessellation unit may be directly output by the renderer module 530 since both the triangles are an acceptable approximation of tensor-product patches in the native color space of an output device, such as the display 114 and/or the printer 115. Outputting the triangles transferred by the shading type 7 tessellation unit directly output from the renderer module 530 may produce better performance, especially if hardware acceleration is available for rendering Gouraud shaded triangles in the native color space of the output device.

Figure 21A:
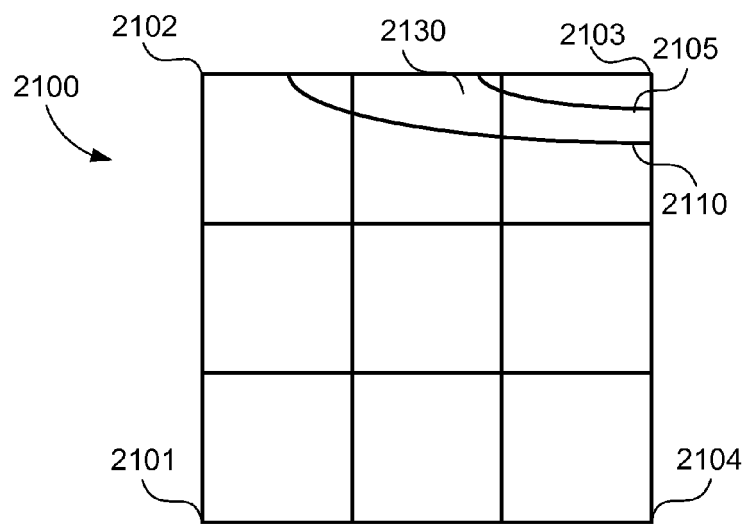
FIGS. 21A and 21B collectively show an example of tessellating a parametric patch.
Figure 21B:
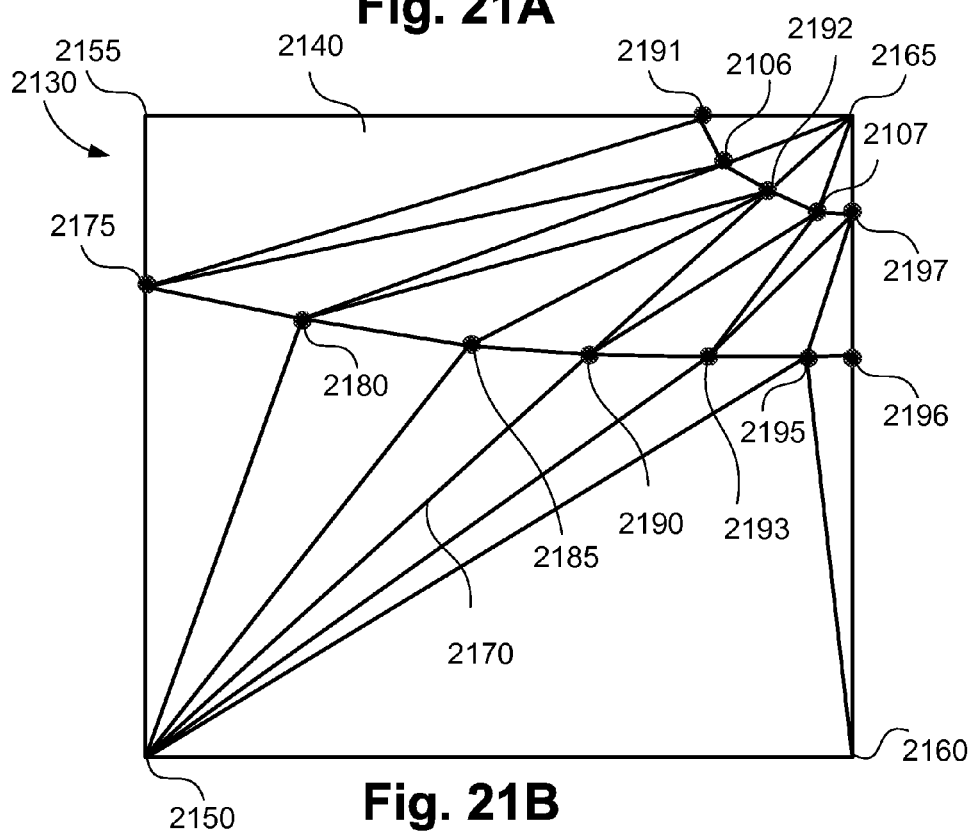

FIGS. 21A and 21B collectively show an example of tessellating a parametric patch in accordance with the method 600. In the example of FIGS. 21A and 21B, an analysis of the geometric properties of the patch 2100, given a particular smoothness tolerance, yields the result that a three (3) by three (3) grid of quadrilateral cells is necessary in order to approximate the patch surface within that tolerance. The corners of the patch are 2101, 2102, 2103 and 2104. There are two t-values from PDF shading function approximation array that are within the patch 2100; and 2105 and 2110 are the isolines corresponding to those two t-values. The isolines 2105 and 2110 are approximated by linear segments in step 624 for a specified tolerance resulting in vertices, such as 2106, 2107, 2180, 2185 and 2193.

In the example of FIGS. 21A and 21B, only the tessellation process of the quadrilateral cell 2130 using the approximation of the isoline 2105 and 2110 is further described with reference to FIG. 21B. The t-values of vertices 2150, 2155, 2165 and 2160 of the quadrilateral cell 2130 are calculated by applying bilinear interpolation to the t-values of the corners of the patch 2100. Step 645 invokes the method 800 for tessellating the quadrilateral cell 2130.

The vertex 2150 has minimum uv coordinate, and the vertex 2165 has maximum uv coordinate, thus the diagonal 2170 connecting those vertices is inspected for a diagonal split point at step 820 which invokes the method 900. The vertex 2150 has the minimum t-value and vertex 2165 has the maximum t-value. Therefore at step 905 of the method 900, the processor 105 is used to determine that a diagonal split is not needed as the vertices with the minimum and maximum t-values of the cell are the end vertices of the diagonal 2170. Since no diagonal splitting is necessary, after the decision step 825, the method 800 proceeds to step 830. At step 830, the quadrilateral cell is divided into two triangles. The first triangle determined at step 830 in the example of 21A and 21B has vertices 2150, 2155 and 2165, and the second triangle determined at step 830 in the example of 21A and 21B has vertices 2150, 2160 and 2165, using the diagonal 2170. At step 640 of the method 600, the method 1000 for tessellating the first and second triangle further is invoked.

The first triangle, $t_{min}$, $t_{int}$ and $t_{max}$ corresponds to the t-values of vertices 2150, 2155 and 2165, respectively. Therefore, the vertices 2150, 2155 and 2165 are designated $v_{min}$, $v_{int}$ and $v_{max}$ respectively in step 1020. At step 1025 of the method 1000, the method 1200 is invoked for further tessellation of the triangle.

For the first triangle, vertices 2175, 2190, 2191 and 2192 are the vertices created from the intersection points of edges of the triangle and the two approximate isolines of vertex 2110 and vertex 2105. The approximated isoline of vertex 2110 has two vertices 2180 and 2185, and the approximated isoline of vertex 2105 has one vertex 2106 for the first triangle. The first triangle will be further decomposed into various objects that are further tessellated into triangles using the vertices of the approximated isolines. For the first triangle, the stack0 will contain vertices 2190 and 2192 from bottom to top, and stack1 will contain vertices 2175 and 2191 from bottom to top after applying the method 1200. The stack0 and stack1 will be consulted for obtaining the intersection points of the isolines while tessellating the triangle.

In the example of FIGS. 21A and 21B, for the first triangle, at step 1320 of the method 1300, a category 1 object is detected using vertices 2165 ($v_{max}$), 2191, 2106 and 2192 as t-value of the top element 2191 of the stack0 is larger than that of vertex 2155. The method 1500 tessellates the category 1 object into triangles by joining vertex 2165 to vertices 2191, 2106 and 2191. The tessellation of the category 1 object using approximate isoline ensures smooth transition of color for the region enclosed by the object.

In the example of FIGS. 21A and 21B, for the first triangle, the method 1400 detects a category 4 object using the vertices 2155 ($v_{int}$), 2175, 2180, 2185, 2190, 2192, 2106 and 2191, as the $t_{int}$ lies between the t-values of the two approximated isolines. At steps 1430 and 1440 of the method 1400, the category 4 object is tessellated into a triangle 2140 and a category 3 object. The method 1800 is used to tessellate the category 3 object into triangles. The tessellation of the category 4 object using the approximated isolines ensures smooth color transition for the shared region enclosed by the category 4 object.

In the example of FIGS. 21A and 21B, for the first triangle, the method 1900 detects a category 1 object using the vertices 2150 ($v_{min}$), 2190, 2185, 2180 and 2175, as the t-value of the last element 2190 is smaller than that of 2155. The method 1500 tessellates the category 1 object into triangles by joining vertex 2150 to vertices 2190, 2185, 2180 and 2175. The tessellation of the category 1 object using the approximate isoline ensures smooth transition of color for the region enclosed by the object.

For the second triangle of the example of FIGS. 21A and 21B, $t_{min}$, $t_{int}$ and $t_{max}$ correspond to the t-values of the vertices 2150, 2160 and 2165 respectively. Therefore the vertices 2150, 2160 and 2165 are $v_{min}$, $v_{int}$ and $v_{max}$ respectively. For the second triangle, 2190, 2196, 2192 and 2197 are the vertices created from the intersection points of the triangle edges and the two approximated isolines 2110 and 2105. The approximated isoline of isoline 2110 has two vertices 2193 and 2195, and the approximated isoline of 2105 has one vertex 2107 for the second triangle. The second triangle is also decomposed into various objects that are further tessellated into triangles using the vertices of the approximated isolines for smooth color transition.

For the second triangle of the example of FIGS. 21A and 21B, the stack0 contains vertices 2190 and 2192 from bottom to top, and stack1 contains vertices 2196 and 2197 from bottom to top after applying the method 1200.

For the second triangle, at step 1320 of the method 1300, a category 1 object is detected using the vertices 2165 ($v_{max}$), 2192, 2107 and 2196, as the t-value of the top element 2192 on the stack0 is larger than that of 2160. The method 1500 tessellates the category 1 object into triangles by joining vertex 2165 to vertices 2192, 2197 and 2197.

For the second triangle of the example of FIGS. 21A and 21B, at step 1440 of the method 1400 a category 3 object is detected using the vertices 2190, 2193, 2195, 2196, 2197, 2107 and 2192, as the t-values of the isolines are larger than that of vertex 2160. The process 1800 tessellates the category 3 object into triangles.

For the second triangle, at step 1920 of the method 1900 a category 2 object is detected using the vertices 2150, 2160, 2196, 2195, 2193 and 2190, as the last element 2190 on stack0 has t-value larger than that of vertex 2160. The method 1700 tessellates the category 2 objects into triangles.

The usage of the intersection points (2175, 2190, 2196 2191, 2192 and 2197) of the approximated isolines with the edges of triangles and the vertices of the approximated isolines (2180, 2185, 2193, 2195, 2106, and 2107) as tessellation points ensures smooth color gradation can be achieved for a given tolerance within the patch.

PDF shadings may provide a smooth gradation of colors across a region to be painted. PDF type 4 shadings (i.e., free-form Gouraud triangle meshes) and PDF type 5 shadings (i.e., lattice-form Gouraud triangle meshes) may be used to represent complex colored and shaded shapes. In this instance, a shaded area is defined by a mesh of triangles. Color data of the corners of each triangle may be specified by a t-value. If color data is specified by t-values, then a PDF shading color function that maps t-values to color values is specified. The PDF shading color function may be non-linear.

The mesh of triangles of a PDF type 4 shading is specified using a sequence of vertices in an arrangement called free-form. In free-form, three vertices are specified to start a new triangle, and any subsequent vertex forms a triangle using two vertices of the previous triangle. A flag associated with the vertices indicates whether to start a new triangle or form a triangle using two vertices of the previous triangle.

Figure 22A:
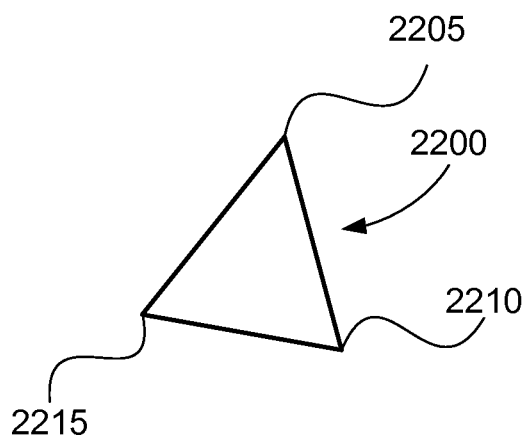
FIG. 22A illustrates a PDF shading triangle.
Figure 22B:
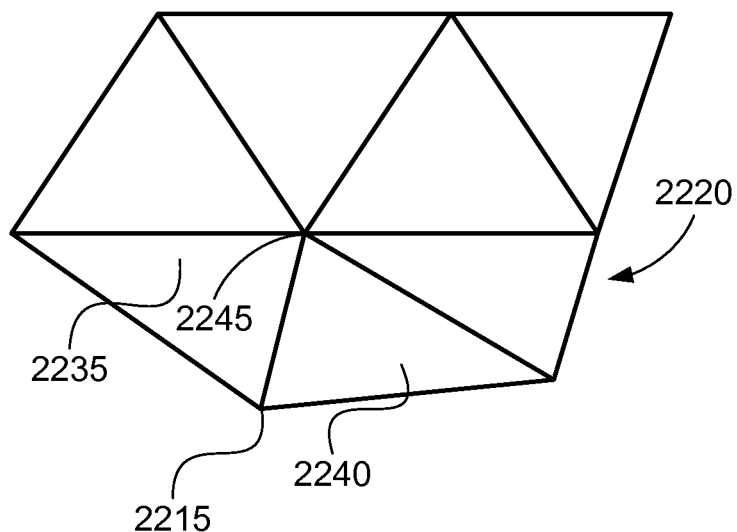
FIG. 22B illustrates a mesh of PDF shading triangles of PDF type 4 shading.
Figure 23:
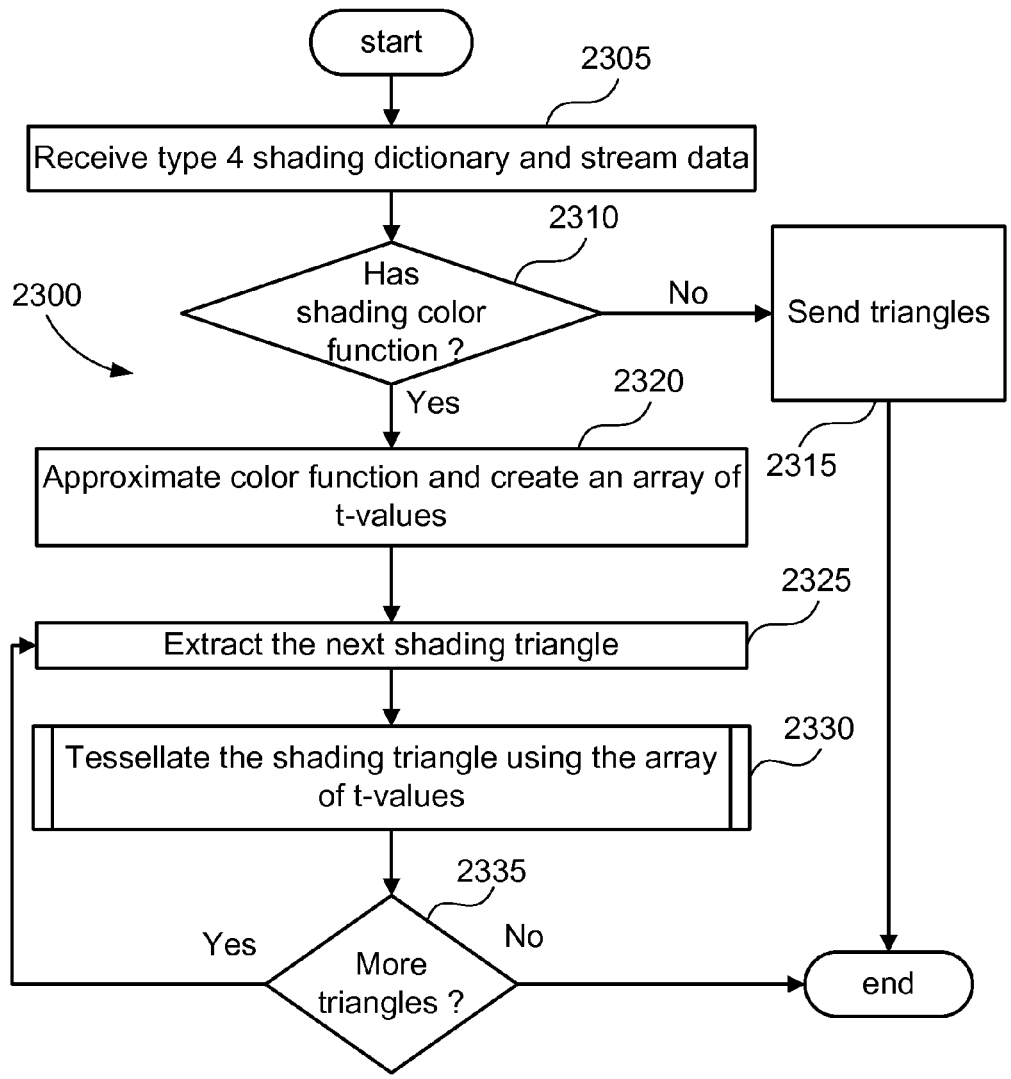
FIG. 23 is a schematic flow diagram showing a method of tessellating a PDF shading triangle.
Figure 24:
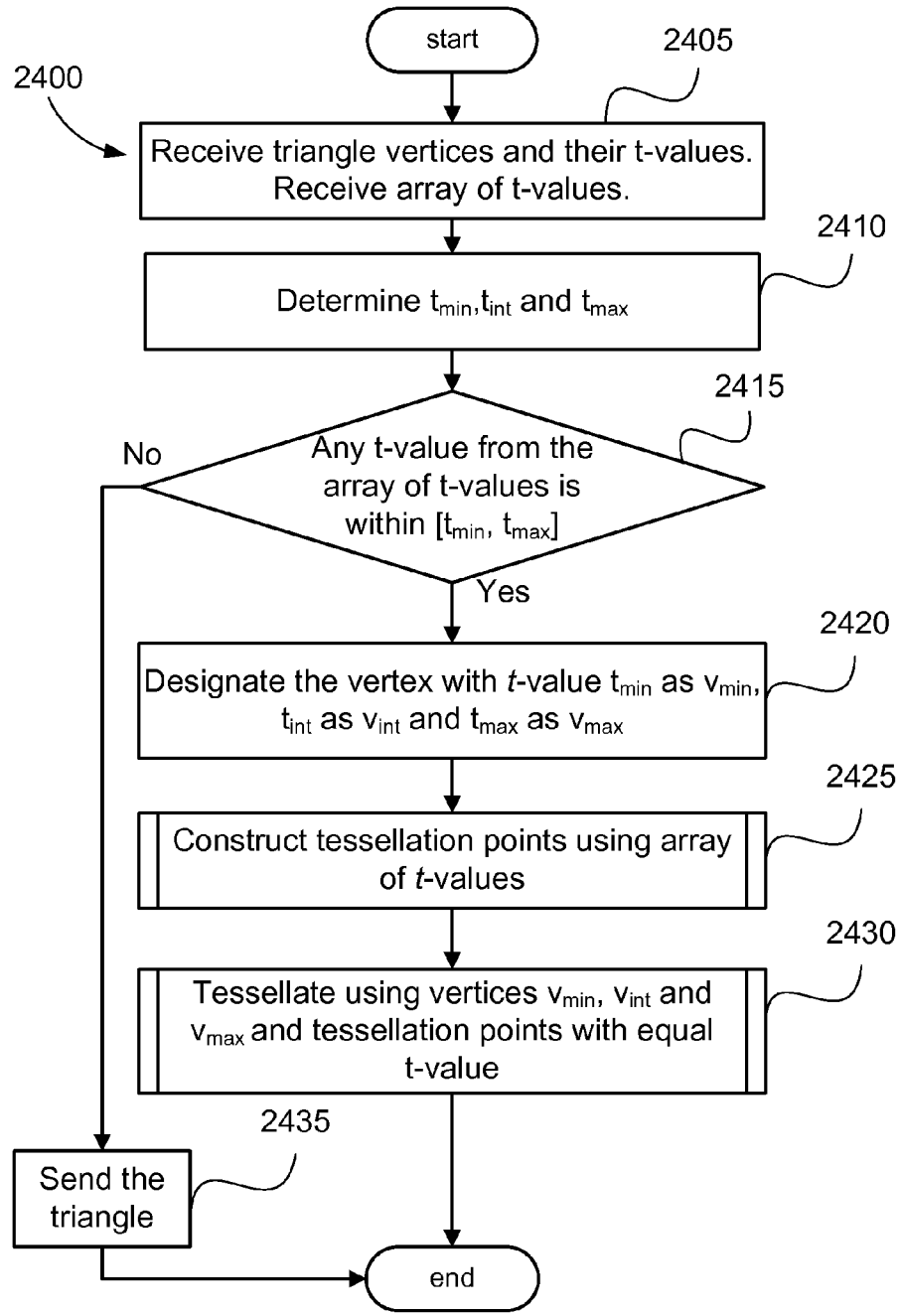
FIG. 24 is a schematic flow diagram showing a method of tessellating a single PDF shading triangle, as executed in the method of FIG. 23.

FIG. 22A shows a shading object in the form of a triangle 2200. The triangle 2200 of FIG. 22A is an example PDF type 4 shading triangle. Vertices 2205, 2210 and 2215 are associated with color data. FIG. 22B shows an example of a mesh of triangles 2220 for the PDF type 4 shading triangle 2200. The triangles 2235 and 2240 show an example of sharing vertices in which vertices 2215 and 2245 are shared between the two triangles 2235 and 2240. The vertex 2215 contains the same color data for both triangles 2235 and 2240. Similarly, the vertex 2235 contains the same color data for both triangles 2235 and 2240.

PDF type 5 shadings are similar to PDF type 4 shadings. However, vertices of the triangles of PDF type 5 shadings are arranged in a pseudo rectangular lattice which is topologically equivalent to a rectangular grid. The vertices of the triangles of PDF type 5 shadings are organized into rows which need not be geometrically linear.

The page of the PDF to be printed, as described above with reference to FIG. 5, may contain one or more PDF type 4 shadings. Again, the program 133 may in part execute within the computer system 100 to interpret and render the page description of PDF type 4 shadings on a printer, such as the printer 115.

A document 501 comprising a PDF type 4 shading that is submitted for printing is received by the program 133, under execution of the processor 105, and interpreted by the PDF document interpreter module 510. As described above, the PDF document interpreter module 510 generates drawing commands which are sent, as depicted by the arrow 511, to the display list creator module 520. The display list creator module 520 translates the drawing commands into display list elements 570. When a display list for a single page is completed, the display list is sent, as depicted by the arrow 512 to the renderer module 530 for rendering. The display list is in a format that can be easily processed by the renderer module 530. The renderer module 530 processes the display list and generates pixel data which is sent, as depicted by the arrow 513 to the print engine module 540 executing in the printer 115 for printing the pixel data onto a hard copy medium, such as paper or film.

The PDF interpreter module 510, under execution of the processor 105, passes PDF type 4 shadings data to the shading unit 550 as depicted by arrow 514. The shading unit 550 passes the type 4 shading dictionary and stream data to the tessellation unit 560 as depicted by arrow 516, which is a type 4 shading tessellation unit for processing PDF type 4 shadings. Again, the type 4 shading tessellation unit 560 will be generically referred to below as the "tessellation unit" 560 unless referred to explicitly as the type 4 shading tessellation unit. The tessellation unit 560 tessellates the shading triangles of the document 501 further into triangles using a method 2300 of tessellating a shading triangle as described in detail below with reference to FIG. 23. The method 2300 may be used in rendering a shading object in the form of the shading triangle. In another arrangement, the method 2300 may be used in rendering any other type of shading object such as a parametric patch as described above.

The tessellation unit 560 passes the generated triangles to the shading unit 550 as depicted by the arrow 517. If the color values of the generated triangles are specified by t-values, then the shading unit 550 will generate the color associated with triangles received from the tessellation unit 560 by applying the PDF shading color function to the t-value associated with the vertices of triangles. The shading unit 550 will then pass the triangles to the PDF interpreter module 510 as depicted by the arrow 515. The PDF interpreter module 510 passes the generated triangles to the renderer module 530 as depicted by the arrow 511. The renderer module 530 fills the triangle by linear interpolation of the colors of vertices of the triangle and may then color convert the resulting triangle to the native color space of the output device (e.g., the printer 115 or the display 114).

The method 2300 has general applicability to tessellating shading triangles from PDF type 4 and type 5 shadings. However, for ease of explanation, the operation of the type 4 shading tessellation unit 560 is described with reference to a PDF type 4 shading triangle. Since PDF type 5 shading triangles are similar to PDF type 4 shading triangles, the type 4 shading tessellation unit 560 may operate on PDF type 5 shadings. PostScript™ type 4 and 5 shadings are similar to PDF type 4 and 5 shadings. Accordingly, the method 2300 described here is also applicable to PostScript™ type 4 and 5 shadings.

In one arrangement, the PDF shading color function may be approximated within a certain tolerance using straight segments joining intermediate points of the shading color function curve. During the approximation process the t-values of the intermediate points may also be calculated. Using the approximated PDF shading color function an array of parametric t-values may be constructed in which each t-value represents the color values associated with an end point of a straight segment approximating the shading function. The term "array of t-values" is used below to refer to an array of parametric t-values. For each PDF shading triangle in a PDF type 4 or 5 shading, the maximum and minimum t-values of the vertices are determined, and the t-values in the array which lie within the maximum and minimum t-value range are identified. For each such t-value, two points are located on the edges of the shading triangle by linear interpolation of the t-values of the vertices of the edges of shading triangle—the first point being on the edge joining the triangle vertices with minimum and maximum t-value and second point is on one of other two edges. The second point may also be the remaining vertex if that vertex has a t-value that is neither minimum nor maximum t-value among the t-values of the vertices of the triangle. Identified points that have equal t-value are added as tessellation points for the triangle. By joining the points with equal t-values using straight lines, the PDF shading triangle is tessellated further into one or more triangles, zero or more quadrilaterals and up to one pentagon. The quadrilaterals are further tessellated into triangles by joining the diagonal. The pentagon is further tessellated into a triangle and a quadrilateral which is further tessellated into triangles by joining the diagonal. The straight line joining equal t-values itself has constant t-value (i.e., equal to the t-value of the end points) for all points on the line as the t-values for the points are computed by linear interpolation using two end points having same t-value. Thus the resulting triangles of a PDF shading triangle have at least one edge constant color. Also, the interior of each resulting triangle includes only t-values within the range of a single straight-line segment of the linear approximation of the color shading function. The t-values (or "intermediate values") for each interior point of the shading object in the form of the PDF shading triangle are provided according to linear interpolation of the t-values for the vertices of the shading object. Thus, the triangles are considered linear for a certain tolerance and linear interpolation of the color of the vertices of each triangle can be applied in order to approximate the colors of interior points of that triangle.

Figure 29A:
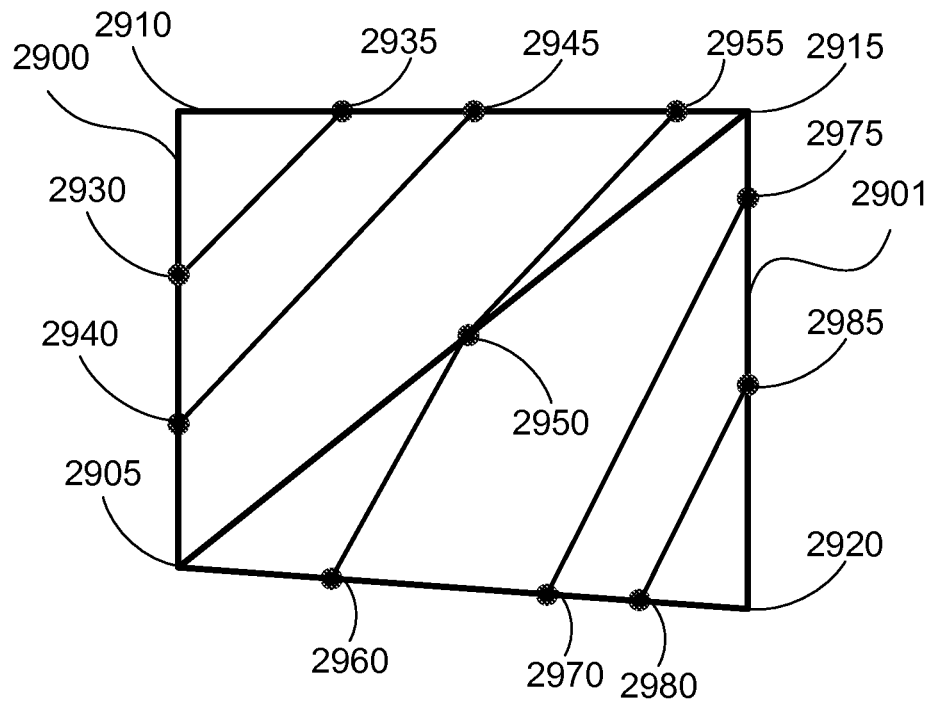
FIGS. 29A and 29B collectively show an example tessellation of a PDF type 4 shading triangle mesh.
Figure 29B:
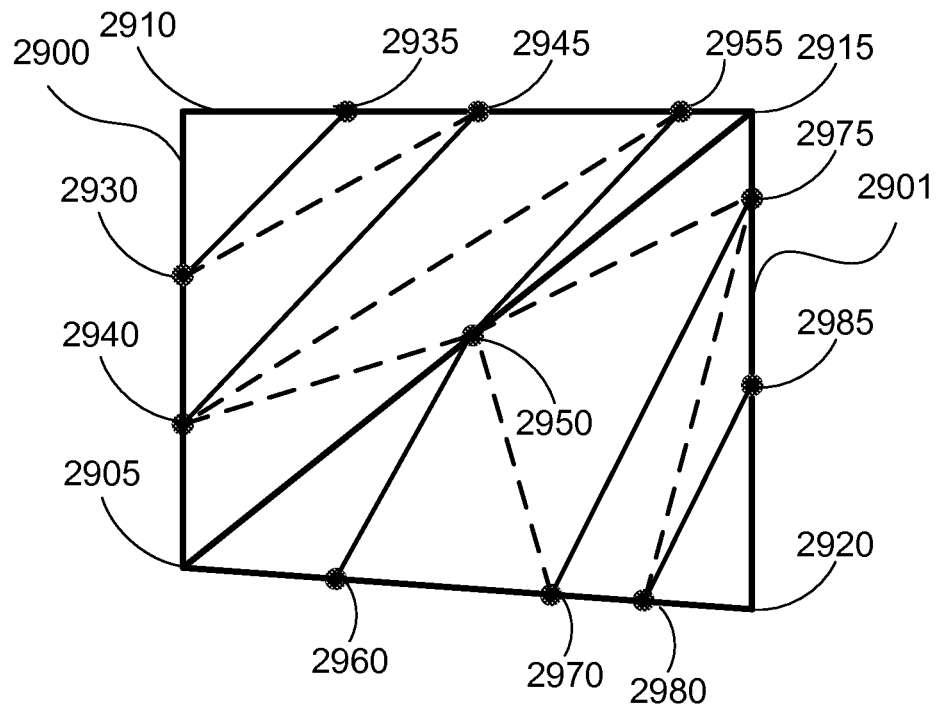

FIGS. 29A and 29B collectively show an example of a PDF shading triangle tessellation using the method 2300. FIG. 29A shows a first PDF shading triangle 2900 comprising the vertices 2905, 2910 and 2915 and a second PDF shading triangle 2901 comprising the vertices 2905, 2920 and 2915. The PDF shading triangles 2900 and 2901 form a mesh of triangles in which vertices 2905 and 2915 are shared. The mesh of PDF shading triangles comprising PDF shading triangles 2900 and 2901 is an example mesh. In practice a mesh can comprise one, two or more than two PDF shading triangles.

For the first PDF shading triangle 2900, the vertex 2910 has a minimum t-value and the vertex 2915 has a maximum t-value among the t-values of the vertices of the triangle. The vertex 2905 has a t-value which is neither the maximum nor the minimum t-value among the t-values of the vertices of the PDF shading triangle.

For the first PDF shading triangle 2900, the PDF shading color function approximation array contains three t-values, namely $tf_0$, $tf_1$ and $tf_2$, which are greater than the minimum t-value and less than the maximum t-value among the t-values of the vertices of the triangle. Since the t-value of the vertex 2910 is minimum and the t-value of the vertex 2915 is the maximum among the t-values of the vertices of the triangle, by applying linear interpolation using the t-values of the vertices 2910 and 2915, the three points 2935, 2945 and 2955 along the edge joining the vertices 2910 and 2915 corresponding to t-values $tf_0$, $tf_1$ and $tf_2$ are computed.

The t-values $tf_0$ and $tf_1$ are greater than the t-value of the vertex 2910 and less than the t-value of the vertex 2905. Thus, by applying linear interpolation using the t-values of the vertices 2910 and 2905, the points 2930 and 2940 along the edge joining vertices 2910 and 2905 corresponding to $tf_0$ and $tf_1$ are computed.

The t-value $tf_2$ is greater than the t-value of the vertex 2905 and less than the t-value of the vertex 2915. Thus, by applying linear interpolation using the t-values of the vertices 2905 and 2915, the point 2950 along the edge joining vertices 2905 and 2915 corresponding to $tf_2$ are computed.

The vertices 2930 and 2935 with t-value $tf_0$ are joined by a line. The vertices 2940 and 2945 with t-value $tf_1$ are joined by a line. The vertices 2950 and 2955 with t-value $tf_2$ are joined by a line. Thus, the first PDF shading triangle 2900 is tessellated into a triangle comprising the vertices 2910, 2930 and 2935, a quadrilateral comprising the vertices 2930, 2935, 2940 and 2945, and a pentagon comprising the vertices 2905, 2940, 2945, 2955 and 2950, and another triangle comprising the vertices 2950, 2955 and 2915. The quadrilateral and pentagon are further tessellated into triangles as shown in FIG. 29B.

For the second PDF shading triangle 2901, the vertex 2905 has the minimum t-value and the vertex 2920 has the maximum t-value among the t-values of the vertices of the triangle. The vertex 2915 has a t-value which is neither the maximum nor the minimum t-value among the t-values of the vertices of the triangle.

For the second PDF shading triangle 2901, the PDF shading color function approximation array contains three t-values, namely $ts_0$, $ts_1$ and $ts_2$, which are greater than the minimum t-value and less than the maximum t-value among the t-values of the vertices of the triangle. $ts_0$ and $tf_2$ are same. Since the t-value of the vertex 2905 is minimum and the t-value of the vertex 2920 is the maximum among the t-values of the vertices of the triangle, by applying linear interpolation using the t-values of the vertices 2905 and 2920, the three points 2960, 2970 and 2980 along the edge joining the vertices 2905 and 2920 corresponding to t-values $ts_0$, $ts_1$ and $ts_2$ are computed. The t-value $ts_0$ is greater than the t-value of the vertex 2905 and less than the t-value of the vertex 2915. Thus, by applying linear interpolation using the t-values of the vertices 2905 and 2915, the point 2950 along the edge joining vertices 2905 and 2915 corresponding to $ts_0$ is computed.

The t-values $ts_1$ and $ts_2$ are greater than the t-value of the vertex 2915 and less than the t-value of the vertex 2920. Thus, by applying linear interpolation using the t-values of the vertices 2915 and 2920, the points 2975 and 2985 along the edge joining vertices 2915 and 2920 corresponding to $ts_1$ and $ts_2$ are computed.

The vertices 2950 and 2960 with t-value $ts_0$ are joined by a line. The vertices 2970 and 2975 with t-value $ts_1$ are joined by a line. The vertices 2980 and 2985 with t-value $ts_2$ are joined by a line. Thus, the second shading triangle 2901 is tessellated into a triangle comprising the vertices 2905, 2950 and 2960, a pentagon comprising the vertices 2960, 2950, 2915, 2975 and 2970, a quadrilateral comprising the vertices 2970, 2975, 2985 and 2980, and another triangle comprising the vertices 2980, 2985 and 2920. The quadrilateral and pentagon are further tessellated into triangles as shown in FIG. 29B.

In the example mesh comprising the PDF shading triangle 2900 and 2901, only one tessellation point 2950 is computed using the PDF shading color approximation array on the shared edges between the two PDF shading triangles. In practice, there may be more than one or no point can be on the shared edges between any two adjacent shading triangles in a mesh.

Figure 30A:
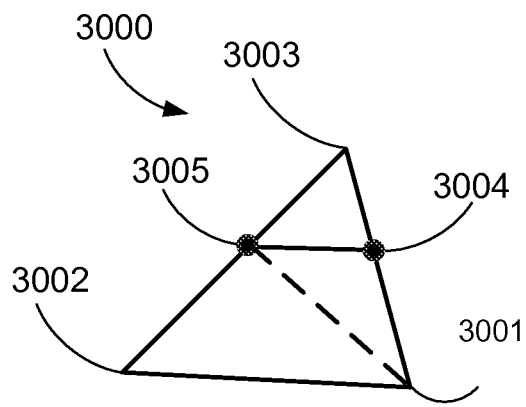
FIG. 30A shows an example tessellation of a PDF type 4 shading triangle.

FIG. 30A shows an example tessellation of a single PDF shading triangle 3000 using the method 2300. For the triangle 3000, the vertex 3001 is associated with the minimum t-value and the vertex 3003 is associated with maximum t-value among the t-values of the vertices of the triangle and the vertex 3002 is associated with a t-value which is neither maximum nor minimum t-values among the t-values of the vertices of the triangle.

For the PDF shading triangle 3000, the PDF shading color function approximation array contains one t-value, namely $tp_0$, that is greater than the minimum t-value and less than the maximum t-value among the t-values of the vertices of the triangle. Since the t-value of the vertex 3001 is minimum and the t-value of the vertex 3003 is the maximum among the t-values of the vertices of the triangle, by applying linear interpolation using t-values of the vertices 3001 and 3003, the point 3004 along the edge joining the vertices 3001 and 3003 corresponds to t-values $tp_0$ is computed.

The t-value $tp_0$ is greater than the t-value of the vertex 3002 and less than the t-value of the vertex 3003. Thus, by applying linear interpolation using the t-values of the vertices 3002 and 3003, the point 3005 along the edge joining vertices 3002 and 3003 corresponding to $tp_0$ is computed. The vertices 3005 and 3004 with t-value $tp_0$ are joined by a line resulting a triangle, comprising the vertices 3003, 3004 and 3005, a quadrilateral, comprising the vertices 3001, 3004, 3005 and 3002. The quadrilateral is further tessellated into two triangles by joining a diagonal—one triangle comprising the vertices 3001, 3004 and 3005, and the other triangle comprising the vertices 3001, 3005 and 3002.

Figure 30B:
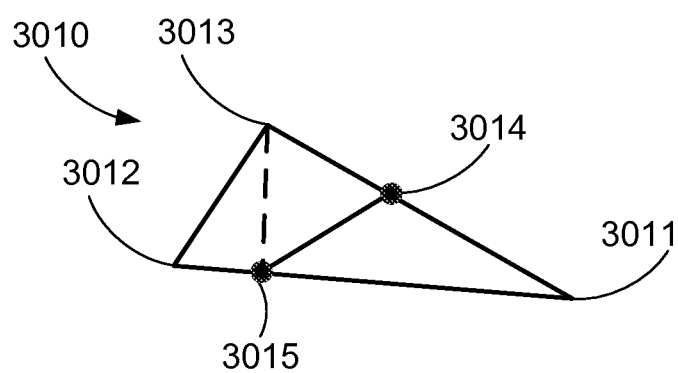
FIG. 30B shows another example tessellation of a PDF type 4 shading triangle.

FIG. 30B shows another example of the tessellation of a single PDF shading triangle 3010 using the method 2300. For the triangle 3010, the vertex 3011 is associated with the minimum t-value and the vertex 3013 is associated with maximum t-value among the t-values of the vertices of the triangle and the vertex 3012 is associated with a t-value which is neither maximum nor minimum t-values among the t-values of the vertices of the triangle 3010.

For the triangle 3010, the PDF shading color function approximation array contains one t-value, namely $tq_0$, that is greater than the minimum t-value and less than the maximum t-value among the t-values of the vertices of the triangle 3010. Since the t-value of the vertex 3011 is the minimum and the t-value of the vertex 3013 is the maximum among the t-values of the vertices of the triangle, by applying linear interpolation using the t-values of the vertices 3011 and 3013, one point 3014 along the edge joining the vertices 3011 and 3013 corresponding to t-values $tq_0$ is computed. The t-value $tq_0$ is greater than the t-value of the vertex 3011 and less than the t-value of the vertex 3012, thus by applying linear interpolation using the t-values of the vertices 3011 and 3012, the point 3015 along the edge joining vertices 3011 and 3012 corresponding to $tq_0$ is computed. The vertices 3015 and 3014 with t-value $tq_0$ are joined by a line resulting a triangle, comprising the vertices 3011, 3014 and 3015, a quadrilateral, comprising the vertices 3013, 3014, 3015 and 3012. The quadrilateral is further tessellated into two triangles by joining a diagonal—one triangle comprising the vertices 3013, 3014 and 3015, and the other triangle comprising the vertices 3013, 3015 and 3012.

After tessellation, all resulting triangles will have colors that are linear for a certain tolerance. For example, in FIG. 29B, the triangle comprising the vertices 2940, 2945 and 2955 will have t-values $tf_1$, $tf_1$ and $tf_2$ respectively and since there can be no t-value that is greater than $tf_1$ and less than $tf_2$ belonging to the PDF shading color function approximation array, the color of the triangle is linear for a certain tolerance.

The color for each vertex of resulting triangles is obtained by applying the shading color function using the t-value of the vertex, and then linear interpolation is applied for all points covered by the triangle. The line joining the points 2940 and 2945 will have constant color.

As described above, a stack is a data structure in which items may be inserted one at a time in an operation called a "push", and items may be taken away one at time by an operation called a "pop". The stack operates in last in a first out (LIFO) manner in which the last item pushed is always the first item to be popped. The last item pushed is also referred as a top element. Once the top element is popped, the element underneath the popped element becomes the top element. The size of a stack indicates number of items in the stack.

In one arrangement, a vertex data structure may contain a coordinate indicating a point on the edges of a PDF shading triangle. The vertex may also specify the t-value which is associated with the point. The tessellation points on the edges of the PDF shading triangle can be represented by the vertex. The corners of the PDF shading triangle are also represented by a vertex.

A straight segment or straight line can be represented as a pair of vertices indicating the end points of the straight segment. The method 2300 of tessellating a PDF shading triangle will be described with reference to FIG. 23. The method 2300 may be used to render a region of shaded color specified in terms of a color blend across a mesh of triangles.

The method 2300 determines a PDF shading triangle containing color values for each individual triangle of a mesh of triangles containing color values and sends each PDF shading triangle to the shading unit 550.

The method 2300 divides a PDF shading triangle, containing parametric t-values as color data for each individual triangle of a mesh of triangles with parametric t-values as color data, further into new triangles. The new triangles are sent to the shading unit 550. The shading unit 550 obtains the color values of the new triangles by applying the PDF shading color function to the t-value associated with the vertices of the new triangles.

The triangles generated in accordance with the method 2300 described here may be rendered into pixels using any suitable rendering methods. The method 2300 may be implemented as one or more software code modules of the software application program 133 resident in the hard disk drive 110 and being controlled in its execution by the processor 105.

The method 2300 begins at receiving step 2305, where the processor 105 receives the PDF shading dictionary and stream data from the shading unit 550. The content of the PDF shading dictionary and stream data is specified by the PDF specification. In particular, the PDF shading dictionary contains information about the PDF shading color function used (if any), and the PDF shading stream data specifying the geometry of a mesh of triangles. Accordingly, the processor 105 is used for receiving the PDF shading color function at step 2305. The PDF shading dictionary also contains associated parametric values associated with each geometric point that defines the mesh of triangles After receiving the PDF shading dictionary and stream data, the method 2300 proceeds to decision step 2310 in which the processor 105 is used to determine if the shading uses a PDF shading color function. If it is determined that the shading uses a PDF shading color function then the method 2300 proceeds to approximating step 2320. In decision step 2310, if it is determined that the shading does not use a PDF shading color function then the method 2300 proceeds to sending step 2315 instead.

At step 2315, the PDF shading triangle is passed to the shading unit 550 under execution of the processor 105. In this case, no tessellation is required and the PDF shading triangle may be rendered directly by means of performing a linear interpolation between the colors defined for the three corners of the triangle. The method 2300 then finishes after performing step 2315.

At step 2320, the PDF shading color function is approximated using linear segments for a given error tolerance. The approximation of the PDF shading color function is illustrated in FIGS. 4A and 4B as described above. As part of the approximation, the sorted array of t-values (or "intermediate values") making up the approximation is produced. The sorted array of t-values is referred to as the PDF shading color function approximation array.

In one arrangement, PDF shading color functions may be approximated using linear segments and error tolerances. Error tolerances are used to specify the maximum permissible difference between the PDF shading color function and its approximation. Any suitable method may be used for approximating a PDF shading color function using linear segments and error tolerances. For a PDF shading color function producing a single color channel, in one arrangement a single error tolerance value may be used while for a PDF shading color function producing multiple color channels, either a single or multiple error tolerance value may be used.

After step 2320, the method 2300 then proceeds to extracting step 2325. At step 2325, the processor 105 is used for receiving a shading object of a first triangle in the mesh of triangles. The first shading triangle is received with defined t-values for each vertex of the first triangle. In particular, the following information about the first triangle in the mesh of triangles is read from the data stream by the processor 105 at step 2325:

The three vertices of the triangle; and
The t-values associated with each vertex of the triangle.

Any subsequent invocation of the step 2325 reads the next available shading triangle from the shading data stream After step 2325, the method 2300 proceeds to tessellating step 2330 in which the PDF shading triangle is tessellated further into triangles using the PDF shading color function approximation array. A method 2400 of tessellating a PDF shading triangle, as executed at step 2330, will be further described with reference to FIG. 24.

After performing step 2330, the method 2300 proceeds to the decision step 2335 in which it is determined whether there are more PDF shading triangles in the PDF shading stream data to be processed. If it is determined that there are more PDF shading triangles to process then the method 2300 returns to step 2325. Otherwise, the method 2300 finishes.

The method 2400 tessellates the PDF shading triangle using the PDF shading color function approximation array. The method 2400 may be implemented as one or more software code modules of the software application program 133 resident in the hard disk drive 110 and being controlled in its execution by the processor 105.

The method 2400 is invoked at step 2330 of the method 2300. The method 2400 begins at receiving step 2405 in which the processor 105 receives the vertices of the PDF shading triangle and their associated t-values. The processor 105 may store the vertices of the PDF shading triangle and their associated t-values in the memory 106. At step 2405 the processor 105 also receives the PDF shading color function approximation array (the array of t-values). Again, the processor 105 may store the PDF shading color function approximation array in the memory 106. After performing step 2405 the method 2400 proceeds to determining step 2410.

At determining step 2410, the processor 105 is used to determine the following:

The minimum t-value, $t_{min}$, among the t-values of the vertices of the triangle;
The maximum t-value, $t_{max}$, among the t-values of the vertices of the triangle;
The t-value, $t_{int}$, among the t-values of the vertices of the triangle which is neither $t_{min}$ nor $t_{max}$;
The t-values $t_{min}$, $t_{int}$ and $t_{max}$ satisfy the constraint $$t_{min} \leq t_{int} \leq t_{max}$$

After performing the step 2410, the method 2400 proceeds to step decision 2415 in which the processor 105 is used to determine whether any t-value in the PDF shading color function approximation array is greater than $t_{min}$ and less than $t_{max}$. If it is determined that there exists at least one t-value in the PDF shading color function approximation array that is greater than $t_{min}$ and less than $t_{max}$ then the method 2400 proceeds to designating step 2420. Otherwise, the method 2400 proceeds to sending step 2435.

The presence of a t-value that is greater than $t_{min}$ and less than $t_{max}$ in the PDF shading color function approximation array indicates there is a non-linearity of color in the shading triangle for the tolerance value used to approximate the shading color function.

At step 2435, the PDF shading triangle is sent to the shading unit 550 and the method 2400 finishes.

At step 2420, the processor 105 is used to designate the following:

Designates the vertex with t-value as $v_{min}$.

Designates the vertex with t-value $t_{int}$ as $v_{int}$.

Designates the vertex with t-value $t_{max}$ as $v_{max}$.

After performing the step 2420, the method 2400 proceeds to constructing step 2425 in which tessellation points are constructed using the PDF shading color function approximation array. The tessellation points are stored in two stacks, namely stack0 and stack1.

Figure 25:
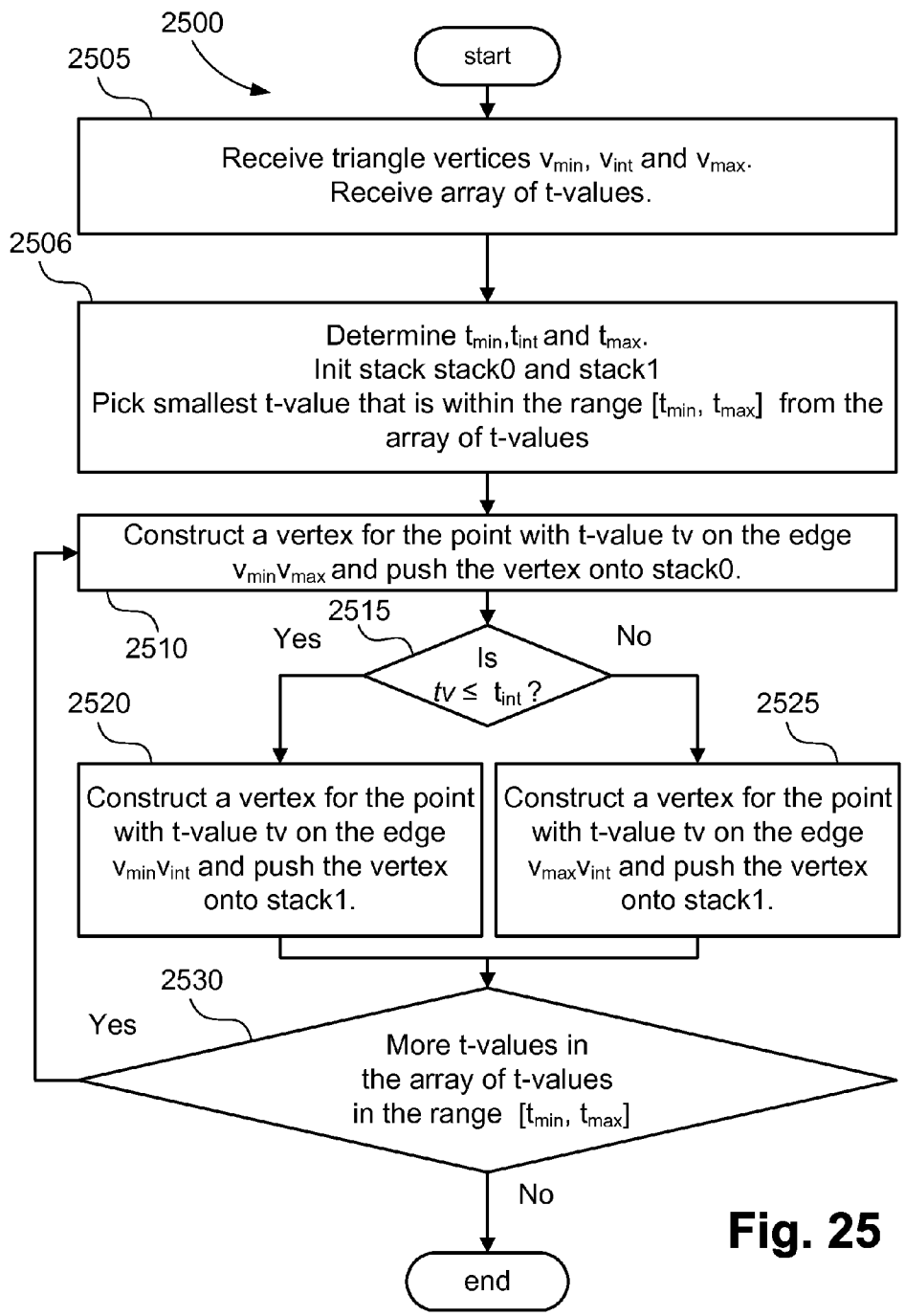
FIG. 25 is a schematic flow diagram showing a method of constructing tessellation points for a single PDF shading triangle using an array of parametric values representing an approximation of a PDF shading color function.

A method 2500 of constructing tessellation points for a single shading triangle using an array of parametric values representing an approximation of a PDF shading color function, as executed at step 2425, will be described below with reference FIG. 25.

After performing the step 2425, the method 2400 proceeds to tessellating step 2430 in which the PDF shading triangle is tessellated using straight lines that join tessellation points with equal t-value whose vertices are stored in stack0 and stack1. A method 2600 of tessellating a PDF shading triangle, as executed at step 2430, will be described in detail below with reference FIG. 26. The method 2400 finishes after step 2430.

The method 2500 of constructing tessellation points for a single PDF shading triangle, as executed at step 2425, will now be described with reference FIG. 25. The PDF shading triangle may be rendered using the determined tessellation points. The method 2500 constructs tessellation points using the PDF shading color function approximation array. The method 2500 may be implemented as one or more software code modules of the software application program 133 resident in the hard disk drive 110 and being controlled in its execution by the processor 105. The method 2500 will be described by way of example with reference to the example PDF shading triangles of FIGS. 29A, 29B, 30A and 30B.

The method 2500 is invoked at step 2425 of the method 2400. The method 2500 beings at receiving step 2505, where PDF shading triangle vertices, $v_{min}$, $v_{int}$ and $v_{max}$, and the PDF shading color function approximation array are received by the processor 105 and may be stored by the processor 105 in the memory 106. The vertices $v_{min}$, $v_{int}$ and $v_{max}$, were designated at step 2420 of the method 2400. The PDF shading color function approximation array was constructed in the step 2320 of the method 2300.

After performing step 2505, the method 2500 proceeds to determining step 2506. At step 2506, the method 2500 determines $t_{min}$, $t_{int}$ and $t_{max}$ as the values associated with vertices $v_{min}$, $v_{int}$ and $v_{max}$ respectively. The determined values $t_{min}$, $t_{int}$ and $t_{max}$ may be stored in the memory 106 by the processor 105. At step 2506, the method 2500 initializes two empty stacks stack0 and stack1 within memory 106. At step 2506, the method 2500 also designates tv as the smallest t-value within the PDF shading color function approximation array which is greater than $t_{min}$. The decision step 2415 in the process 2400 ensures at least one such t-value exists in the PDF shading color function approximation array. After performing step 2506, the method 2500 proceeds to constructing step 2510.

At step 2510, the method 2500 constructs the vertex for the point with t-value tv on the edge $v_{min}v_{max}$. The location of the point is computed by performing linear interpolation between the t-values of vertices $v_{min}$ and $v_{max}$. The newly created vertex is pushed onto the stack stack0 configured within memory 106. After performing step 2510, the method 2500 proceeds to decision step 2515 in which the processor 105 is used to determine whether tv is less than or equal to $t_{int}$. If it is determined that tv is less than or equal to $t_{int}$ then the method 2500 proceeds to constructing step 2520. Otherwise, the method 2500 proceeds to constructing step 2525.

At step 2520, the processor 105 is used to construct the vertex for the point with t-value tv on the edge $v_{min}v_{int}$. The constructed vertex may be stored by the processor 105 in the memory 106. The location of the point is computed by performing linear interpolation between the t-values of vertices $v_{min}$ and $v_{int}$. The newly created vertex is pushed onto the stack stack1 by the processor 105.

At step 2525, the processor 105 is used to construct the vertex for the point with t-value tv on the edge $v_{max}v_{int}$. The constructed vertex may be stored by the processor 105 in the memory 106. The location of the point is determined by performing linear interpolation between the t-values of vertices $v_{max}$ and $v_{int}$. The newly created vertex is pushed onto the stack stack1 by the processor 105.

After performing either of step 2520 or 2525, the method 2500 proceeds to decision step 2530 in which the processor 105 is used to determine whether there is a value within the PDF shading color function approximation array which is greater than tv and smaller than $t_{max}$. If there is such a value, the method 2500 designates tv as the smallest value within the PDF shading color function approximation array which is greater than the previous tv value and smaller than $t_{max}$, and returns to step 2510. Otherwise, the method 2500 finishes.

For the method 2500, each iteration of the loop comprising the steps 2510, 2515, 2520, 2525 and 2530 constructs two vertices with equal t-value, one vertex being pushed onto stack0 and other onto stack1. Thus, after completion of the method 2500, the number of items in stack0 and stack1 are equal. The top element on stack0 and the top element of the stack1 have equal t-value. Similarly the element underneath the top element of the stack0 and the element underneath the top element of the stack1 also have equal t-value, and so on.

As described, a first pair of tessellation points having equal intermediate value are determined, the tessellation points in the first pair being positioned along distinct edges of the PDF shading triangle and being associated with a t-value. A second pair of tessellation points having equal intermediate value are also determined, the tessellation points in the second pair being positioned along distinct edges of the PDF shading triangle and being associated with a second intermediate value. The second pair of tessellation points is determined based on linearization of the PDF shading color function within a pre-determined tolerance value. For each of the first and second pair of tessellation points, the first point in the pair is determined at step 2510, and the second point in the pair is determined at step 2520 or 2525. The first and second pairs of tessellation points are determined during separate iterations of the loop of steps in FIG. 25.

In the example of FIG. 29A, for the first triangle 2900 the vertices 2935, 2945 and 2955 are created and pushed onto stack0 in step 2510. The vertices 2930 and 2940 are created and pushed onto stack1 in step 2520. The vertex 2950 is created and pushed onto stack1 in step 2525.

Continuing the example of FIG. 29A, for the second triangle 2901 the vertices 2960, 2970 and 2980 are created and pushed onto stack0 in step 2510. The vertices 2950 are created and pushed onto stack1 as at step 2520 of the method 2500. The vertices 2975 and 2985 are created and pushed onto stack1 as at step 2525 of the method 2500.

In the example of FIG. 30A, for the triangle 3000 the vertex 3004 is created and is pushed onto stack0 in at step 2510. The vertex 3005 is created and pushed onto stack1 at step 2525.

Continuing the example of FIG. 30B, for the triangle 3010 the vertex 3014 is created and pushed onto stack0 at step 2510 of the method 2500. The vertex 3005 is created and pushed onto stack1 at step 2520 of the method 2500.

Figure 26:
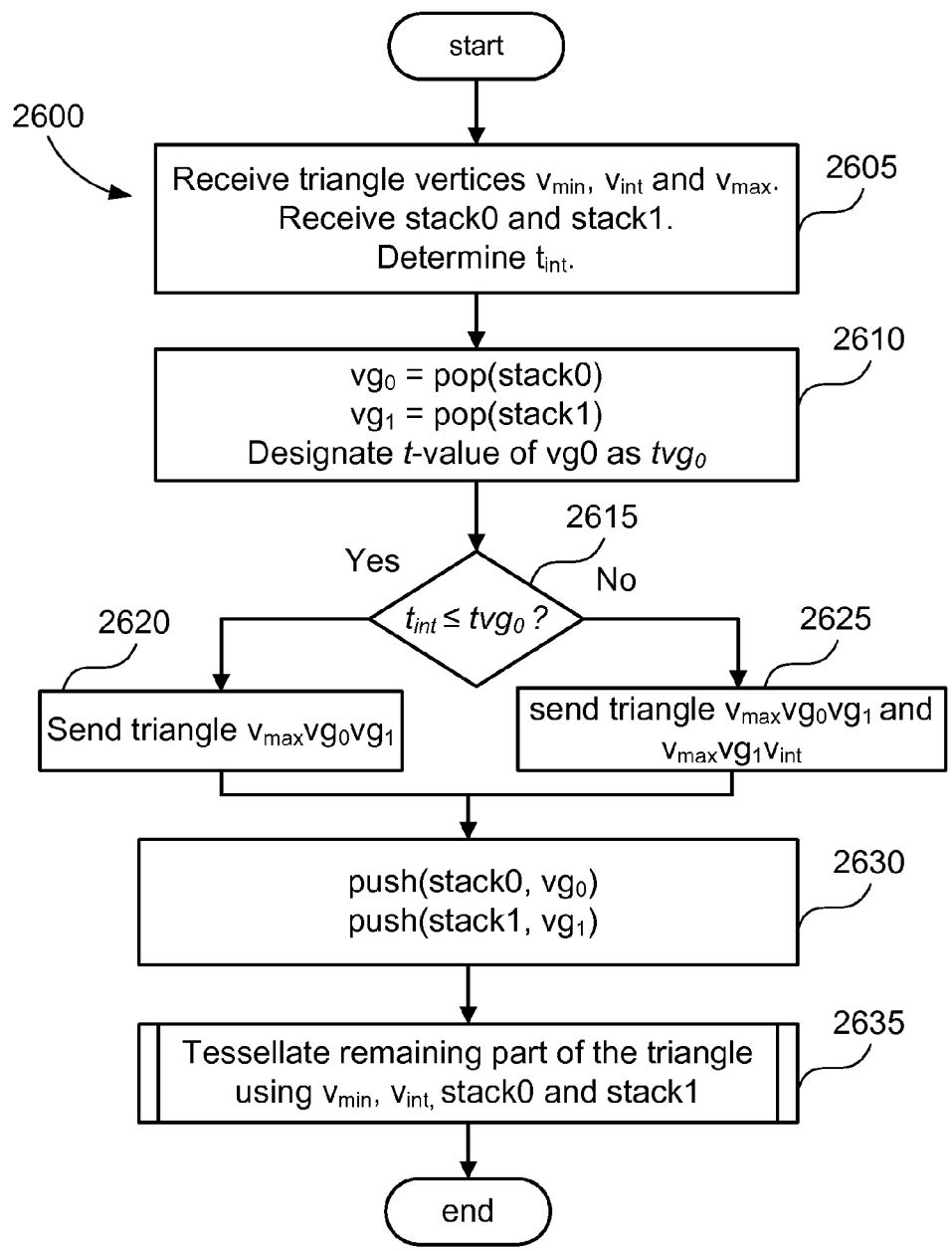
FIG. 26 is a schematic flow diagram showing a method of tessellating a PDF shading triangle, as executed in the method of FIG. 24.

The method 2600 of tessellating a PDF shading triangle, as executed at step 2425, will now be described in detail below with reference FIG. 26. The method 2600 uses pairs of tessellation points with equal parametric values.

The tessellation of the PDF shading triangle at step 2425 begins with the method 2600. The method 2600 may be implemented as one or more software code modules of the software application program 133 resident in the hard disk drive 110 and being controlled in its execution by the processor 105. The method 2600 will be described by way of example with reference to FIGS. 29A, 29B, 30A and 30B.

The method 2600 first tessellates the PDF shading triangle using the vertex $v_{max}$ and the line joining tessellation points of equal t-value closest to the vertex $v_{max}$. The method 2600 then invokes a method 2700 of tessellating a PDF shading triangle to further tessellate the remaining part of the shading triangle.

Figure 28:
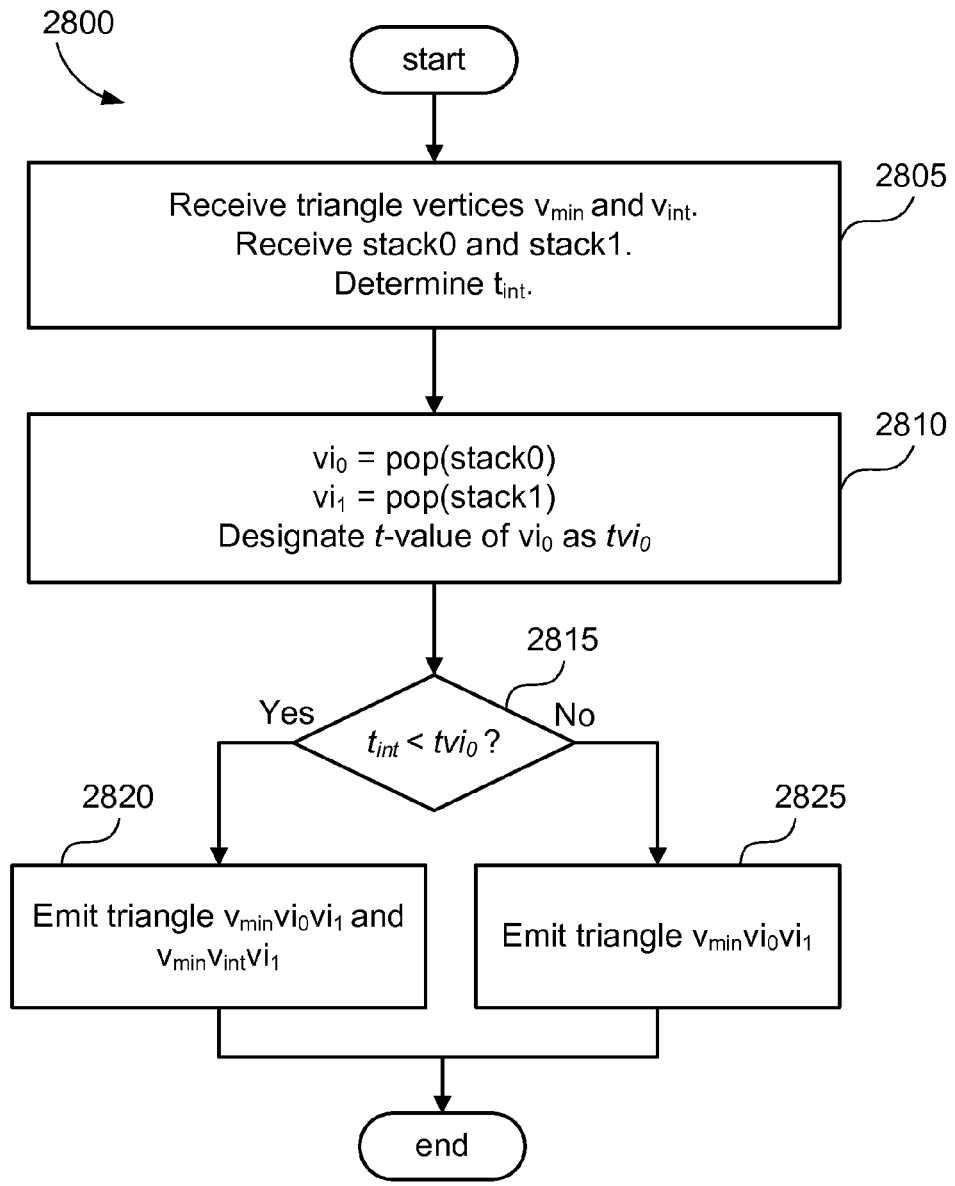
FIG. 28 is a schematic flow diagram showing a method of tessellating a PDF shading triangle, as executed in the method of FIG. 27.

The method 2700 picks pairs of successive lines, each line joining tessellation points of equal t-value, and for each pair of lines either a quadrilateral or a pentagon using part of the edges of the original triangle and those two lines. The resulting quadrilateral or pentagon is further tessellated into triangles. The method 2600 further invokes a method 2800 as seen in FIG. 28 to complete the tessellation of the PDF shading triangle.

The method 2800 tessellates the remaining part of the shading triangle using the vertex $v_{min}$ and the line joining tessellation points of equal t-value closest to the vertex $v_{min}$.

The method 2600 is invoked in the step 2430 of the method 2400.

The method 2600 begins at receiving step 2605 in which triangle vertices $v_{min}$, $v_{int}$ and $v_{max}$, stack0 and stack1, as constructed by the method 2500, are received by the processor 105 and may be stored by the processor 105 in the memory 106. The vertices $v_{min}$, $v_{int}$ and $v_{max}$, were designated at step 2420 of the method 2400. At step 2605, the processor 105 also determines $t_{int}$ as the t-value associated with vertex $v_{int}$. Again, the t-value $t_{int}$ may be stored in the memory 106.

After step 2605, the method 2600 proceeds to popping step 2610 in which both stack0 and stack1 are popped using the processor 105, yielding vertices $vg_0$, from stack0, and $vg_1$, from stack1. At step 2610, the processor 105 is also used to determine $tvg_0$ as the value associated with both $vg_0$ and $vg_1$.

After step 2610, the method 2600 proceeds to decision step 2615 in which the processor 105 is used to determine if $t_{int}$ is less than or equal to $tvg_0$. If it is determined that $t_{int}$ is less than or equal to $tvg_0$ then the method 2600 proceeds to sending step 2620. Otherwise, the method 2600 proceeds to sending step 2625.

At step 2620, the triangle $v_{max}vg_0vg_1$ is sent by the processor 105 to the shading unit 550.

At step 2625, the quadrilateral comprising the vertices $v_{max}, vg_0, vg_1$ and $v_{int}$ is tessellated into two triangles $v_{max}vg_0vg_1$ and $v_{max}vg_1v_{int}$ that are sent to the shading unit 550.

After performing either step 2620 or step 2625, the method 2600 proceeds to step 2630 in which $vg_0$ is pushed back onto stack 0 and $vg_1$ is pushed back to stack0. After step 2630, the method 2600 proceeds to step 2635 in which the PDF shading triangle is further tessellated using stack0, stack1 and vertices $v_{min}$ and $v_{int}$ in accordance with the method 2700. After step 2635, the process 2600 finishes. The method 2600 does not change the size of the stacks stack0 and stack1.

In the example of FIG. 29B, the first triangle 2900 comprising the vertices 2915, 2950 and 2955 is sent to the shading unit 550 in step 2620. The second triangle 2901 in FIG. 29B comprising the vertices 2920, 2980 and 2985 is sent to the shading unit 550 in step 2620.

In the example of FIG. 30A, the example triangle 3000 comprising the vertices 3003, 3004 and 3005 is sent to the shading unit 550 in step 2620.

Continuing the example of FIG. 30B, for triangle 3010 the quadrilateral comprising the vertices 3013, 3014, 3015 and 3012 is tessellated into two triangles, one triangle comprising the vertices 3013, 3014 and 3015 and the other triangle comprising the vertices 3013, 3015 and 3012, and the resulting triangles are sent to the shading unit 550 in step 2625.

Figure 27:
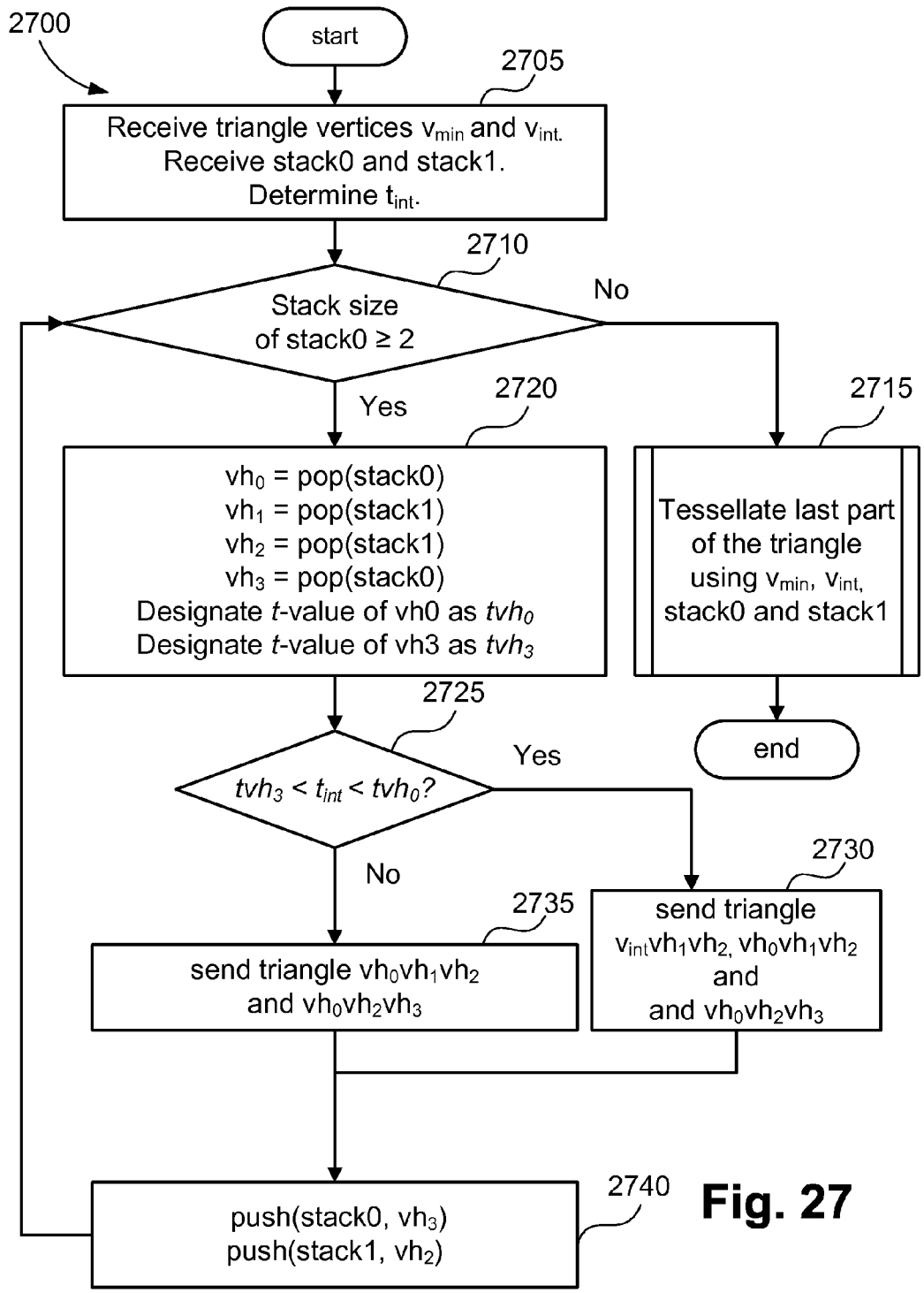
FIG. 27 is a schematic flow diagram showing a method of tessellating a PDF shading triangle, as executed in the method of FIG. 26.

The method 2700 of FIG. 27 will now be described in detail with reference to FIG. 27. The method 2700 is invoked in the step 2635 of the method 2600. The method 2700 may be implemented as one or more software code modules of the software application program 133 resident in the hard disk drive 110 and being controlled in its execution by the processor 105. Again, the method 2700 will be described by way of example with reference to FIGS. 29A, 29B, 30A and 30B.

The method 2700 begins at receiving step 2705 in which triangle vertices $v_{min}$, and $v_{int}$, stack0 and stack1 are received by the processor 105 and may be stored by the processor 105 in the memory 106. The stack0 and stack1 were constructed at step 2425 of the method 2400. The vertices $v_{min}$ and $v_{int}$ were designated at step 2420 of the method 2400. Also at step 2605, the processor 105 is used to determine $t_{int}$ as the t-value associated with the vertex $v_{int}$. The determined t-value $t_{int}$ may be stored by the processor 105 in the memory 106.

After step 2705, the method 2700 proceeds to decision step 2710 in which the processor 105 is used to determine if stack0 has at least two items. If it is determined that stack0 has at least two items, then the method 2700 proceeds to popping step 2720. Otherwise, the method 2700 proceeds to tessellating step 2715.

At step 2720 the following operations are performed using the processor 105:

Two vertices are popped from stack0. The first vertex popped from stack0 is designated as $vh_0$ and the second vertex popped from stack0 is designated $vh_3$. The t-value associated with $vh_0$ is designated as $tvh_0$ and the t-value associated with $vh_3$ is designated as $tvh_3$.

Two vertices are popped from stack1. The first vertex popped from stack1 is designated as $vh_1$ and the second vertex popped from stack1 as $vh_2$. The vertices $vh_1$ and $vh_0$ have equal t-value, and the vertices $vh_2$ and $vh_3$ have equal t-value.

After step 2720, the method 2700 proceeds to decision step 2725 in which the processor 105 is used to determine whether $t_{int}$ is greater than $tvh_3$ and less than $tvh_0$. If it is determined that $t_{int}$ is greater than $tvh_3$ and less than $tvh_0$ then the method 2700 proceeds to sending step 2730. Otherwise, the method 2700 proceeds to sending step 2735. If the value of $t_{int}$ is greater than the value of $tvh_3$ and less than the value of $tvh_0$ then the geometric shape represented by the lines $vh_0vh_1$, $vh_1v_{int}$, $v_{int}vh_2$, $vh_2vh_3$ and $vh_3vh_0$ is a pentagon. Otherwise $v_{int}$ does not lie inside the interior part of the geometric shape and hence the geometric shape is a quadrilateral represented by the lines $vh_0vh_1$, $vh_1vh_2$, $vh_2vh_3$ and $vh_3vh_0$.

At step 2730, the processor 105 is used to tessellate the pentagon comprising the vertices $vh_0$, $vh_1$, $v_{int}$, $vh_2$ and $vh_3$ into the triangles $v_{int}vh_1vh_2$, $vh_0vh_1vh_2$ and $vh_0vh_2vh_3$ which are sent to the shading unit 550 by the processor 105. Following step 2730, the method 2700 proceeds to pushing step 2740.

At step 2735 the processor 105 is used to tessellate the quadrilateral comprising the vertices $vh_0$, $vh_1$, $vh_2$ and $vh_3$ into two triangles $vh_0vh_1vh_2$ and $vh_0vh_2vh_3$ which are sent to the shading unit 550 by the processor 105. Following step 2735, the method 2700 proceeds to step 2740.

At step 2740 the vertex $vh_3$ is pushed back onto stack0 configured within the memory 106 and the vertex $vh_2$ is pushed back onto stack1. After step 2740, method 2700 returns to decision step 2710.

At step 2715, the PDF shading triangle is further tessellated using the vertices $v_{min}$ and $v_{int}$ and stack stack0 and stack1, completing the tessellation of the original PDF shading triangle.

Step 2715 will be further described with reference to the method 2800 of tessellating a triangle as shown in FIG. 28. The method 2700 finishes after step 2715.

Continuing the example of FIGS. 29A and 29B, the pentagon comprising the vertices 2955, 2950, 2905, 2940 and 2945 is tessellated into three triangles comprising vertices 2905, 2940 and 2950, triangle comprising the vertices 2940, 2950 and 2955, and the triangle comprising vertices 2940, 2955 and 2945 in step 2730. The quadrilateral comprising the vertices 2940, 2945, 2935 and 2930 is tessellated into two triangles comprising the vertices 2940, 2945 and 2930, and the vertices 2930, 2935 and 2945 in step 2735.

Again, for the example triangle 2901 in FIG. 29B, the quadrilateral comprising the vertices 2970, 2980, 2985 and 2975 is tessellated into two triangles comprising the vertices 2970, 2980 and 2975, and the vertices 2980, 2985 and 2975 in step 2735. The pentagon comprising the vertices 2960, 2970, 2975, 29J15 and 2950 is tessellated into three triangles comprising vertices 2915, 2975 and 2950, triangle comprising the vertices 2950, 2960 and 2970, and the triangle comprising the vertices 2950, 2970 and 2975 in step 2730. In the example of FIG. 30A and FIG. 30B, at step 2710, it is determined stack0 does not contain at least two items on the stack0 and the method 2700 proceeds to step 2715.

The method 2800 of tessellating a triangle, as executed at step 2715, will now be described in detail with reference to FIG. 28. The method 2800 may be implemented as one or more software code modules of the software application program 133 resident in the hard disk drive 110 and being controlled in its execution by the processor 105. The method 2800 is invoked at step 2715 of the method 2700.

The method 2800 begins at receiving step 2805 in which triangle vertices $v_{min}$ and $v_{int}$, stack0 and stack1, as constructed by method 2500, are received by the processor 105 and stored by the processor 105 in the memory 106. The vertices $v_{min}$ and $v_{int}$ were designated at step 2420 of the method 2400. Also at step 2805, the processor 105 is used to determine $t_{int}$ as the t-value associated with vertex $v_{int}$.

After step 2805, the method 2800 proceeds to popping step 2810 in which both stack0 and stack1 are popped, yielding vertices $vi_0$, from stack0, and $vi_1$, from stack1. Also at step 2805, the processor 105 is used to determine $tvi_0$ as the value associated with both $vi_0$ and $vi_1$.

After step 2810, the method 2800 proceeds to decision step 2815 in which the processor 105 is used to determine if the value of $t_{int}$ is less than the value of $tvi_0$. If it is determined that the value of $t_{int}$ is less than the value of $tvi_0$ then the method 2800 proceeds to sending step 2820. Otherwise, method 2800 proceeds to sending step 2825.

At step 2820, the quadrilateral comprising the vertices $v_{min}$, $vi_0$, $vi_1$, and $v_{int}$ is tessellated using the processor 105 into two triangles $v_{min}vi_0vi_1$ and $v_{min}vi_{int}vi_1$ that are sent to the shading unit 550. After step 2820 the method 2800 finishes.

At step 2825, the triangle $v_{min}vi_0vi_1$ is sent to the shading unit 550. After step 2825 the method 2800 finishes.

In the example of FIG. 29B, the triangle 2900 in FIG. 29B, the triangle comprising the vertices 2910, 2930 and 2935 is sent to the shading unit 550 at step 2825. Further, the triangle 2901 of FIG. 29B comprising the vertices 2905, 2950 and 2960 is sent to the shading unit 550 in step 2825.

As another example, for the triangle 3000 in FIG. 30A, the quadrilateral comprising the vertices 3001, 3004, 3005 and 3002 is tessellated into two triangles, one triangle comprising the vertices 3001, 3004 and 3005 and the other triangle comprising the vertices 3001, 3005 and 3002. The resulting two triangles are sent to the shading unit 550 at step 2820. Further, the triangle 3010 in FIG. 30B, comprising the vertices 3011, 3014 and 3015 is sent to the shading unit 550 in step 2825.

In many cases, the triangles that result from the tessellation performed in accordance with the described methods have two vertices with the same parametric value. However, a triangle obtained by dividing a pentagon, for example, with vertices 2915, 2975 and 2950 is an exception and will not have two vertices with the same parametric value. In cases where two vertices of rendered triangle have the same parametric value and hence, the same color as defined by the shading function, all isolines of identical color within that tessellated triangle are parallel to the edge spanning the vertices having identical parametric value. Hence, the rendered result is equivalent to varying a color in an axis perpendicular to that edge, according to some segment of the linearized shading function.

In an alternative arrangement, a t-value color mapping function is defined as the combination of the PDF shading color function and the color conversion used by the renderer module 530. The t-value color mapping function maps t-values to color values in the native color space of the output device such as the printer 115. For example, when rendering for a printing device such as the printer 115 the native color space of the printer 115 is often CMYK. In such an alternative arrangement, the t-value color mapping function may be used instead of the PDF shading color function in the described methods. The t-value color mapping function may be used since both the t-value color mapping function and the PDF shading color function are mapping t-values to single-channel or multi-channel color spaces. Further, in such an alternative arrangement, the triangles transferred by the type 4 shading tessellation unit 560 may be directly output by the renderer module 530, producing better performance. Such better performance is achieved particularly if hardware acceleration is available for rendering Gouraud shaded triangles in the native color space of the output device.

Other types of color-transforming operations or functions may also be applied together with the PDF color shading function. In such arrangements, the effect of any additional color transforming operations or functions, in combination with the PDF color shading function may be considered to be a single combined color function, which is divided into straight-line segments for the purposes of tessellating a shading triangle according to the described methods.

In a further alternative arrangement, the triangles received by the type 4 shading tessellation unit 560 may be rendered by varying a color in a determined axial direction according to the linearized color shading function. In an arrangement which varies color in the axial direction, the received PDF type 4 shading is not tessellated into triangles to be filled by means of a three-point color blend. Instead, the received PDF type 4 shading is broken up into a number of regions each of which may be rendered by means of an axial color gradient between a first color and second color, corresponding to two consecutive entries in the array of parametric t-values corresponding to segment endpoints of the linearized shading function. The entire set of regions, each consisting of an axial gradient, may be considered as being a single axial gradient that has multiple color stops on a single axis.

Figure 32:
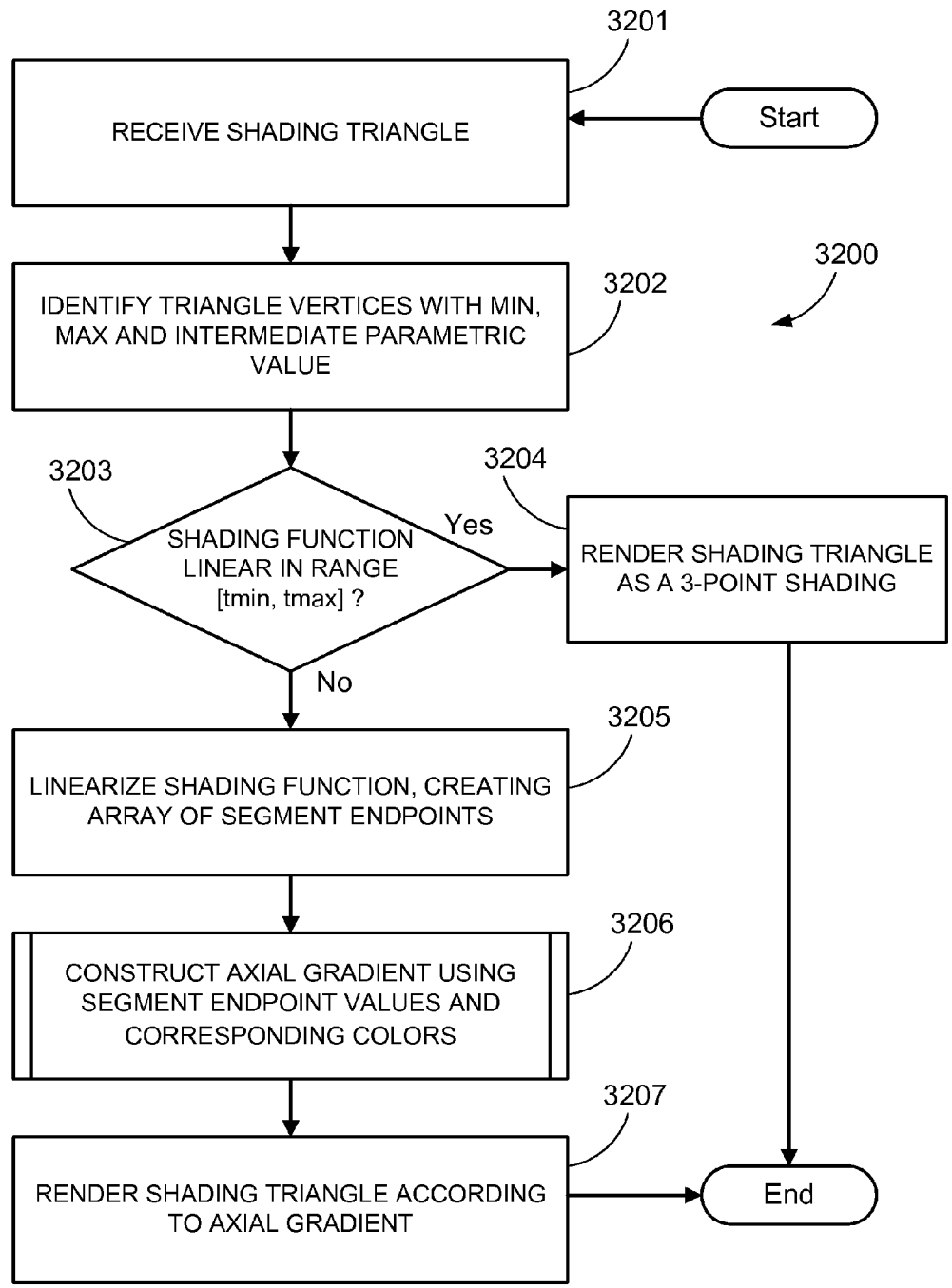
FIG. 32 is a schematic flow diagram showing a method of rendering a PDF shading triangle associated with a PDF color shading function.
Figure 33:
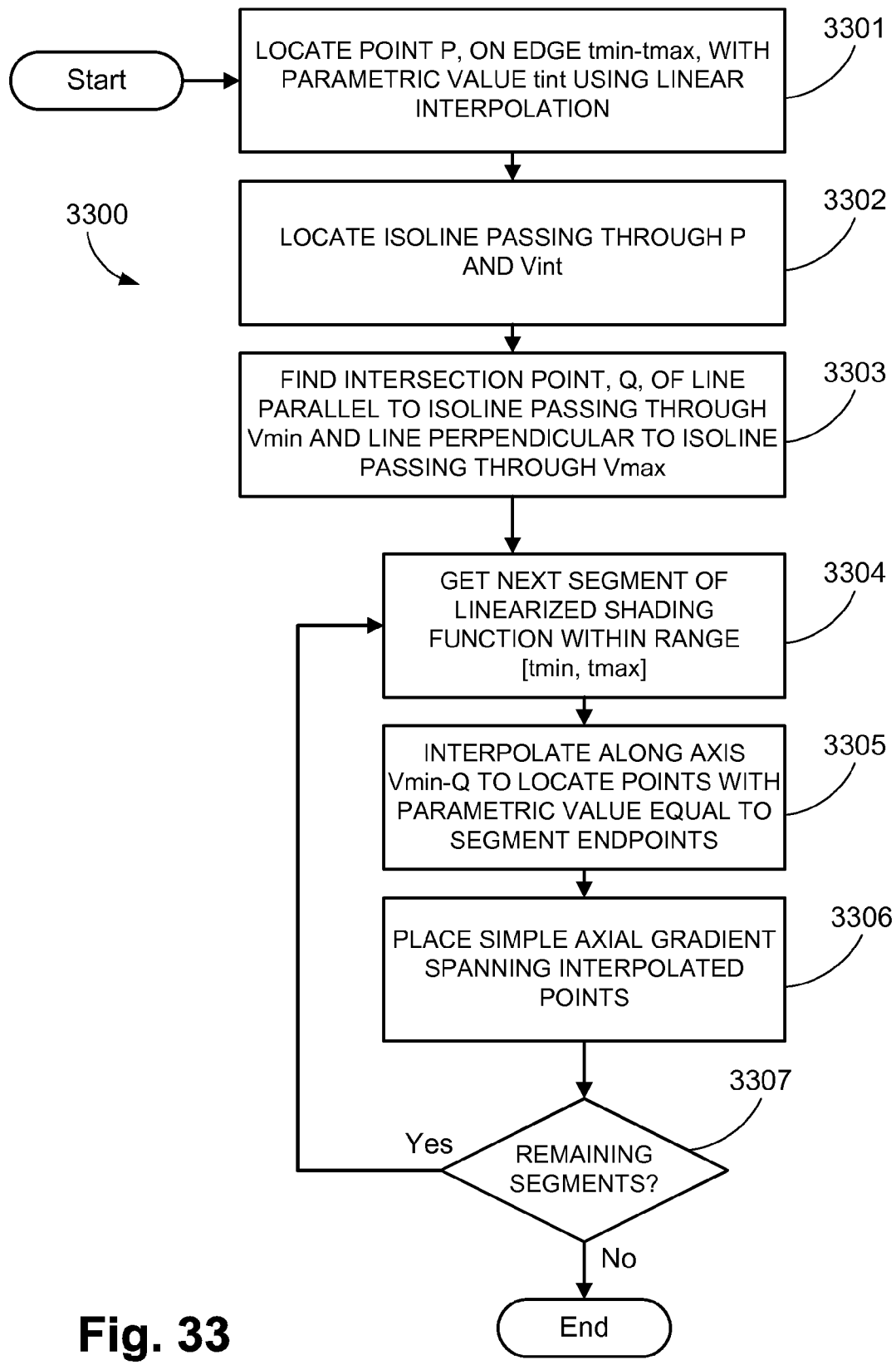
FIG. 33 is a schematic flow diagram showing a method of constructing an axial gradient using the segment endpoint values.

A method 3200 of rendering a PDF shading triangle associated with a PDF color shading function according to a further alternative arrangement will now be described with reference to FIG. 32. The method 3200 may be implemented as one or more software code modules of the software application program 133 resident in the hard disk drive 110 and being controlled in its execution by the processor 105.

The method 3200 begins at receiving step 3201, in which a PDF shading triangle is received by the processor 105 and may be stored by the processor 105 in the memory 106. The PDF shading triangle has a parametric value associated with each vertex. At identifying step 3202, the vertices with minimum, maximum and intermediate parametric values are identified. Then, at decision step 3203, the processor 105 is used to determine if the color shading function for the shading triangle is linear (within a pre-determined tolerance value) within a range spanning the minimum and maximum parametric values associated with vertices of the shading triangle. If the color shading function for the PDF shading triangle is linear, then the method 3200 proceeds to rendering step 3204, in which the PDF shading triangle is rendered as a single 3-point shading triangle using any suitable method. Otherwise, the method 3200 proceeds to step 3205, in which the PDF shading color function for the PDF shading triangle is linearized. At step 3205, an array of parametric values corresponding to linear segment endpoints is created. The method 3200 then continues to constructing step 3206, in which an axial gradient (or set of individual axial gradient segments) is constructed using the segment endpoint values and the corresponding colors determined by the color shading function. A method 3300 of constructing an axial gradient using the segment endpoint values, as executed at step 3206, will be described in detail below with reference to FIG. 33. Then at rendering step 3207, the PDF shading triangle is rendered into pixels according to the created axial gradient, by varying color in the direction of the axis of the gradient. After performing one of either step 3204 or step 3207, the method 3200 ends. Accordingly, the rendering is performed based on linearization of the PDF shading color function within a pre-determined tolerance value in a direction oriented with respect to a line joining a first pair of points.

Figures 31A, 31B:
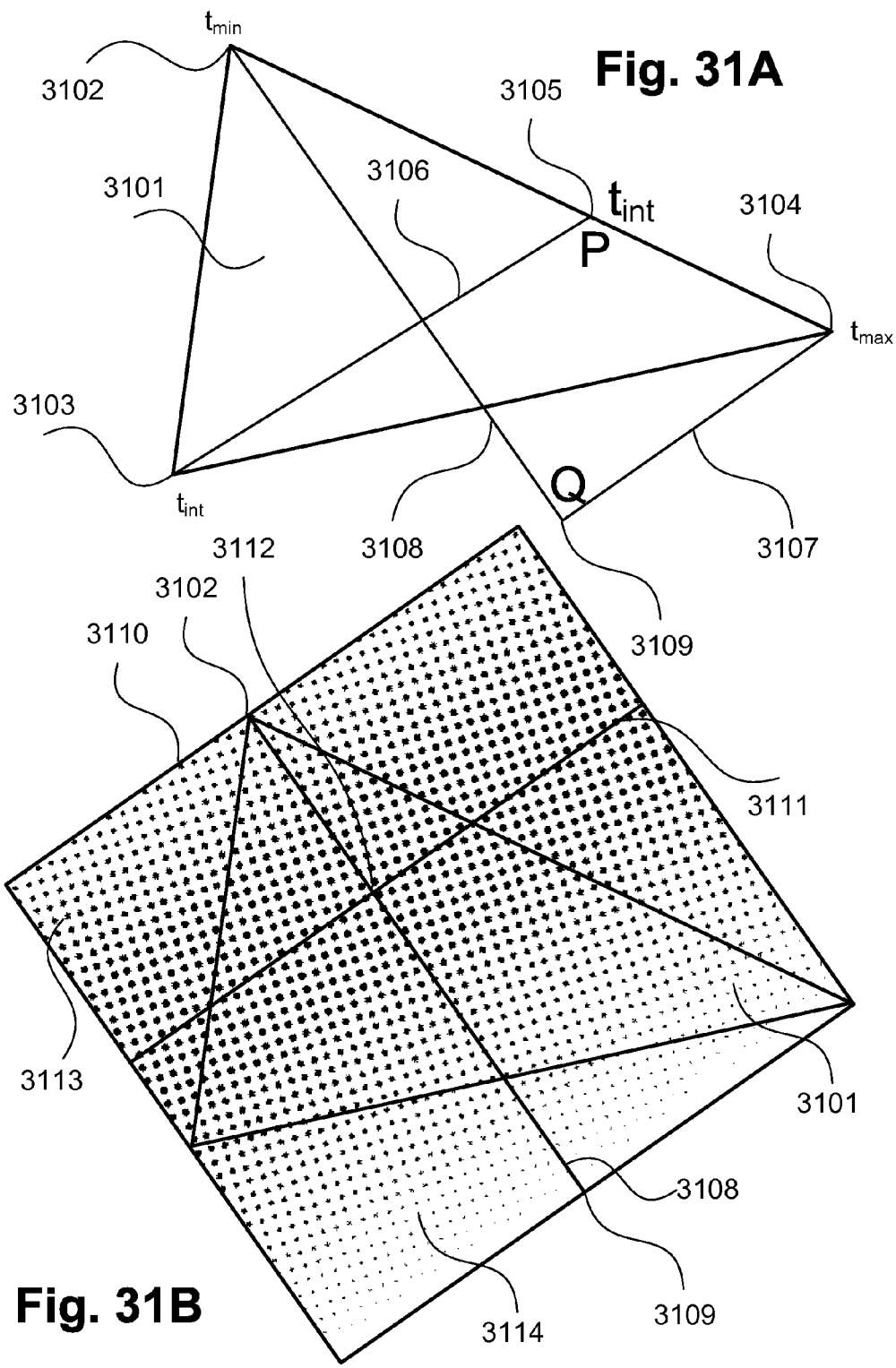
FIG. 31A shows a view of an example PDF shading triangle, superimposed with an axial shading region
FIG. 31B shows a further view of the example PDF shading triangle of FIG. 31A.

The method 3300 of constructing an axial gradient using the segment endpoint values, as executed at step 3206, will now be described. The method 3300 may be implemented as one or more software code modules of the software application program 133 resident in the hard disk drive 110 and being controlled in its execution by the processor 105. The method 3300 will be described by way of example with reference to PDF shading triangle diagrams of FIGS. 31A and 31B. The method 3300 is performed at step 3206 to construct an axial gradient representing the rendered appearance of the PDF shading triangle received at step 3201. FIG. 31A shows an example of a geometrical construction used for determining an axial direction for an example PDF shading triangle 3101.

The method 3300 is performed using the geometry, vertex parametric values, and linearized color shading function for the PDF shading triangle received at step 3201. The method 3300 begins at locating step 3301, where the processor 105 is used to locate a point, designated P, on the edge spanning the vertices with minimum and maximum parametric value, such that the parametric value of the point P is equal to the parametric value for the vertex $V_{int}$. For example, as seen in FIG. 31A, a point 3105 is designated P, on an edge of an example PDF shading triangle 3101. The PDF shading triangle 3101 has vertices 3102, 3103 and 3104; with vertex 3102 having minimum parametric value $t_{min}$ amongst the parametric values of the vertices of the triangle 3101, and vertex 3104 having maximum parametric value $t_{max}$ amongst the parametric values of the vertices of the triangle 3101. Another vertex 3103 has a parametric value $t_{int}$ which is neither the minimum nor maximum parametric value from amongst those for the vertices of the triangle 3101. A line 3106 joining vertex 3103 with parametric value $t_{int}$ with P is an isoline of the PDF shading triangle 3101. Each point along the line 3106 has the same interpolated parametric value, and thus, when interpreted by the color shading function, shall be rendered as the same final color. At locating step 3302, a line such as 3106 is located.

The method 3300 then proceeds to determining step 3303, where an intersection point Q 3109 is determined using the processor 105. The intersection point Q 3109 represents the intersection of a line perpendicular to isoline 3106 passing through vertex $V_{min}$ 3102, and a line parallel to isoline 3106 passing through vertex $V_{max}$ 3104. A line segment 3108 joining vertex $V_{min}$ 3102 and Q 3109 shall be identified as the axis for an axial gradient for rendering the PDF shading triangle 3101. The line segment 3108 has the required direction for rendering the shading triangle 3101 as an axial gradient, with endpoints such that the set of all normals to the line segment 3108 span all interior points of the shading triangle 3101. An equivalent line segment having the required direction and span may also be selected using a different geometrical construction.

The above geometric construction of an axial direction for a shading is also applicable in cases where the two vertices of the shading triangle have the same parametric value. In this case, one of the same-value vertices is arbitrarily designated as being the intermediate vertex. The line 3106 will be coincident with an edge of the PDF shading triangle 3101, and the axial direction of the shading shall be selected as a direction oriented with respect to the edge. In particular, the axial direction of the shading shall be selected as a direction perpendicular to that edge. The axial line segment may, for example, be a segment of a line that passes through the remaining triangle vertex.

If all three vertices of a PDF shading triangle have the same parametric value, then all interior points of the PDF shading triangle will also have that same parametric value, and therefore the shading triangle can be filled by a single flat color as evaluated by the color shading function.

After determining the line segment with required direction and span in step 3303, the method 3300 continues to a set of processing steps 3304, 3305, 3306 and 3307 which form an iterative loop that is performed for each linear segment of the linearized color shading function for the PDF shading triangle.

At retrieving step 3304, the next unused segment of the linearized color shading function is retrieved by the processor 105 and may be stored by the processor 105 in the memory 106. During the first iteration of step 3304, the retrieved segment shall be the first segment that covers the range of parametric values possible for interpolated interior points of the shading triangle (i.e., segments for which both endpoints have a parametric value less than $t_{min}$ shall be ignored). For subsequent iterations of step 3304, a next unused segment shall be retrieved by the processor 105.

Then at interpolating step 3305, points with parametric value corresponding to the endpoints of the current segment of the linearized color shading function are located along the axis 3108 using linear interpolation in the range $[t_{min}, t_{max}]$. For an endpoint with parametric value t, the ratio by which t falls within the range $[t_{min}, t_{max}]$ shall be the same ratio for which the point of placement falls along the axial line segment 3108. For segments with one endpoint with parametric value outside of the range $[t_{min}, t_{max}]$, that endpoint may fall outside of the line segment 3108 but is still placed on the same axis by linear extension beyond the endpoints 3102 and 3109.

Then, at placing step 3306, a simple axial gradient between two colors, as evaluated by the color shading function for the parametric values of the current segment endpoints, is placed spanning the segment endpoints. The axial gradient defines colors for interior points of the shading triangle corresponding to one stripe. Alternatively, the color stops for the segment endpoints are accumulated upon the axis, which will be utilised as a single axial gradient with multiple color stops.

FIG. 31B shows a further view of the example PDF shading triangle 3101, superimposed with an axial shading region 3110. The axial shading is defined as color that varies along an axis, given as the line segment 3108. The color is represented in FIG. 3108 by the density of a half-tone effect. The axial shading region may be considered to be a single multi-stop axial blend, or can be considered as being comprised of a plurality of simple axial blend segments in which color is varied between two colors, such as the axial blend segments 3113 and 3114 of FIG. 31B. A color isoline 3111 corresponding to an endpoint of a segment of the linearized color shading function is located at the boundary along which the axial blend segments are adjoined. The axial blend segments 3113 and 3114 in the example of FIG. 31B are placed during subsequent times that step 3306 is performed.

At decision step 3307, the processor 105 is used to consider whether or not there are any remaining segments of the linearized color shading function remaining to be processed. Segments for which the parametric value for both endpoints are larger than $t_{max}$ are ignored. If there are such non-ignored segments remaining to be processed, then the method 3300 iterates by returning to step 3304. Otherwise, the method 3300 ends.

The axial shading region 3110 is then subsequently clipped to the region bounded by the original PDF shading triangle 3101. The result of rendering the plurality of axial gradient segments (or multi-stop axial gradient) is that interior points of the PDF shading triangle (e.g., 3101) are filled with color that varies along an axis according to an approximation of the PDF color shading function that remains within a pre-defined tolerance value from the true color value for each interior point.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of rendering a parametric patch by a rendering device, said method comprising:
   receiving the parametric patch tessellated into a plurality of cells, the parametric patch being associated with a surface mapping points of the patch to intermediate values, wherein each of the intermediate values is mapped to a color value according to a shading color function;
   determining a set of intermediate values representing an approximation of the shading color function, the set comprising a first intermediate value stored in a memory of the rendering device;
   identifying an isoline, within the patch, connecting points having the first intermediate value, the isoline being associated with a plurality of approximation points to approximate the isoline;
   forming further cells by joining at least one approximation point of the isoline and at least two tessellation points within the patch; and
   rendering the patch by the rendering device using the intermediate values corresponding to vertices of the further cells.

2. The method according to claim 1, wherein the shading color function includes color conversion from shading color space to the native color space of the output device.

3. The method according to claim 1, further comprising:
   determining a tessellation step for said patch in each parametric coordinate direction as a function of a geometry of the parametric patch and a tolerance value; and
   parametrically tessellating said patch into said plurality of cells using the tessellation steps in each parametric coordinate direction.

4. The method according to claim 1, further comprising subdividing the parametric patch into sub-patches until each side of a given sub-patch approximates a line.

5. The method according to claim 1, further comprising;
   identifying an isoline for each intermediate value in the determined set; and
   determining at least one of said isolines that crosses at least one of said plurality of cells.

6. The method according to claim 1, further comprising:
   determining if the isoline crosses a linear segment joining two vertices of one of said plurality of cells at least twice; and
   adding a splitting vertex to said one cell depending on the determination.

7. The method according to claim 1, further comprising:
determining an intersection point between the isoline, and at least one linear segment joining two splitting vertices or vertices of at least one of said plurality of cells; and
adding said intersection point as an additional tessellation point to said at least one of said plurality of cells.

8. The method according to claim 1, further comprising approximating the isoline by linear segments joining approximation points.

9. The method according to claim 1, further comprising generating a triangle cell from vertices of at least one of said plurality of cells and at least one of the approximation points.

10. The method according to claim 1, wherein the isoline is identified using the first intermediate value and intermediate values at vertices of the patch.

11. The method according to claim 10, wherein a color gradient between the isoline and a further isoline is approximated by a linear color gradient within the pre-determined tolerance value, the further isoline is associated with a second intermediate value from the determined set of intermediate values.

12. The method according to claim 11, wherein intermediate values associated with the isolines correspond to endpoints of at least one segment of linear approximation of the shading color function within the pre-determined tolerance value.

13. The method according to claim 10, further comprising:
determining, within a cell, a shading direction perpendicular to the identified isoline;
rendering the cell by changing a color in the determined shading direction using the determined set of intermediate values.

14. The method according to claim 10, wherein the isoline is identified based on a patch geometry.

15. The method according to claim 1, wherein the set of intermediate values is determined based on linearization of the shading color function within the pre-determined tolerance value.

16. A system for rendering a parametric patch, said system comprising:
a memory for storing data and a computer program;
a processor coupled to said memory for executing said computer program, said computer program comprising instructions for:
receiving the parametric patch tessellated into a plurality of cells, the parametric patch being associated with a surface mapping points of the patch to intermediate values, wherein each of the intermediate values is mapped to a color value according to a shading color function;
determining a set of intermediate values representing an approximation of the shading color function, the set comprising a first intermediate value;
forming further cells by joining at least one approximation point of an isoline and at least two tessellation points within the patch; and
rendering the patch using the intermediate values corresponding to vertices of the further cells.

17. A computer readable storage medium having a computer program recorded therein, the program being executable by a computer apparatus to make the computer perform a method of rendering a parametric patch, said program comprising:
code for receiving the parametric patch tessellated into a plurality of cells, the parametric patch being associated with a surface mapping points of the patch to intermediate values, wherein each of the intermediate values is mapped to a color value according to a shading color junction;
code for determining a set of intermediate values representing an approximation of the shading color function, the set comprising a first intermediate value;
code forming further cells by joining at least one approximation point of an isoline and at least two tessellation points within the patch; and
code for rendering the patch using the intermediate values corresponding to vertices of the further cells.

18. A method of rendering a bi-cubic patch by a rendering device, the method comprising:
receiving the bi-cubic patch, the patch being associated with a surface mapping points of the patch to intermediate values, wherein each of the intermediate values is mapped to a color value according to a shading color function;
approximating the shading color function to determine a set of intermediate values for the patch, the set comprising a first intermediate value stored in a memory of the rendering device;
identifying an isoline within the patch for the first intermediate value, the identified isoline is approximated by a plurality of segments defining a plurality of approximation points;
tessellating the patch into a plurality of tessellation cells using the plurality of approximation points; and
rendering the plurality of tessellation cells by the rendering device using intermediate values corresponding to respective vertices.

* * * * *